US012735346B2

(12) United States Patent
Aitken et al.

(10) Patent No.: US 12,735,346 B2
(45) Date of Patent: Sep. 15, 2026

(54) PHOSPHATE AND BORATE GLASSES WITH HIGH ELASTIC MODULI

(71) Applicant: CORNING INCORPORATED, Corning, NY (US)

(72) Inventors: Bruce Gardiner Aitken, Corning, NY (US); Jesse Kohl, Horseheads, NY (US); Alexander I Priven, Sejong-si (KR)

(73) Assignee: CORNING INCORPORATED, Corning, NY (US)

( * ) Notice: Subject to any disclaimer, the term of this patent is extended or adjusted under 35 U.S.C. 154(b) by 677 days.

(21) Appl. No.: 18/096,938

(22) Filed: Jan. 13, 2023

(65) Prior Publication Data

US 2023/0227347 A1 Jul. 20, 2023

Related U.S. Application Data

(60) Provisional application No. 63/300,724, filed on Jan. 19, 2022.

(30) Foreign Application Priority Data

Feb. 10, 2022 (NL) ..................................... 2030887

(51) Int. Cl.

| | |
|---|---|
| ***C03C 3/21*** | (2006.01) |
| ***C03C 3/064*** | (2006.01) |
| ***C03C 3/068*** | (2006.01) |
| ***C03C 3/155*** | (2006.01) |
| ***C03C 3/19*** | (2006.01) |

(52) U.S. Cl.

CPC ................ *C03C 3/21* (2013.01); *C03C 3/064* (2013.01); *C03C 3/068* (2013.01); *C03C 3/155* (2013.01); *C03C 3/19* (2013.01)

(58) Field of Classification Search

CPC ........... C03C 3/21; C03C 3/064; C03C 3/068; C03C 3/155; C03C 3/19

See application file for complete search history.

(56) References Cited

U.S. PATENT DOCUMENTS

| | | | |
|---|---|---|---|
| 5,173,456 | A | 12/1992 | Hayden et al. |
| 8,486,850 | B2 | 7/2013 | Li et al. |
| 2005/0143250 | A1 | 6/2005 | Fujiwara et al. |
| 2008/0207427 | A1 | 8/2008 | Ohkawa et al. |

(Continued)

FOREIGN PATENT DOCUMENTS

| | | |
|---|---|---|
| JP | 60-171244 A | 9/1985 |
| SU | 1645245 A1 | 4/1991 |

OTHER PUBLICATIONS

NL Search Report; 2030887; dated Sep. 16, 2022; 12 pages; European Patent Office.

(Continued)

*Primary Examiner* — Benjamin L Utech

(74) *Attorney, Agent, or Firm* — Kevin L. Bray; Ye Eun Park

(57) ABSTRACT

Glass compositions with high Young's modulus are disclosed. The glass compositions may include phosphorus oxide ($P_2O_5$), alumina ($Al_2O_3$), boron oxide ($B_2O_3$), lithium oxide ($Li_2O$), magnesia (MgO), titania ($TiO_2$), lanthanum oxide ($La_2O_3$) and other components.

7 Claims, 3 Drawing Sheets

(56) References Cited

U.S. PATENT DOCUMENTS

| | | | |
|---|---|---|---|
| 2016/0326043 | A1 | 11/2016 | Sun |
| 2018/0037492 | A1 | 2/2018 | Sakagami et al. |
| 2019/0367406 | A1 | 12/2019 | Ikeda et al. |

OTHER PUBLICATIONS

Ohkawa H., Min K.H., Akiyama R., Yamamoto K., Sugimoto N., Refractive index behavior in phosphate glass from the viewpoint of B3+ and Al3+ coordination., J. Non-Cryst. Solids, 2008, vol. 354, No. 2-9, p. 90-93.

Wei, T. Y., et al., “Structure and elastic properties of low-temperature sealing phosphate glasses”, Journal of Non-Crystalline Solids, vol. 288, No. 1-3, 2001, pp. 140-147.

PHOSPHATE AND BORATE GLASSES WITH HIGH ELASTIC MODULI

This application claims the benefit of priority to Dutch Patent Application No. 2030887 filed on Feb. 10, 2022, which claims priority from U.S. Provisional patent application Ser. No. 63/300,724 filed on Jan. 19, 2022, the content of which is relied upon and incorporated herein by reference in its entirety.

FIELD

The present disclosure generally relates to phosphate and borate glasses having high elastic moduli and low optical dispersion.

BACKGROUND

Glass is used in a variety of devices and constructions, including, in particular, optical (e.g. laser) and electronic devices. Also, glass can be used as a substrate or a carrier for articles (e.g. wafers, electronic devices) during processing or fabrication, including exposure of the articles to aggressive media, such as alkalis, acids, oxidizers, etc.

The required properties of glass depend on the specific application and processing conditions. However, in a variety of applications it is desirable that the glass be chemically durable or resistant to aggressive chemical agents. In particular, when using the glass as a substrate material for microelectronic devices such as micro-LEDs, the glass should be durable to water and acids, including hydrofluoric acid (HF) and its vapor.

When used as a substrate or carrier, glass should also possess a high elastic modulus (Young's modulus) so that the glass exhibits minimum deformation under high loads. The higher is the Young's modulus and the higher is the thickness of the glass, the lower is the deformation of a glass substrate having particular dimensions under a given load. Alternatively, if glass with a higher Young's modulus can me made thinner while maintaining deformation under a particular load to within a specified limit.

All else being equal, however, the higher is the Young's modulus of the glass, the greater are the thermal stresses formed in the glass upon cooling. Thermal stresses may cause undesirable deformation of the articles, e.g. warp. To reduce deformation caused by thermal stresses, it is preferable for the glass to have a low coefficient of thermal expansion (CTE). In other words, the greater the Young's modulus and the lower the CTE of the glass, the better the glass is as a substrate or carrier and the better is the quality of electronic devices processed on the glass.

In some applications, it may also be desirable for glass substrate or carrier to have a low optical dispersion. In particular, when used for optical lenses, the lower is the dispersion of the glass, the more precise is the focusing of light of different wavelengths by the glass and the higher is the image quality. Also, in laser optics, the lower is the optical dispersion, the lower is the loss of optical signal.

It can be challenging to find glasses having the desired combination of these properties and and especially challenging to find such glasses that can be formed from compositions having good glass-forming ability. For example, generally speaking, high durability to HF is unlikely available for glasses containing silica ($SiO_2$). Silica-free glasses, however, are typically not as easily formable and or as thermally stable as conventional silicate glasses. Among silica-free compositions, the cheapest and the most convenient for melting and forming are borate and phosphate glasses, which contain significant amounts of boron oxide ($B_2O_3$) and/or phosphorus oxide ($P_2O_5$). However, both of these oxides may volatilize when melting, thus making the resulting composition sensitive to the changes in the melting conditions, such as melting temperature and time, furnace atmosphere, starting materials, etc. Also, phosphate glasses typically have relatively low elastic moduli and may not be chemically durable to water and acids. In turn, both borate and phosphate glasses with high elastic moduli, besides the above-mentioned volatilization of boron oxide when melting, may also tend to undergo crystallization and/or liquid-liquid phase separation when cooling from the melt.

Traditional components of glasses known to provide high elastic moduli, such as zirconia ($ZrO_2$), titania ($TiO_2$), rare earth metal oxides, niobia ($Nb_2O_5$) etc., may have a limited solubility in borate and/or phosphate glasses and/or cause crystallization or liquid-liquid phase separation of the glass forming melts. Also, the traditional high-modulus components may increase the optical dispersion.

In view of these considerations, there is a need for silica-free glasses containing $P_2O_5$ and/or $B_2O_3$ as major glass formers, which exhibit high elastic moduli, low CTE, high thermal and compositional stability, and high chemical durability. Also, in some applications it may be desirable that the glasses have low optical dispersion.

SUMMARY

According to an embodiment of the present disclosure, a glass comprises a plurality of components, the glass having a composition of the components comprising greater than or equal to 0.3 mol. % and less than or equal to 50.0 mol. % $B_2O_3$, greater than or equal to 0.0 mol. % and less than or equal to 75.0 mol. % $P_2O_5$, greater than or equal to 0.5 mol. % and less than or equal to 15.0 mol. % MgO, greater than or equal to 0.0 mol. % and less than or equal to 30.0 mol. % $Al_2O_3$, greater than or equal to 0.0 mol. % and less than or equal to 1.0 mol. % $Cu_2O$+CuO, greater than or equal to 0.3 mol. % and less than or equal to 15.0 mol. % $R_2O$, greater than or equal to 0.0 at. % and less than or equal to 0.5 at. % F, greater than or equal to 15.0 mol. % and less than or equal to 75.0 mol. % $P_2O_5$+$B_2O_3$, greater than or equal to 0.8 mol. % and less than or equal to 15.0 mol. % $R_2O$+RO+$SnO_2$+$MnO_2$ and greater than or equal to 0.0 mol. % and less than or equal to 5.0 mol. % $TeO_2$+$GeO_2$, wherein the composition of the components is substantially free of $SiO_2$ and substantially free of PbO and wherein the composition of the components satisfies the conditions: $(Li_2O+Na_2O)/R_2O$ [mol. %]≥0.75, where chemical formulas mean the content of corresponding components in the glass, $R_2O$ is a total sum of monovalent metal oxides, and RO is a total sum of divalent metal oxides.

According to another embodiment of the present disclosure, a glass comprises a plurality of components, the glass having a composition of the components comprising greater than or equal to 40.0 mol. % and less than or equal to 75.0 mol. % $P_2O_5$, greater than or equal to 0.5 mol. % and less than or equal to 10.5 mol. % $B_2O_3$, greater than or equal to 0.0 mol. % and less than or equal to 25.0 mol. % $Al_2O_3$, greater than or equal to 0.0 mol. % and less than or equal to 0.5 mol. % $SiO_2$, greater than or equal to 0.0 at. % and less than or equal to 5.0 at. % F, greater than or equal to 0.5 mol. % $R_2O$+RO, greater than or equal to 0.0 mol. % and less than or equal to 9.5 mol. % $K_2O+Rb_2O+Cs_2O$ and greater than or equal to 0.0 mol. % and less than or equal to 0.5 mol. % ZnO+CuO+$Cu_2O$, wherein the composition of the components satisfies the conditions: $3*Al_2O_3+R_2O+RO-P_2O_5$ [mol. %]≥−7.0 and $Al_2O_3-R_2O-RO$ [mol. %]≥7.95.

According to one more embodiment of the present disclosure, a glass comprises a plurality of components, the glass having a composition of the components comprising greater than or equal to 40.0 mol. % and less than or equal to 75.0 mol. % $P_2O_5$, greater than or equal to 3.0 mol. % and less than or equal to 30.0 mol. % $Al_2O_3$, greater than or equal to 0.0 mol. % and less than or equal to 20.0 mol. % $Li_2O$, greater than or equal to 0.0 mol. % and less than or equal to 15.0 mol. % ZnO, greater than or equal to 0.0 mol. % and less than or equal to 15.0 mol. % $B_2O_3$, greater than or equal to 0.0 mol. % and less than or equal to 1.0 mol. % $SiO_2$, greater than or equal to 0.0 mol. % and less than or equal to 20.0 mol. % RO, greater than or equal to 0.0 at. % and less than or equal to 1.0 at. % F, greater than or equal to 0.5 mol. % and less than or equal to 20.0 mol. % $TiO_2+La_2O_3+Y_2O_3+Ce_2O_3+CeO_2+ZrO_2$, greater than or equal to 0.5 mol. % $R_2O+RO+B_2O_3$, greater than or equal to 0.0 mol. % and less than or equal to 28.0 mol. % $R_2O+RO$ and may optionally contain one or more components selected from $MnO_2$, $Nb_2O_5$, $SnO_2$, $Ta_2O_5$, $WO_3$, $Sc_2O_3$, $Pr_2O_3$, $PrO_2$, $Pr_6O_{11}$, $Nd_2O_3$, $Eu_2O_3$, EuO, $Gd_2O_3$, $GdO_2$, $Tb_2O_3$, $Dy_2O_3$, $Ho_2O_3$, $Er_2O_3$, $Tm_2O_3$, $Yb_2O_3$, $Lu_2O_3$ and $Sm_2O_3$, wherein the composition of the components is substantially free of Cu, Co, Cr and Ni, and the glass satisfies the condition: $P_E>75$, where $P_E$ is predicted value of Young's modulus, E [GPa], calculated from the glass composition in terms of mol. % of the components according to the Formula (II):

$$P_E=-0.27146*P_2O_5+0.96062*Al_2O_3+0.22431*B_2O_3-0.072878*BaO+0.35074*CaO+0.21526*(Ce_2O_3+CeO_2)-0.12628*Cu_2O-0.5807*K_2O+0.41579*La_2O_3+0.18714*Li_2O+0.20336*MgO+0.061862*MnO-0.057105*MnO_2-0.18615*Na_2O+0.64778*Nb_2O_5-0.35317*PbO-0.028357*SiO_2+0.17429*SnO+0.55551*SnO_2+0.8294*Ta_2O_5+0.60217*TiO_2+0.17356*WO_3+0.36256*Y_2O_3-0.19958*ZnO+0.7835*ZrO_2+0.46259*(RE_mO_n-La_2O_3-Y_2O_3-Ce_2O_3-CeO_2)+0.90549*(max(0,min(B_2O_3,P_2O_5-(3*Al_2O_3+3*RE_mO_n+R_2O+MgO+CaO))))+70, \quad (II)$$

where chemical formulas mean the content of corresponding components in the glass, RO is a total sum of divalent metal oxides, $R_2O$ is a total sum of monovalent metal oxides, and an asterisk (*) means multiplication.

These and other aspects, objects, and features of the present disclosure will be understood and appreciated by those skilled in the art upon studying the following specification, claims, and appended drawings.

DETAILED DESCRIPTION

Figure 1:
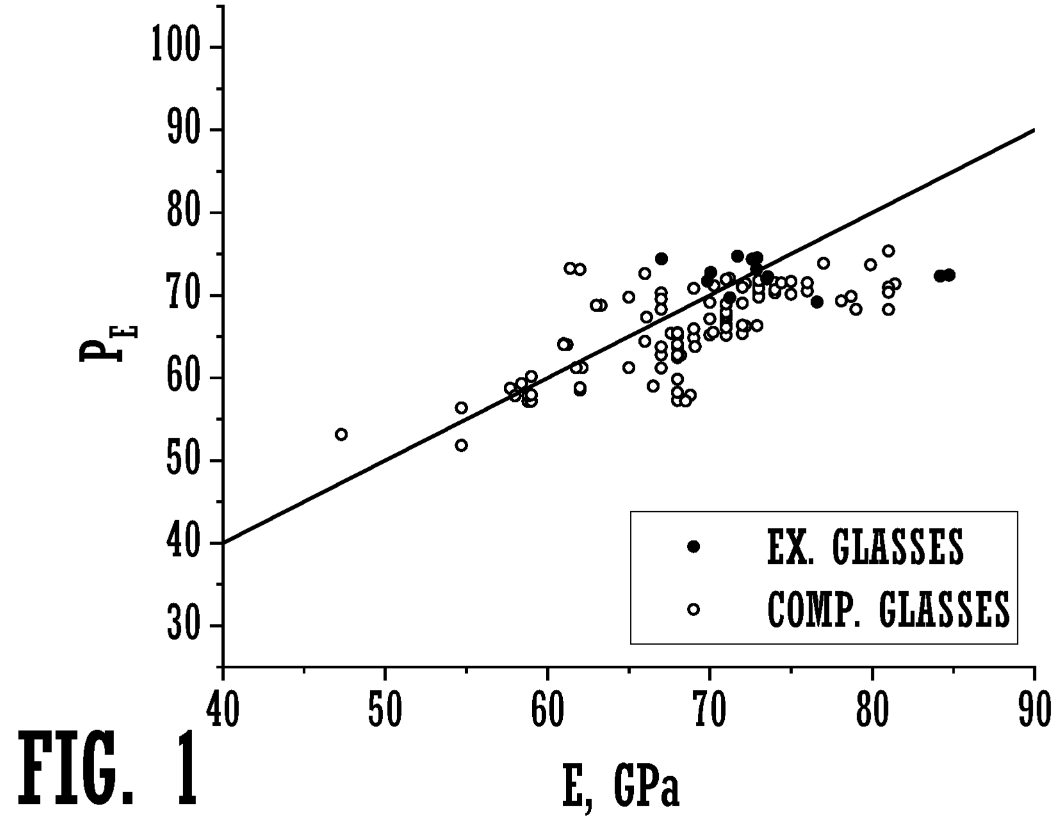
FIG. 1 is a plot illustrating the relationship between the Young's modulus E and the parameter $P_E$ calculated by formula (II) for some Comparative Glasses and some Exemplary Glasses according to an embodiment of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including, without limitation, matters of logic with respect to arrangement of steps or operational flow; plain meaning derived from grammatical organization or punctuation; the number or type of embodiments described in the specification.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those skilled in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "component" refers to a material or compound included in a batch composition from which a glass is formed. Components include oxides, including but not limited to those expressed in Formulas (I), and (II), and the claims. Representative components include $B_2O_3$, $P_2O_5$, $Al_2O_3$, CuO, $Cu_2O$, RO, $R_2O$, $SnO_2$, $MnO_2$, $RE_mO_n$, $SiO_2$, $Ta_2O_5$, ZnO, $WO_3$, $Nb_2O_5$, $TiO_2$, $ZrO_2$, $Bi_2O_3$, $TeO_2$, etc. Other representative components include halogens (e.g. F, Br, Cl). Whenever a component is included as a term in a mathematical expression or formula, it is understood that the component refers to the amount of the component in units of mol. % in the batch composition of the glass. For example, the expression "$B_2O_3$+$P_2O_5$" refers to the sum of the amount of $B_2O_3$ in units of mol. % and the amount of $P_2O_5$ in units of mol. % in the batch composition of the glass. A mathematical expression or formula is any expression or formula that includes a mathematical operator such as "+", "−", "*", "/", "min", or "max".

The term "formed from" can mean one or more of comprises, consists essentially of, or consists of. For example, a component that is formed from a particular material can comprise the particular material, consist essentially of the particular material, or consist of the particular material.

The terms "free" and "substantially free" are used interchangeably herein to refer to an amount and/or an absence of a particular component in a glass composition that is not intentionally added to the glass composition. It is understood that the glass composition may contain traces of a particular constituent component as a contaminant or a tramp in an amount of less than 0.10 mol. %.

As used herein, the term "tramp", when used to describe a particular constituent component in a glass composition, refers to a constituent component that is not intentionally added to the glass composition and is present in an amount of less than 0.10 mol. %. Tramp components may be unintentionally added to the glass composition as an impurity in another constituent component and/or through migration of the tramp component into the composition during processing of the glass composition.

Unless otherwise specified, the term "glass" is used to refer to a glass made from a glass composition disclosed herein.

The symbol "*" means multiplication when used in any formula herein.

The term "log" means logarithm in base 10.

Temperature is expressed herein in units of ° C. (degrees Celsius).

Viscosity is expressed herein in units of P (Poise).

The term "glass former" is used herein to refer to a component that, being solely present in the glass composition (i.e., without other components, except for tramps), is able to form a glass when cooling the melt at a rate of not greater than about 300° C./min.

The term "modifier", as used herein, refers to the oxides of monovalent or divalent metals, i.e., $R_2O$ or RO, where "R" stands for a cation. Modifiers can be added to a glass composition to change the atomic structure of the melt and the resulting glass. In some embodiments, the modifier may change the coordination numbers of cations present in the glass formers (e.g., boron in $B_2O_3$), which may result in forming a more polymerized atomic network and, as a result, may provide better glass formation.

As used herein, the term "RO" refers to a total content of divalent metal oxides (in mol. %), the term "$R_2O$" refers to a total content of monovalent metal oxides (in mol. %), and the term "$Alk_2O$" refers to a total content of alkali metal oxides (in mol. %). The term $R_2O$ encompasses alkali metal oxides ($Alk_2O$), in addition to other monovalent metal oxides, such as $Ag_2O$, $Tl_2O$, and $Hg_2O$, for example. As discussed below, in the present disclosure, a rare earth metal oxide is referred to herein by its normalized formula ($RE_2O_3$) in which the rare earth metal RE has the redox state "+3," and thus rare earth metal oxides are not encompassed by the term RO.

As used herein, the term "rare earth metals" refers to the metals listed in the Lanthanide Series of the IUPAC Periodic Table, plus yttrium and scandium. As used herein, the term "rare earth metal oxides," is used to refer to the oxides of rare earth metals in different redox states, such as "+3" for lanthanum in $La_2O_3$, "+4" for cerium in $CeO_2$, "+2" for europium in EuO, etc. In general, the redox states of rare earth metals in oxide glasses may vary and, in particular, the redox state may change during melting, based on the batch composition and/or the redox conditions in the furnace where the glass is melted and/or heat-treated (e.g., annealed). Unless otherwise specified, a rare earth metal oxide is referred to herein by its normalized formula in which the rare earth metal has the redox state "+3." Accordingly, in the case in which a rare earth metal having a redox state other than "+3" is added to the glass composition batch, the glass compositions are recalculated by adding or removing some oxygen to maintain the stoichiometry. For example, when $CeO_2$ (with cerium in redox state "+4") is used as a batch component, the resulting as-batched composition is recalculated assuming that two moles of $CeO_2$ is equivalent to one mole of $Ce_2O_3$, and the resulting as-batched composition is expressed in terms of $Ce_2O_3$. As used herein, the term "$RE_mO_n$" is used to refer to the total content of rare earth metal oxides in all redox states present, and the term "$RE_2O_3$" is used to refer to the total content (in mol. %) of rare earth metal oxides in the "+3" redox state, also specified as "trivalent equivalent".

Unless otherwise specified, all compositions are expressed in terms of as-batched mole percent (mol %). As will be understood by those having ordinary skill in the art, various melt constituents (e.g., fluorine, alkali metals, boron, etc.) may be subject to different levels of volatilization (e.g., as a function of vapor pressure, melt time and/or melt temperature) during melting of the constituents. As such, the term "about," in relation to such constituents, is intended to encompass values within about 0.2 mol % when measuring final articles as compared to the as-batched compositions provided herein. With the forgoing in mind, substantial compositional equivalence between final articles and as-batched compositions is expected. In some embodiments, where indicated, the compositions may be expressed in terms of as-batched percent by weight of oxides (wt %).

In the case when fluorine or other halogen (chlorine, bromine, and/or iodine) is added to or is present in an oxide glass, the molecular representation of the resulting glass composition may be expressed in different ways. In the present disclosure, the content of fluorine as a single term, when present, is expressed in terms of atomic percent (at. %), which is determined based on the fraction of fluorine in a total sum of all atoms in a glass composition multiplied by a factor of 100.

In the present disclosure, the following method of representation of fluorine-containing compositions and concentration ranges is used. The concentration limits for all oxides (e.g. $SiO_2$, $B_2O_3$, $Na_2O$, etc.) are presented under the assumption that the respective cations (such as, for example, silicon [$Si_4^+$], boron [$B_3^+$], sodium [$Na^+$], etc.) are initially presented in the form of the corresponding oxides. When fluorine is present, for the purposes of calculating the concentration of components of the composition, some part of the oxygen in the oxide is equivalently replaced with fluorine (i.e. one atom of oxygen is replaced with two atoms of fluorine). The said fluorine is assumed to be present in the form of fluorides, such as silicon fluoride ($SiF_4$), sodium fluoride (NaF) or others; accordingly, the total sum of all oxides and fluorides is assumed to be 100 mole percent or 100 weight percent in all compositions.

The measured density values for the glasses reported herein were measured at room temperature in units of g/cm$^3$ by Archimedes method in water with an error of 0.001 g/cm$^3$. As used herein, density measurements at room temperature (specified as $d_{RT}$) are indicated as being measured at 20° C. or 25° C., and encompass measurements obtained at temperatures that may range from 20° C. to 25° C. It is understood that room temperature may vary between about 20° C. to about 25° C., however, for the purposes of the present disclosure, the variation in density within the temperature range of 20° C. to 25° C. is expected to be less than the error of 0.001 g/cm$^3$, and thus is not expected to impact the room temperature density measurements reported herein.

As used herein, the term "refraction" refers to the relationship of the refractive index to the density according to the ratio: $(n_d-1)/d_{RT}$, where the refractive index $n_d$ is measured at 587.56 nm and the density $d_{RT}$ is measured in g/cm$^3$ at 25° C. The ratio $(n_d-1)/d_{RT}$, or refraction, may characterize the relationship between the refractive index $n_d$ and the density $d_{RT}$. The higher the refraction value, the higher the refractive index is at a given density.

The refractive index values reported herein were measured at room temperature (about 25° C.), unless otherwise specified. The refractive index values for a glass sample were measured using a Metricon Model 2010 prism coupler refractometer with an error of about ±0.0002. Using the Metricon, the refractive index of a glass sample was measured at two or more wavelengths of about 406 nm, 473 nm, 532 nm, 633 nm, 828 nm, and 1064 nm. The measured dependence characterizes the dispersion and was then fitted with a Cauchy's law equation or Sellmeier equation to allow for calculation of the refractive index of the sample at a given wavelength of interest between the measured wavelengths. The term "refractive index $n_d$" is used herein to refer to a refractive index calculated as described above at a wavelength of 587.56 nm, which corresponds to the helium d-line wavelength. The term "refractive index $n_C$" is used herein to refer to a refractive index calculated as described above at a wavelength of 656.3 nm. The term "refractive index $n_F$" is used herein to refer to a refractive index calculated as described above at a wavelength of 486.1 nm. The term "refractive index $n_g$" is used herein to refer to a refractive index calculated as described above at a wavelength of 435.8 nm.

The terms "dispersion" and "optical dispersion" are used interchangeably to refer to a difference or ratio of the refractive indices of a glass sample at predetermined wavelengths. One numerical measure of optical dispersion reported herein is the Abbe number, which can be calculated by the formula: $v_2=(n_x-1)/(n_F-n_C)$, where "x" in the present disclosure stands for one of the commonly used wavelengths (for example, 587.56 nm [d-line] for $v_d$ or 589.3 nm [D-line] for $v_D$), $n_x$ is the refractive index at this wavelength (for example, $n_d$ for $v_d$ and $n_D$ for $v_D$), and $n_F$ and $n_C$ are refractive indices at the wavelengths 486.1 nm (F-line) and 656.3 nm (C-line), respectively. The numerical values of $v_d$ and $v_D$ differ very slightly, mostly within ±0.1% to ±0.2%. As reported herein, the dispersion of a glass sample is represented by the Abbe number ($v_d$), which characterizes the relationship between the refractive indices of the sample at three different wavelengths according to the following formula: $v_d=(n_d-1)/(n_F-n_C)$, where $n_d$ is the refractive index at 587.56 nm (d-line), $n_F$ is the refractive index at 486.1 nm, and $n_C$ is the refractive index at 656.3 nm. A higher Abbe number corresponds to a lower optical dispersion.

The term "liquidus temperature" ($T_{Uq}$) is used herein to refer to a temperature above which the glass composition is completely liquid with no crystallization of constituent components of the glass.

The term "$\alpha$," or "$\alpha_{20-300}$," as used herein, refers to the average coefficient of linear thermal expansion (CTE) of the glass composition over a temperature range from 20° C. (room temperature, or RT) to 300° C. This property is measured by using a horizontal dilatometer (push-rod dilatometer) in accordance with ASTM E228-11. The numeric measure of $\alpha$ is a linear average value in a specified temperature range $\Delta T$ (e.g., RT to 300° C.) expressed as $\alpha=\Delta L/(L_0\Delta T)$, where $L_0$ is the linear size of a sample at some temperature within or near the measured range, and L is the change in the linear size ($\Delta L$) in the measured temperature range $\Delta T$.

The terms "modulus" and "elastic modulus" refer to Young's modulus. The Young's modulus (E) and the Poisson's ratio ($\mu$) are measured by using Resonant Ultrasound Spectroscopy, using a Quasar RUSpec 4000 available from ITW Indiana Private Limited, Magnaflux Division, or using Brillouin scattering method with 532 nm excitation.

The glass transition temperature ($T_g$) is measured by differential scanning calorimeter (DSC) at the heating rate of 10 K/min after cooling in air.

The term "softening point" ($T_{soft}$) refers to the temperature at which the viscosity of the glass composition is 1076 Poise.

The terms "strain point" and "Tstrain" refer to the temperature determined according to ASTM C598-93, at which the viscosity of a glass at a given glass composition is approximately $10^{14.7}$ Poise.

The term "liquidus viscosity" ($\eta_{iq}$) refers to the viscosity of the glass composition at the liquidus temperature of the glass composition.

The term "annealing point" (An.P.) as used herein, refers to the temperature determined according to ASTM C598-93(2013), at which the viscosity of a glass of a given glass composition is approximately $10^{13.2}$ Poise.

In the mathematical formulas used in the present disclosure, the term "min(A, B)" means the lesser of the values A and B, and the term "max(A, B) means the greater of the quantities A and B, where "A" and "B" may be any quantities (concentrations of components, values of properties, etc.) The term "abs(X)" means absolute value of a quantity X (without sign).

Glass composition may include phosphorus oxide ($P_2O_5$). In the glasses of the present disclosure, phosphorus oxide plays a role of a major glass former, which forms the continuous atomic structure and, therefore, allows the melts to vitrify. Also, phosphorus oxide provides low optical dispersion, which may be important when using the glasses in laser optics. However, when the content of $P_2O_5$ becomes very high, some undesirable effects appear, such as low compositional stability (due to volatilization of $P_2O_5$ when melting and absorption of water from the furnace atmosphere), low chemical durability (up to being completely soluble), etc. Accordingly, the content of phosphorus oxide is preferably limited. In embodiments, the glass composition may contain phosphorus oxide ($P_2O_5$) in an amount from greater than or equal to 0.0 mol. % to less than or equal to 80.0 mol. % and all ranges and sub-ranges between the foregoing values. In some embodiments, the glass composition may contain $P_2O_5$ in an amount greater than or equal to 0.0 mol. %, greater than or equal to 10.0 mol. %, greater than or equal to 30.0 mol. %, greater than or equal to 40.0 mol. %, greater than or equal to 45.0 mol. %, greater than or equal to 48.0 mol. %, greater than or equal to 50.0 mol. %, greater than or equal to 53.5 mol. %, greater than or equal to 57.5 mol. %, greater than or equal to 58.0 mol. %, greater than or equal to 60.0 mol. %, or greater than or equal to 70.0 mol. %. In some other embodiments, the glass composition may contain $P_2O_5$ in an amount less than or equal to 80.0 mol. %, less than or equal to 75.0 mol. %, less than or equal to 70.0 mol. %, less than or equal to 68.0 mol. %, less than or equal to 66.0 mol. %, less than or equal to 65.1 mol. %, less than or equal to 60.0 mol. %, less than or equal to 50.0 mol. %, or less than or equal to 10.0 mol. %. In some more embodiments, the glass composition may contain $P_2O_5$ in an amount greater than or equal to 0.0 mol. % and less than or equal to 80.0 mol. %, greater than or equal to 0.0 mol. % and less than or equal to 75.0 mol. %, greater than or equal to 30.0 mol. % and less than or equal to 80.0 mol. %, greater than or equal to 40.0 mol. % and less than or equal to 75.0 mol. %, greater than or equal to 45.0 mol. % and less than or equal to 75.0 mol. %, greater than or equal to 48.0 mol. % and less than or equal to 80.0 mol. %, greater than or equal to 50.0 mol. % and less than or equal to 70.0 mol. %, greater than or equal to 53.5 mol. % and less than or equal to 66.0 mol. %, greater than or equal to 57.48 mol. % and less than or equal to 65.1 mol. %, greater than or equal to 58.0 mol. % and less than or equal to 66.0 mol. %, greater than or equal to 60.0 mol. % and less than or equal to 68.0 mol. %, greater than or equal to 0.0 mol. % and less than or equal to 10.0 mol. %, greater than or equal to 10.0 mol. % and less than or equal to 50.0 mol. %, greater than or equal to 40.0 mol. % and less than or equal to 50.0 mol. %, greater than or equal to 50.0 mol. % and less than or equal to 60.0 mol. %.

Glass composition may include boron oxide ($B_2O_3$). Boron oxide can be added to the glass composition as a secondary glass former to increase the viscosity, chemical durability and elastic moduli of the phosphate glasses, without significantly affecting their CTE. Also, boron oxide provides low optical dispersion, which may be important when using the glasses in laser optics. However, when added in high concentrations, $B_2O_3$ may possibly cause liquid-liquid phase separation of the glass forming melts, which, in turn, may cause further crystallization of one or more phases. Also, the effect of $B_2O_3$ on the elastic moduli is nonlinear, and at high concentrations it may not increase, but, rather, decrease the elastic moduli. Accordingly, the content of boron oxide is preferably limited, or glass compositions may be substantially free of $B_2O_3$. In embodiments, the glass composition may contain boron oxide ($B_2O_3$) in an amount from greater than or equal to 0.0 mol. % to less than or equal to 50.0 mol. % and all ranges and sub-ranges between the foregoing values. In some embodiments, the glass composition may contain $B_2O_3$ in an amount greater than or equal to 0.0 mol. %, greater than or equal to 0.3 mol. %, greater than or equal to 0.5 mol. %, greater than or equal to 1.5 mol. %, greater than or equal to 2.0 mol. %, greater than or equal to 10.0 mol. %, greater than or equal to 25.0 mol. %, greater than or equal to 35.0 mol. %, greater than or equal to 40.0 mol. %, or greater than or equal to 45.0 mol. %. In some other embodiments, the glass composition may contain $B_2O_3$ in an amount less than or equal to 50.0 mol. %, less than or equal to 45.0 mol. %, less than or equal to 40.0 mol. %, less than or equal to 35.0 mol. %, less than or equal to 30.0 mol. %, less than or equal to 25.0 mol. %, less than or equal to 15.0 mol. %, less than or equal to 12.0 mol. %, less than or equal to 10.0 mol. %, less than or equal to 8.0 mol. %, or less than or equal to 7.75 mol. %. In some more embodiments, the glass composition may contain $B_2O_3$ in an amount greater than or equal to 0.0 mol. % and less than or equal to 15.0 mol. %, greater than or equal to 0.0 mol. % and less than or equal to 10.0 mol. %, greater than or equal to 0.5 mol. % and less than or equal to 10.5 mol. %, greater than or equal to 0.3 mol. % and less than or equal to 50.0 mol. %, greater than or equal to 0.3 mol. % and less than or equal to 12.0 mol. %, greater than or equal to 0.5 mol. % and less than or equal to 30.0 mol. %, greater than or equal to 0.5 mol. % and less than or equal to 8.0 mol. %, greater than or equal to 1.5 mol. % and less than or equal to 7.75 mol. %, greater than or equal to 2.01 mol. % and less than or equal to 7.94 mol. %, greater than or equal to 0.0 mol. % and less than or equal to 50.0 mol. %, greater than or equal to 0.0 mol. % and less than or equal to 7.75 mol. %, greater than or equal to 0.3 mol. % and less than or equal to 7.75 mol. %, greater than or equal to 0.5 mol. % and less than or equal to 7.75 mol. %, greater than or equal to 1.5 mol. % and less than or equal to 50.0 mol. %, greater than or equal to 2.0 mol. % and less than or equal to 50.0 mol. %, greater than or equal to 2.0 mol. % and less than or equal to 7.75 mol. %, greater than or equal to 25.0 mol. % and less than or equal to 50.0 mol. %.

Glass composition may include monovalent metal oxides ($R_2O$). Monovalent metal oxides, such as alkali metal oxides ($Li_2O$, $Na_2O$, $K_2O$, $Rb_2O$ and $Cs_2O$), silver oxide ($Ag_2O$), copper oxide ($Cu_2O$) and others can be added to the glass compositions to improve the thermal stability and chemical durability and reduce volatilization of $P_2O_5$ when melting, allowing to batch more $P_2O_5$ with solid materials like, for example, monovalent metal metaphosphates ($RPO_3$ where "R" refers to a metal cation). However, most of monovalent metal oxides either provide relatively low elastic moduli (except for $Li_2O$), or provide high CTE (except for $Cu_2O$), or both. Accordingly, the content of monovalent metal oxides is preferably limited, or glass compositions may be substantially free of $R_2O$.

In some embodiments, the glass composition may contain monovalent metal oxides $R_2O$ in an amount greater than or equal to 0.3 mol. %, greater than or equal to 10.0 mol. %, or greater than or equal to 20.0 mol. %. In some other embodiments, the glass composition may contain monovalent metal oxides $R_2O$ in an amount less than or equal to 28.0 mol. %, less than or equal to 20.0 mol. %, less than or equal to 15.0 mol. %, or less than or equal to 10.0 mol. %. In some more embodiments, the glass composition may contain $R_2O$ in an amount greater than or equal to 0.3 mol. % and less than or equal to 15.0 mol. %, greater than or equal to 0.3 mol. % and less than or equal to 28.0 mol. %, greater than or equal to 0.3 mol. % and less than or equal to 20.0 mol. %, or greater than or equal to 0.3 mol. % and less than or equal to 10.0 mol. %, greater than or equal to 10.0 mol. % and less than or equal to 28.0 mol. %, greater than or equal to 10.0 mol. % and less than or equal to 20.0 mol. %, or greater than or equal to 10.0 mol. % and less than or equal to 15.0 mol. %.

Glass composition may include lithium oxide ($Li_2O$). Lithium oxide can be added to the glass compositions to increase the elastic moduli. Also, adding $Li_2O$ may increase the solubility of other high-modulus components, such as, for example, $TiO_2$, $Nb_2O_5$, rare earth metal oxides and others, in the glass forming melts. However, at high concentrations, $Li_2O$ may decrease the high-temperature viscosity, which may cause devitrification of the glass forming melts. Also, $Li_2O$ provides a rather high CTE, which may cause wrapping or breakage of the glass articles because of high thermal stresses. Accordingly, the content of lithium oxide is preferably limited, or glass compositions may be substantially free of $Li_2O$. In embodiments, the glass composition may contain lithium oxide ($Li_2O$) in an amount from greater than or equal to 0.0 mol. % to less than or equal to 20.0 mol. % and all ranges and sub-ranges between the foregoing values. In some embodiments, the glass composition may contain $Li_2O$ in an amount greater than or equal to 0.0 mol. %, greater than or equal to 2.0 mol. %, greater than or equal to 5.0 mol. %, greater than or equal to 10.0 mol. %, greater than or equal to 14.0 mol. %, greater than or equal to 16.0 mol. %, or greater than or equal to 18.0 mol. %. In some other embodiments, the glass composition may contain $Li_2O$ in an amount less than or equal to 20.0 mol. %, less than or equal to 18.0 mol. %, less than or equal to 16.0 mol. %, less than or equal to 15.0 mol. %, less than or equal to 14.0 mol. %, less than or equal to 10.0 mol. %, less than or equal to 9.0 mol. %, less than or equal to 8.0 mol. %, less than or equal to 7.0 mol. %, or less than or equal to 5.0 mol. %. In some more embodiments, the glass composition may contain $Li_2O$ in an amount greater than or equal to 0.0 mol. % and less than or equal to 20.0 mol. %, greater than or equal to 0.0 mol. % and less than or equal to 15.0 mol. %, greater than or equal to 0.0 mol. % and less than or equal to 14.0 mol. %, greater than or equal to 0.0 mol. % and less than or equal to 10.0 mol. %, greater than or equal to 0.0 mol. % and less than or equal to 9.0 mol. %, greater than or equal to 0.0 mol. % and less than or equal to 8.0 mol. %, greater than or equal to 1.87 mol. % and less than or equal to 7.49 mol. %, greater than or equal to 0.0 mol. % and less than or equal to 5.0 mol. %, greater than or equal to 2.0 mol. % and less than or equal to 5.0 mol. %, greater than or equal to 10.0 mol. % and less than or equal to 20.0 mol. %, greater than or equal to 14.0 mol. % and less than or equal to 15.0 mol. %.

Glass composition may include sodium oxide ($Na_2O$). Sodium oxide can be added to the glass compositions to improve the chemical durability to alkalis and acids. Also, addition of $Na_2O$ may increase the solubility of high-modulus components, such as, for example, $TiO_2$, $Nb_2O_5$, rare earth metal oxides and others. In the presence of $B_2O_3$, the addition of $Na_2O$ may also indirectly increase the impact of $B_2O_3$ on the elastic moduli due to a transition of boron cations from trifold to fourfold coordination. However, $Na_2O$ provides high CTE, which may increase the thermal stresses. Also, sodium oxide, especially when a glass composition does not contain $B_2O_3$, provides relatively low elastic modulus. Accordingly, the content of sodium oxide is preferably limited, or glass compositions may be substantially free of $Na_2O$. In embodiments, the glass composition may contain sodium oxide ($Na_2O$) in an amount from greater than or equal to 0.0 mol. % to less than or equal to 10.0 mol. % and all ranges and sub-ranges between the foregoing values. In some embodiments, the glass composition may contain $Na_2O$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $Na_2O$ in an amount less than or equal to 10.0 mol. %, less than or equal to 9.0 mol. %, less than or equal to 8.0 mol. %, less than or equal to 7.0 mol. %, less than or equal to 5.0 mol. %, or less than or equal to 4.0 mol. %. In some more embodiments, the glass composition may contain $Na_2O$ in an amount greater than or equal to 0.0 mol. % and less than or equal to 10.0 mol. %, greater than or equal to 0.0 mol. % and less than or equal to 9.0 mol. %, greater than or equal to 0.0 mol. % and less than or equal to 8.0 mol. %, greater than or equal to 0.02 mol. % and less than or equal to 3.54 mol. %, greater than or equal to 0.0 mol. % and less than or equal to 4.0 mol. %, greater than or equal to 5.0 mol. % and less than or equal to 10.0 mol. %, greater than or equal to 5.0 mol. % and less than or equal to 7.0 mol. %, greater than or equal to 7.0 mol. % and less than or equal to 10.0 mol. %, greater than or equal to 7.0 mol. % and less than or equal to 8.0 mol. %, greater than or equal to 8.0 mol. % and less than or equal to 10.0 mol. %, greater than or equal to 8.0 mol. % and less than or equal to 9.0 mol. %.

Glass composition may include potassium oxide ($K_2O$). Potassium oxide can be added to the glass compositions to improve thermal stability and chemical durability. However, $K_2O$ provides low elastic modulus and high CTE. Accordingly, the content of potassium oxide is preferably limited, or glass compositions may be substantially free of $K_2O$. In embodiments, the glass composition may contain potassium oxide ($K_2O$) in an amount from greater than or equal to 0.0 mol. % to less than or equal to 5.0 mol. % and all ranges and sub-ranges between the foregoing values. In some other embodiments, the glass composition may contain $K_2O$ in an amount less than or equal to 5.0 mol. %, less than or equal to 9.0 mol. %, less than or equal to 8.0 mol. %, less than or equal to 5.0 mol. %, less than or equal to 2.5 mol. %, or less than or equal to 0.99 mol. %. In some more embodiments, the glass composition may contain $K_2O$ in an amount greater than or equal to 0.0 mol. % and less than or equal to 10.0 mol. %, greater than or equal to 0.0 mol. % and less than or equal to 9.0 mol. %, greater than or equal to 0.0 mol. % and less than or equal to 8.0 mol. %, greater than or equal to 0.0 mol. % and less than or equal to 5.0 mol. %, greater than or equal to 0.0 mol. % and less than or equal to 1.0 mol. %, greater than or equal to 0.02 mol. % and less than or equal to 0.99 mol. %, greater than or equal to 0.0 mol. % and less than or equal to 0.99 mol. %.

Glass composition may include divalent metal oxides (RO). Divalent metal oxides, such as alkaline earth metal oxides (BeO, MgO, CaO, SrO and BaO), zinc oxide (ZnO), manganese oxide (MnO), cadmium oxide (CdO) and others can be added to the glass composition for better thermal stability and chemical durability. Also, their addition can increase the solubility of high-modulus components, such as titania ($TiO_2$), rare earth metal oxides ($RE_mO_n$) and others. However, when added in high concentrations, divalent metal oxides can increase the liquidus temperature of the glass and/or decrease the high-temperature viscosity, which may cause crystallization of the glass forming melts when forming and cooling glass articles. Accordingly, the content of divalent metal oxides is preferably limited, or glass compositions may be substantially free of RO.

In some embodiments, the glass composition may contain divalent metal oxides RO in an amount greater than or equal to 0.0 mol. %, greater than or equal to 10.0 mol. %, or greater than or equal to 20.0 mol. %. In some other embodiments, the glass composition may contain divalent metal oxides RO in an amount less than or equal to 25.0 mol. %, less than or equal to 20.0 mol. %, less than or equal to 15.0 mol. %, or less than or equal to 10.0 mol. %. In some more embodiments, the glass composition may contain RO in an amount greater than or equal to 0.0 mol. % and less than or equal to 25.0 mol. %, greater than or equal to 0.0 mol. % and less than or equal to 20.0 mol. %, greater than or equal to 0.0 mol. % and less than or equal to 15.0 mol. %, or greater than or equal to 0.0 mol. % and less than or equal to 10.0 mol. %, greater than or equal to 10.0 mol. % and less than or equal to 25.0 mol. %, greater than or equal to 10.0 mol. % and less than or equal to 20.0 mol. %, or greater than or equal to 10.0 mol. % and less than or equal to 15.0 mol. %.

Glass composition may include magnesia (MgO). Magnesia can be added to the glass compositions to increase the elastic modulus. However, at high concentrations MgO can cause precipitation of the refractory minerals, such as magnesium phosphate $Mg_3P_2O_8$, magnesium aluminate $MgAl_2O_4$, magnesium titanate $MgTiO_3$ and others, at high temperatures, which may cause devitrification of the glass forming melts. Accordingly, the content of magnesia is preferably limited, or glass compositions may be substantially free of MgO. In embodiments, the glass composition may contain magnesia (MgO) in an amount from greater than or equal to 0.0 mol. % to less than or equal to 20.0 mol. % and all ranges and sub-ranges between the foregoing values. In some embodiments, the glass composition may contain MgO in an amount greater than or equal to 0.0 mol. %, greater than or equal to 0.5 mol. %, greater than or equal to 0.75 mol. %, greater than or equal to 1.5 mol. %, greater than or equal to 2.0 mol. %, greater than or equal to 5.0 mol. %, greater than or equal to 10.0 mol. %, greater than or equal to 14.0 mol. %, greater than or equal to 16.0 mol. %, or greater than or equal to 18.0 mol. %. In some other embodiments, the glass composition may contain MgO in an amount less than or equal to 20.0 mol. %, less than or equal to 18.0 mol. %, less than or equal to 16.0 mol. %, less than or equal to 15.0 mol. %, less than or equal to 14.0 mol. %, less than or equal to 10.0 mol. %, less than or equal to 7.25 mol. %, less than or equal to 7.0 mol. %, less than or equal to 6.25 mol. %, or less than or equal to 5.0 mol. %. In some more embodiments, the glass composition may contain MgO in an amount greater than or equal to 0.0 mol. % and less than or equal to 20.0 mol. %, greater than or equal to 0.0 mol. % and less than or equal to 10.0 mol. %, greater than or equal to 0.5 mol. % and less than or equal to 15.0 mol. %, greater than or equal to 0.75 mol. % and less than or equal to 7.25 mol. %, greater than or equal to 1.5 mol. % and less than or equal to 6.25 mol. %, greater than or equal to 2.33 mol. % and less than or equal to 6.55 mol. %, greater than or equal to 0.0 mol. % and less than or equal to 5.0 mol. %, greater than or equal to 0.5 mol. % and less than or equal to 20.0 mol. %, greater than or equal to 0.5 mol. % and less than or equal to 5.0 mol. %, greater than or equal to 0.75 mol. % and less than or equal to 20.0 mol. %, greater than or equal to 2.0 mol. % and less than or equal to 5.0 mol. %.

Glass composition may include zinc oxide (ZnO). In embodiments, the glass composition may contain zinc oxide (ZnO) in an amount from greater than or equal to 0.0 mol. % to less than or equal to 15.0 mol. % and all ranges and sub-ranges between the foregoing values. In some embodiments, the glass composition may contain ZnO in an amount greater than or equal to 0.0 mol. %, greater than or equal to 5.0 mol. %, greater than or equal to 9.0 mol. %, greater than or equal to 10.0 mol. %, greater than or equal to 11.0 mol. %, or greater than or equal to 13.0 mol. %. In some other embodiments, the glass composition may contain ZnO in an amount less than or equal to 15.0 mol. %, less than or equal to 13.0 mol. %, less than or equal to 11.0 mol. %, less than or equal to 10.0 mol. %, less than or equal to 9.0 mol. %, or less than or equal to 5.0 mol. %. In some more embodiments, the glass composition may contain ZnO in an amount greater than or equal to 0.0 mol. % and less than or equal to 15.0 mol. %, greater than or equal to 0.0 mol. % and less than or equal to 5.0 mol. %, greater than or equal to 5.0 mol. % and less than or equal to 15.0 mol. %, greater than or equal to 5.0 mol. % and less than or equal to 9.0 mol. %, greater than or equal to 9.0 mol. % and less than or equal to 15.0 mol. %, greater than or equal to 9.0 mol. % and less than or equal to 10.0 mol. %, greater than or equal to 10.0 mol. % and less than or equal to 15.0 mol. %, greater than or equal to 10.0 mol. % and less than or equal to 11.0 mol. %, greater than or equal to 11.0 mol. % and less than or equal to 15.0 mol. %, greater than or equal to 11.0 mol. % and less than or equal to 13.0 mol. %.

Glass composition may include calcium oxide (CaO). Calcium oxide can be added to the glass compositions to increase the elastic modulus and improve chemical durability to alkalis and acids. Also, adding CaO can increase the solubility of other high-modulus components ($TiO_2$, $La_2O_3$, $Nb_2O_5$ and others) in the glass forming melts. However, when added in high concentrations, CaO can cause crystallization of refractory minerals (calcium phosphate $Ca_3P_2O_8$, calcium titanate $CaTiO_3$, calcium aluminate $CaAl_2O_4$ and others) at high temperatures, which may cause devitrification of the glass forming melts. Accordingly, the content of calcium oxide is preferably limited, or glass compositions may be substantially free of CaO. In embodiments, the glass composition may contain calcium oxide (CaO) in an amount from greater than or equal to 0.0 mol. % to less than or equal to 10.0 mol. % and all ranges and sub-ranges between the foregoing values. In some embodiments, the glass composition may contain CaO in an amount greater than or equal to 0.0 mol. %, or greater than or equal to 5.0 mol. %. In some other embodiments, the glass composition may contain CaO in an amount less than or equal to 10.0 mol. %, less than or equal to 5.0 mol. %, less than or equal to 4.0 mol. %, less than or equal to 3.4 mol. %, or less than or equal to 0.6 mol. %. In some more embodiments, the glass composition may contain CaO in an amount greater than or equal to 0.0 mol. % and less than or equal to 10.0 mol. %, greater than or equal to 0.0 mol. % and less than or equal to 4.0 mol. %, greater than or equal to 0.0 mol. % and less than or equal to 3.4 mol. %, greater than or equal to 0.02 mol. % and less than or equal to 0.6 mol. %, greater than or equal to 0.0 mol. % and less than or equal to 0.6 mol. %.

Glass composition may include lead oxide (PbO). Lead oxide can be added to the glass compositions for better thermal stability. However, it provides low elastic modulus and relatively high CTE. Also, PbO may raise environmental concerns. Accordingly, the content of lead oxide is preferably limited, or glass compositions may be substantially free of PbO. In embodiments, the glass composition may contain lead oxide (PbO) in an amount from greater than or equal to 0.0 mol. % to less than or equal to 5.0 mol. % and all ranges and sub-ranges between the foregoing values. In some other embodiments, the glass composition may contain PbO in an amount less than or equal to 5.0 mol. %, less than or equal to 2.5 mol. %, or less than or equal to 0.1 mol. %. In some more embodiments, the glass composition may contain PbO in an amount greater than or equal to 0.0 mol. % and less than or equal to 0.1 mol. %, greater than or equal to 0.0 mol. % and less than or equal to 5.0 mol. %.

Glass composition may include $Cu_2O$+CuO ($Cu_2O$+CuO). Copper oxides can be added in the glass compositions in small amounts to decrease the CTE. However, copper oxides adversely decrease the Young's modulus and also may provide undesirable coloring. Accordingly, the content of $Cu_2O$+CuO is preferably limited, or glass compositions may be substantially free of copper oxides. In embodiments, the glass composition may contain $Cu_2O$+CuO in an amount from greater than or equal to 0.0 mol. % to less than or equal to 5.0 mol. % and all ranges and sub-ranges between the foregoing values. In some other embodiments, the glass composition may contain $Cu_2O$+CuO in an amount less than or equal to 5.0 mol. %, less than or equal to 2.5 mol. %, or less than or equal to 1.0 mol. %. In some more embodiments, the glass composition may contain $Cu_2O$+CuO in an amount greater than or equal to 0.0 mol. % and less than or equal to 1.0 mol. %, greater than or equal to 0.0 mol. % and less than or equal to 5.0 mol. %.

Glass composition may include silica ($SiO_2$). In glasses of the present disclosure, silica can be added as a secondary glass former in the case when high durability to hydrofluoric acid (HF) and its vapor is not required. However, adding silica to phosphate glasses may cause liquid-liquid phase separation and further devitrification. Also, in the cases when durability to HF or its vapor is demanded, addition of $SiO_2$ is undesirable because of the leaching of silicon in the form of $SiF_4$ and surface degradation. Accordingly, the content of silica is preferably limited, or glass compositions may be substantially free of $SiO_2$. In embodiments, the glass composition may contain silica ($SiO_2$) in an amount from greater than or equal to 0.0 mol. % to less than or equal to 5.0 mol. % and all ranges and sub-ranges between the foregoing values. In some other embodiments, the glass composition may contain $SiO_2$ in an amount less than or equal to 5.0 mol. %, less than or equal to 3.0 mol. %, less than or equal to 2.5 mol. %, less than or equal to 1.0 mol. %, less than or equal to 0.2 mol. %, or less than or equal to 0.1 mol. %. In some more embodiments, the glass composition may contain $SiO_2$ in an amount greater than or equal to 0.0 mol. % and less than or equal to 3.0 mol. %, greater than or equal to 0.0 mol. % and less than or equal to 1.0 mol. %, greater than or equal to 0.0 mol. % and less than or equal to 0.5 mol. %, greater than or equal to 0.0 mol. % and less than or equal to 0.2 mol. %, greater than or equal to 0.0 mol. % and less than or equal to 0.1 mol. %, greater than or equal to 0.0 mol. % and less than or equal to 5.0 mol. %.

Glass composition may include tungsten oxide ($WO_3$). In embodiments, the glass composition may contain tungsten oxide ($WO_3$) in an amount from greater than or equal to 0.0 mol. % to less than or equal to 29.0 mol. % and all ranges and sub-ranges between the foregoing values. In some embodiments, the glass composition may contain $WO_3$ in an amount greater than or equal to 0.0 mol. %, greater than or equal to 10.0 mol. %, greater than or equal to 19.5 mol. %, or greater than or equal to 20.0 mol. %. In some other embodiments, the glass composition may contain $WO_3$ in an amount less than or equal to 29.0 mol. %, less than or equal to 20.6 mol. %, less than or equal to 20.0 mol. %, or less than or equal to 10.0 mol. %. In some more embodiments, the glass composition may contain $WO_3$ in an amount greater than or equal to 0.0 mol. % and less than or equal to 20.0 mol. %, greater than or equal to 19.5 mol. % and less than or equal to 20.55 mol. %, greater than or equal to 0.0 mol. % and less than or equal to 29.0 mol. %, greater than or equal to 0.0 mol. % and less than or equal to 10.0 mol. %, greater than or equal to 10.0 mol. % and less than or equal to 29.0 mol. %, greater than or equal to 10.0 mol. % and less than or equal to 20.0 mol. %, greater than or equal to 19.5 mol. % and less than or equal to 29.0 mol. %, greater than or equal to 19.5 mol. % and less than or equal to 20.0 mol. %.

Glass composition may include niobia ($Nb_2O_5$). In embodiments, the glass composition may contain niobia ($Nb_2O_5$) in an amount from greater than or equal to 0.0 mol. % to less than or equal to 24.0 mol. % and all ranges and sub-ranges between the foregoing values. In some embodiments, the glass composition may contain $Nb_2O_5$ in an amount greater than or equal to 0.0 mol. %, greater than or equal to 10.0 mol. %, greater than or equal to 15.7 mol. %, or greater than or equal to 20.0 mol. %. In some other embodiments, the glass composition may contain $Nb_2O_5$ in an amount less than or equal to 24.0 mol. %, less than or equal to 20.0 mol. %, less than or equal to 16.8 mol. %, or less than or equal to 10.0 mol. %. In some more embodiments, the glass composition may contain $Nb_2O_5$ in an amount greater than or equal to 0.0 mol. % and less than or equal to 20.0 mol. %, greater than or equal to 15.7 mol. % and less than or equal to 16.75 mol. %, greater than or equal to 0.0 mol. % and less than or equal to 24.0 mol. %, greater than or equal to 0.0 mol. % and less than or equal to 10.0 mol. %, greater than or equal to 10.0 mol. % and less than or equal to 24.0 mol. %, greater than or equal to 10.0 mol. % and less than or equal to 16.8 mol. %, greater than or equal to 15.7 mol. % and less than or equal to 24.0 mol. %, greater than or equal to 15.7 mol. % and less than or equal to 16.8 mol. %.

Glass composition may include yttria ($Y_2O_3$). In the glasses of the present disclosure, yttria and other rare earth metal oxides ($La_2O_3$, $CeO_2$ and others), increase elastic modulus. However, when added at high concentrations, yttria may cause crystallization of the glass forming melts because of precipitation of the refractory minerals, such as, for example, yttrium phosphate ($YPO_4$), yttrium aluminate ($Y_3Al_5O_{12}$) and others. Also, yttria is more expensive than $La_2O_3$ and $CeO_2$. Accordingly, the content of yttria is preferably limited, or glass compositions may be substantially free of $Y_2O_3$. In embodiments, the glass composition may contain yttria ($Y_2O_3$) in an amount from greater than or equal to 0.0 mol. % to less than or equal to 20.0 mol. % and all ranges and sub-ranges between the foregoing values. In some embodiments, the glass composition may contain $Y_2O_3$ in an amount greater than or equal to 0.0 mol. %, greater than or equal to 1.0 mol. %, greater than or equal to 5.0 mol. %, greater than or equal to 10.0 mol. %, greater than or equal to 14.0 mol. %, greater than or equal to 16.0 mol. %, or greater than or equal to 18.0 mol. %. In some other embodiments, the glass composition may contain $Y_2O_3$ in an amount less than or equal to 20.0 mol. %, less than or equal to 18.0 mol. %, less than or equal to 16.0 mol. %, less than or equal to 14.0 mol. %, less than or equal to 10.0 mol. %, less than or equal to 7.5 mol. %, less than or equal to 6.0 mol. %, less than or equal to 5.5 mol. %, less than or equal to 5.0 mol. %, or less than or equal to 4.75 mol. %. In some more embodiments, the glass composition may contain $Y_2O_3$ in an amount greater than or equal to 0.0 mol. % and less than or equal to 7.5 mol. %, greater than or equal to 0.0 mol. % and less than or equal to 6.0 mol. %, greater than or equal to 0.0 mol. % and less than or equal to 5.5 mol. %, greater than or equal to 0.0 mol. % and less than or equal to 4.75 mol. %, greater than or equal to 0.9 mol. % and less than or equal to 4.79 mol. %, greater than or equal to 0.0 mol. % and less than or equal to 20.0 mol. %, greater than or equal to 1.0 mol. % and less than or equal to 20.0 mol. %, greater than or equal to 1.0 mol. % and less than or equal to 4.75 mol. %, greater than or equal to 10.0 mol. % and less than or equal to 14.0 mol. %, greater than or equal to 14.0 mol. % and less than or equal to 16.0 mol. %.

Glass composition may include zirconia ($ZrO_2$). Zirconia, like titania, can be added to the glass compositions to increase the elastic modulus, at the same time increasing the high-temperature viscosity and decreasing CTE. However, when being added at high concentrations, especially in the absence of $La_2O_3$ and $B_2O_3$, zirconia may precipitate from the glass forming melts, causing their devitrification. Accordingly, the content of zirconia is preferably limited, or glass compositions may be substantially free of $ZrO_2$. In embodiments, the glass composition may contain zirconia ($ZrO_2$) in an amount from greater than or equal to 0.0 mol. % to less than or equal to 20.0 mol. % and all ranges and sub-ranges between the foregoing values. In some embodiments, the glass composition may contain $ZrO_2$ in an amount greater than or equal to 0.0 mol. %, greater than or equal to 1.0 mol. %, greater than or equal to 5.0 mol. %, greater than or equal to 10.0 mol. %, greater than or equal to 14.0 mol. %, greater than or equal to 16.0 mol. %, or greater than or equal to 18.0 mol. %. In some other embodiments, the glass composition may contain $ZrO_2$ in an amount less than or equal to 20.0 mol. %, less than or equal to 18.0 mol. %, less than or equal to 16.0 mol. %, less than or equal to 14.0 mol. %, less than or equal to 10.0 mol. %, less than or equal to 7.5 mol. %, less than or equal to 7.0 mol. %, less than or equal to 5.0 mol. %, less than or equal to 4.0 mol. %, less than or equal to 3.6 mol. %, or less than or equal to 3.2 mol. %. In some more embodiments, the glass composition may contain $ZrO_2$ in an amount greater than or equal to 0.0 mol. % and less than or equal to 7.5 mol. %, greater than or equal to 0.0 mol. % and less than or equal to 4.0 mol. %, greater than or equal to 0.0 mol. % and less than or equal to 3.6 mol. %, greater than or equal to 0.0 mol. % and less than or equal to 3.2 mol. %, greater than or equal to 0.67 mol. % and less than or equal to 7.01 mol. %, greater than or equal to 0.0 mol. % and less than or equal to 20.0 mol. %, greater than or equal to 1.0 mol. % and less than or equal to 3.2 mol. %, greater than or equal to 5.0 mol. % and less than or equal to 7.0 mol. %, greater than or equal to 10.0 mol. % and less than or equal to 14.0 mol. %, greater than or equal to 14.0 mol. % and less than or equal to 20.0 mol. %, greater than or equal to 14.0 mol. % and less than or equal to 16.0 mol. %.

Glass composition may include cerium oxide ($CeO_2$). Cerium oxides ($CeO_2$ and $Ce_2O_3$) can be added to the glass compositions to increase the elastic modulus. Also, adding $CeO_2$ can help to reduce undesirable coloring when adding other species, such as, for example, $TiO_2$, due to oxidation of their cations (e.g. $Ti^{3+}$ to $Ti^{4+}$). However, when added in high concentrations, cerium oxides may cause precipitation of refractory minerals (cerium phosphate $CePO_4$, cerium aluminate $Ce_3Al_5O_{12}$ and others) at high temperatures, which may cause devitrification of the glass articles. Also, at high concentrations $CeO_2$ may provide undesirable coloring. Accordingly, the content of cerium oxide is preferably limited, or glass compositions may be substantially free of $CeO_2$. In embodiments, the glass composition may contain cerium oxide ($CeO_2$) in an amount from greater than or equal to 0.0 mol. % to less than or equal to 20.0 mol. % and all ranges and sub-ranges between the foregoing values. In some embodiments, the glass composition may contain $CeO_2$ in an amount greater than or equal to 0.0 mol. %, greater than or equal to 5.0 mol. %, greater than or equal to 10.0 mol. %, greater than or equal to 14.0 mol. %, greater than or equal to 16.0 mol. %, or greater than or equal to 18.0 mol. %. In some other embodiments, the glass composition may contain $CeO_2$ in an amount less than or equal to 20.0 mol. %, less than or equal to 18.0 mol. %, less than or equal to 16.0 mol. %, less than or equal to 14.0 mol. %, less than or equal to 10.0 mol. %, less than or equal to 7.5 mol. %, less than or equal to 6.5 mol. %, less than or equal to 5.75 mol. %, or less than or equal to 5.0 mol. %. In some more embodiments, the glass composition may contain $CeO_2$ in an amount greater than or equal to 0.0 mol. % and less than or equal to 10.0 mol. %, greater than or equal to 0.0 mol. % and less than or equal to 7.5 mol. %, greater than or equal to 0.0 mol. % and less than or equal to 6.5 mol. %, greater than or equal to 0.0 mol. % and less than or equal to 5.75 mol. %, greater than or equal to 0.48 mol. % and less than or equal to 5.0 mol. %, greater than or equal to 0.0 mol. % and less than or equal to 20.0 mol. %, greater than or equal to 0.0 mol. % and less than or equal to 5.0 mol. %, greater than or equal to 5.0 mol. % and less than or equal to 5.75 mol. %, greater than or equal to 10.0 mol. % and less than or equal to 20.0 mol. %, greater than or equal to 10.0 mol. % and less than or equal to 14.0 mol. %, greater than or equal to 16.0 mol. % and less than or equal to 20.0 mol. %, greater than or equal to 16.0 mol. % and less than or equal to 18.0 mol. %.

Glass composition may include titania ($TiO_2$). Titania can be added to the glass compositions to increase the elastic modulus, at the same time decreasing the CTE and increasing the high-temperature viscosity. However, when added at high concentrations, $TiO_2$ may provide undesirable dark coloring. Also, $TiO_2$ may sometimes cause liquid-liquid phase separation and/or crystallization of the glass forming melts at high temperatures due to precipitation of refractory minerals, such as, for example, titanium phosphate $TiP_2O_7$, aluminum titanate $Al_2TiO_5$ and others. Also, $TiO_2$ provides high optical dispersion. Accordingly, the content of titania is preferably limited, or glass compositions may be substantially free of $TiO_2$. In embodiments, the glass composition may contain titania ($TiO_2$) in an amount from greater than or equal to 0.0 mol. % to less than or equal to 20.0 mol. % and all ranges and sub-ranges between the foregoing values. In some embodiments, the glass composition may contain $TiO_2$ in an amount greater than or equal to 0.0 mol. %, greater than or equal to 1.4 mol. %, greater than or equal to 5.0 mol. %, greater than or equal to 10.0 mol. %, greater than or equal to 14.0 mol. %, greater than or equal to 16.0 mol. %, or greater than or equal to 18.0 mol. %. In some other embodiments, the glass composition may contain $TiO_2$ in an amount less than or equal to 20.0 mol. %, less than or equal to 18.0 mol. %, less than or equal to 16.0 mol. %, less than or equal to 15.0 mol. %, less than or equal to 14.0 mol. %, less than or equal to 11.0 mol. %, less than or equal to 10.2 mol. %, less than or equal to 10.0 mol. %, or less than or equal to 5.0 mol. %. In some more embodiments, the glass composition may contain $TiO_2$ in an amount greater than or equal to 0.0 mol. % and less than or equal to 15.0 mol. %, greater than or equal to 0.0 mol. % and less than or equal to 11.0 mol. %, greater than or equal to 0.0 mol. % and less than or equal to 10.0 mol. %, greater than or equal to 1.41 mol. % and less than or equal to 10.21 mol. %, greater than or equal to 0.0 mol. % and less than or equal to 20.0 mol. %, greater than or equal to 1.4 mol. % and less than or equal to 5.0 mol. %, greater than or equal to 5.0 mol. % and less than or equal to 20.0 mol. %, greater than or equal to 5.0 mol. % and less than or equal to 10.0 mol. %, greater than or equal to 10.0 mol. % and less than or equal to 10.2 mol. %, greater than or equal to 14.0 mol. % and less than or equal to 15.0 mol. %.

Glass composition may include lanthanum oxide ($La_2O_3$). Lanthanum oxide works similar to cerium oxide ($CeO_2$) and other rare earth metal oxides ($Y_2O_3$, $Gd_2O_3$, $Nd_2O_3$, $Tb_2O_3$ and others), increasing the elastic modulus. Also, lanthanum oxide can increase the solubility of other high-modulus components, such as, for example, $ZrO_2$, in the glass forming melts, thus improving the thermal stability at high elastic modulus. However, when added in high concentrations, $La_2O_3$ may unacceptably increase the CTE, which may cause warping of thin articles because of thermal stresses. Also, at high concentrations, $La_2O_3$ may cause precipitation of refractory minerals (for example, lanthanum phosphate $LaPO_4$) at high temperatures, which may cause devitrification of the melts. Accordingly, the content of lanthanum oxide is preferably limited, or glass compositions may be substantially free of $La_2O_3$. In embodiments, the glass composition may contain lanthanum oxide ($La_2O_3$) in an amount from greater than or equal to 0.0 mol. % to less than or equal to 32.0 mol. % and all ranges and sub-ranges between the foregoing values. In some embodiments, the glass composition may contain $La_2O_3$ in an amount greater than or equal to 0.0 mol. %, greater than or equal to 2.0 mol. %, greater than or equal to 5.0 mol. %, greater than or equal to 10.0 mol. %, greater than or equal to 20.0 mol. %, greater than or equal to 26.0 mol. %, greater than or equal to 28.0 mol. %, or greater than or equal to 30.0 mol. %. In some other embodiments, the glass composition may contain $La_2O_3$ in an amount less than or equal to 32.0 mol. %, less than or equal to 30.0 mol. %, less than or equal to 28.0 mol. %, less than or equal to 26.0 mol. %, less than or equal to 20.0 mol. %, less than or equal to 17.0 mol. %, less than or equal to 10.0 mol. %, less than or equal to 7.5 mol. %, less than or equal to 5.5 mol. %, less than or equal to 5.0 mol. %, or less than or equal to 4.75 mol. %. In some more embodiments, the glass composition may contain $La_2O_3$ in an amount greater than or equal to 0.0 mol. % and less than or equal to 20.0 mol. %, greater than or equal to 0.0 mol. % and less than or equal to 7.5 mol. %, greater than or equal to 0.0 mol. % and less than or equal to 5.5 mol. %, greater than or equal to 0.0 mol. % and less than or equal to 4.75 mol. %, greater than or equal to 2.19 mol. % and less than or equal to 16.89 mol. %, greater than or equal to 0.0 mol. % and less than or equal to 32.0 mol. %, greater than or equal to 2.0 mol. % and less than or equal to 4.75 mol. %, greater than or equal to 5.0 mol. % and less than or equal to 32.0 mol. %, greater than or equal to 20.0 mol. % and less than or equal to 26.0 mol. %.

Glass composition may include alumina ($Al_2O_3$). Alumina provides high viscosity, which increases liquidus viscosity and, therefore, prevents crystallization when forming and cooling the glass articles. Also, alumina may increase chemical durability of glasses. However, when adding $Al_2O_3$ in the glass composition in high concentration, it may cause precipitation of refractory minerals (aluminum phosphate $AlPO_4$, yttrium aluminate $Y_3Al_5O_{12}$, aluminum titanate $Al_2TiO_5$ and others) at high temperatures, which could increase the liquidus temperature and may cause crystallization of melt when cooling and forming glass articles. Accordingly, the content of alumina is preferably limited. In embodiments, the glass composition may contain alumina ($Al_2O_3$) in an amount from greater than or equal to 0.0 mol. % to less than or equal to 30.0 mol. % and all ranges and sub-ranges between the foregoing values. In some embodiments, the glass composition may contain $Al_2O_3$ in an amount greater than or equal to 0.0 mol. %, greater than or equal to 3.0 mol. %, greater than or equal to 5.0 mol. %, greater than or equal to 8.0 mol. %, greater than or equal to 10.0 mol. %, greater than or equal to 15.0 mol. %, greater than or equal to 15.5 mol. %, greater than or equal to 16.0 mol. %, greater than or equal to 20.0 mol. %, greater than or equal to 24.0 mol. %, greater than or equal to 26.0 mol. %, or greater than or equal to 28.0 mol. %. In some other embodiments, the glass composition may contain $Al_2O_3$ in an amount less than or equal to 30.0 mol. %, less than or equal to 28.5 mol. %, less than or equal to 28.0 mol. %, less than or equal to 27.0 mol. %, less than or equal to 26.0 mol. %, less than or equal to 24.0 mol. %, less than or equal to 20.0 mol. %, less than or equal to 17.5 mol. %, less than or equal to 10.0 mol. %, or less than or equal to 5.0 mol. %. In some more embodiments, the glass composition may contain $Al_2O_3$ in an amount greater than or equal to 0.0 mol. % and less than or equal to 30.0 mol. %, greater than or equal to 0.0 mol. % and less than or equal to 25.0 mol. %, greater than or equal to 3.0 mol. % and less than or equal to 30.0 mol. %, greater than or equal to 8.0 mol. % and less than or equal to 30.0 mol. %, greater than or equal to 10.0 mol. % and less than or equal to 30.0 mol. %, greater than or equal to 15.0 mol. % and less than or equal to 20.0 mol. %, greater than or equal to 15.5 mol. % and less than or equal to 28.5 mol. %, greater than or equal to 15.5 mol. % and less than or equal to 17.5 mol. %, greater than or equal to 16.0 mol. % and less than or equal to 27.0 mol. %, greater than or equal to 0.0 mol. % and less than or equal to 5.0 mol. %, greater than or equal to 3.0 mol. % and less than or equal to 5.0 mol. %, greater than or equal to 5.0 mol. % and less than or equal to 10.0 mol. %, greater than or equal to 10.0 mol. % and less than or equal to 17.5 mol. %, greater than or equal to 15.0 mol. % and less than or equal to 17.5 mol. %.

Glass composition may include fluorine (F). Fluorine can be added to the glass composition in a small concentration as a fining agent. However, fluorine raises environmental concerns. Accordingly, the content of fluorine is preferably limited, or glass compositions may be substantially free of F. In embodiments, the glass composition may contain fluorine (F) in an amount from greater than or equal to 0.0 at. % to less than or equal to 5.0 at. % and all ranges and sub-ranges between the foregoing values. In some other embodiments, the glass composition may contain F in an amount less than or equal to 1.0 at. %, less than or equal to 0.5 at. %, or less than or equal to 0.1 at. %. In some more embodiments, the glass composition may contain F in an amount greater than or equal to 0.0 at. % and less than or equal to 1.0 at. %, greater than or equal to 0.0 at. % and less than or equal to 0.5 at. %, greater than or equal to 0.0 at. % and less than or equal to 0.1 at. %.

In some embodiments, the glass composition may have a sum of $Alk_2O+MgO+RE_mO_n$ greater than or equal to 0.0 mol. %, greater than or equal to 0.3 mol. %, or greater than or equal to 20.0 mol. %. In some other embodiments, the glass composition may have a sum of $Alk_2O+MgO+RE_mO_n$ less than or equal to 40.0 mol. % or less than or equal to 20.0 mol. %. In some more embodiments, the glass composition may have a sum of $Alk_2O+MgO+RE_mO_n$ greater than or equal to 0.3 mol. % and less than or equal to 40.0 mol. %, greater than or equal to 0.0 mol. % and less than or equal to 40.0 mol. %, or greater than or equal to 0.0 mol. % and less than or equal to 20.0 mol. %, or greater than or equal to 0.3 mol. % and less than or equal to 20.0 mol. %.

In some other embodiments, the glass composition may have a sum of $Bi_2O_3+Cu_2O+CuO$ less than or equal to 1.0 mol. % or less than or equal to 0.5 mol. %. In some more embodiments, the glass composition may have a sum of $Bi_2O_3+Cu_2O+CuO$ greater than or equal to 0.0 mol. % and less than or equal to 1.0 mol. %, or greater than or equal to 0.0 mol. % and less than or equal to 0.5 mol. %.

In some other embodiments, the glass composition may have a sum of Cu+Co+Cr+Ni less than or equal to 0.1 mol. % less than or equal to 0.10 mol. % or less than or equal to 0.05 mol. %. In some more embodiments, the glass composition may have a sum of Cu+Co+Cr+Ni greater than or equal to 0.0 mol. % and less than or equal to 0.1 mol. %, greater than or equal to 0.0 mol. % and less than or equal to 0.10 mol. %, or greater than or equal to 0.0 mol. % and less than or equal to 0.05 mol. %.

In some other embodiments, the glass composition may have a sum of Cu+Co+Ni+Cr+V+Bi less than or equal to 0.1 mol. % less than or equal to 0.10 mol. % or less than or equal to 0.05 mol. %. In some more embodiments, the glass composition may have a sum of Cu+Co+Ni+Cr+V+Bi greater than or equal to 0.0 mol. % and less than or equal to 0.1 mol. %, greater than or equal to 0.0 mol. % and less than or equal to 0.05 mol. %, greater than or equal to 0.0 mol. % and less than or equal to 0.10 mol. %.

In some other embodiments, the glass composition may have a sum of $K_2O+Rb_2O+Cs_2O$ less than or equal to 3.0 mol. %, less than or equal to 2.0 mol. %, or less than or equal to 1.0 mol. %. In some more embodiments, the glass composition may have a sum of $K_2O+Rb_2O+Cs_2O$ greater than or equal to 0.0 mol. % and less than or equal to 3.0 mol. %, greater than or equal to 0.0 mol. % and less than or equal to 2.0 mol. %, or greater than or equal to 0.0 mol. % and less than or equal to 1.0 mol. %.

In some embodiments, the glass composition may have a sum of $La_2O_3+CeO_2+Ce_2O_3$ greater than or equal to 0.0 mol. %, greater than or equal to 0.5 mol. %, or greater than or equal to 10.0 mol. %. In some other embodiments, the glass composition may have a sum of $La_2O_3+CeO_2+Ce_2O_3$ less than or equal to 15.0 mol. % or less than or equal to 10.0 mol. %. In some more embodiments, the glass composition may have a sum of $La_2O_3+CeO_2+Ce_2O_3$ greater than or equal to 0.5 mol. % and less than or equal to 15.0 mol. %, greater than or equal to 0.0 mol. % and less than or equal to 15.0 mol. %, or greater than or equal to 0.0 mol. % and less than or equal to 10.0 mol. %, or greater than or equal to 0.5 mol. % and less than or equal to 10.0 mol. %.

In some embodiments, the glass composition may have a sum of $Li_2O+Na_2O$ greater than or equal to 0.0 mol. %, greater than or equal to 0.5 mol. %, greater than or equal to 2.0 mol. %, or greater than or equal to 5.0 mol. %. In some other embodiments, the glass composition may have a sum of $Li_2O+Na_2O$ less than or equal to 8.0 mol. % or less than or equal to 5.0 mol. %. In some more embodiments, the glass composition may have a sum of $Li_2O+Na_2O$ greater than or equal to 0.0 mol. % and less than or equal to 8.0 mol. %, or greater than or equal to 0.0 mol. % and less than or equal to 5.0 mol. %, greater than or equal to 0.5 mol. % and less than or equal to 8.0 mol. %, or greater than or equal to 0.5 mol. % and less than or equal to 5.0 mol. %, greater than or equal to 2.0 mol. % and less than or equal to 8.0 mol. %, or greater than or equal to 2.0 mol. % and less than or equal to 5.0 mol. %.

In some embodiments, the glass composition may have a sum of $Li_2O+Na_2O+MgO+CaO$ greater than or equal to 0.0 mol. %, greater than or equal to 0.5 mol. %, or greater than or equal to 10.0 mol. %. In some other embodiments, the glass composition may have a sum of $Li_2O+Na_2O+MgO+CaO$ less than or equal to 17.0 mol. % or less than or equal to 10.0 mol. %. In some more embodiments, the glass composition may have a sum of $Li_2O+Na_2O+MgO+CaO$ greater than or equal to 0.5 mol. % and less than or equal to 17.0 mol. %, greater than or equal to 0.0 mol. % and less than or equal to 17.0 mol. %, or greater than or equal to 0.0 mol. % and less than or equal to 10.0 mol. %, or greater than or equal to 0.5 mol. % and less than or equal to 10.0 mol. %.

In some embodiments, the glass composition may have a sum of $MgO+TiO_2+La_2O_3+Y_2O_3+Ce_2O_3+CeO_2+ZrO_2$ greater than or equal to 0.0 mol. %, greater than or equal to 0.5 mol. %, greater than or equal to 4.0 mol. %, or greater than or equal to 10.0 mol. %. In some other embodiments, the glass composition may have a sum of $MgO+TiO_2+La_2O_3+Y_2O_3+Ce_2O_3+CeO_2+ZrO_2$ less than or equal to 17.0 mol. % or less than or equal to 10.0 mol. %. In some more embodiments, the glass composition may have a sum of $MgO+TiO_2+La_2O_3+Y_2O_3+Ce_2O_3+CeO_2+ZrO_2$ greater than or equal to 0.0 mol. % and less than or equal to 17.0 mol. %, or greater than or equal to 0.0 mol. % and less than or equal to 10.0 mol. %, greater than or equal to 0.5 mol. % and less than or equal to 17.0 mol. %, or greater than or equal to 0.5 mol. % and less than or equal to 10.0 mol. %, greater than or equal to 4.0 mol. % and less than or equal to 17.0 mol. %, or greater than or equal to 4.0 mol. % and less than or equal to 10.0 mol. %.

In some embodiments, the glass composition may have a sum of $Na_2O+K_2O+BaO$ greater than or equal to 0.0 mol. %, or greater than or equal to 5.0 mol. %. In some other embodiments, the glass composition may have a sum of $Na_2O+K_2O+BaO$ less than or equal to 10.0 mol. % or less than or equal to 5.0 mol. %. In some more embodiments, the glass composition may have a sum of $Na_2O+K_2O+BaO$ greater than or equal to 0.0 mol. % and less than or equal to 10.0 mol. %, or greater than or equal to 0.0 mol. % and less than or equal to 5.0 mol. %.

In some embodiments, the glass composition may have a sum of $P_2O_5+Al_2O_3+B_2O_3+Li_2O+Na_2O+MgO+CaO+TiO_2+La_2O_3+Y_2O_3+Ce_2O_3+CeO_2+ZrO_2$ greater than or equal to 0.0 mol. %, or greater than or equal to 50.0 mol. %. In some other embodiments, the glass composition may have a sum of $P_2O_5+Al_2O_3+B_2O_3+Li_2O+Na_2O+MgO+CaO+TiO_2+La_2O_3+Y_2O_3+Ce_2O_3+CeO_2+ZrO_2$ less than or equal to 100 mol. % or less than or equal to 50.0 mol. %. In some more embodiments, the glass composition may have a sum of $P_2O_5+Al_2O_3+B_2O_3+Li_2O+Na_2O+MgO+CaO+TiO_2+La_2O_3+Y_2O_3+Ce_2O_3+CeO_2+ZrO_2$ greater than or equal to 0.0 mol. % and less than or equal to 100 mol. %, or greater than or equal to 0.0 mol. % and less than or equal to 50.0 mol. %.

In some embodiments, the glass composition may have a sum of $P_2O_5+B_2O_3$ greater than or equal to 0.0 mol. %, greater than or equal to 15.0 mol. %, greater than or equal to 50.0 mol. %, or greater than or equal to 60.0 mol. %. In some other embodiments, the glass composition may have a sum of $P_2O_5+B_2O_3$ less than or equal to 75.0 mol. %, less than or equal to 73.0 mol. %, or less than or equal to 50.0 mol. %. In some more embodiments, the glass composition may have a sum of $P_2O_5+B_2O_3$ greater than or equal to 15.0 mol. % and less than or equal to 75.0 mol. %, greater than or equal to 0.0 mol. % and less than or equal to 75.0 mol. %, greater than or equal to 0.0 mol. % and less than or equal to 73.0 mol. %, or greater than or equal to 0.0 mol. % and less than or equal to 50.0 mol. %, greater than or equal to 15.0 mol. % and less than or equal to 73.0 mol. %, or greater than or equal to 15.0 mol. % and less than or equal to 50.0 mol. %, greater than or equal to 50.0 mol. % and less than or equal to 75.0 mol. %, or greater than or equal to 50.0 mol. % and less than or equal to 73.0 mol. %.

In some other embodiments, the glass composition may have a sum of $K_2O+Rb_2O+Cs_2O$ less than or equal to 3.0 mol. %, less than or equal to 2.0 mol. %, or less than or equal to 1.0 mol. %. In some more embodiments, the glass composition may have a $K_2O+Rb_2O+Cs_2O$ greater than or equal to 0.0 mol. % and less than or equal to 3.0 mol. %, greater than or equal to 0.0 mol. % and less than or equal to 2.0 mol. %, or greater than or equal to 0.0 mol. % and less than or equal to 1.0 mol. %.

In some embodiments, the glass composition may have a sum of $K_2O+Rb_2O+Cs_2O$ greater than or equal to 0.0 mol. %, or greater than or equal to 5.0 mol. %. In some other embodiments, the glass composition may have a sum of $K_2O+Rb_2O+Cs_2O$ less than or equal to 9.5 mol. % or less than or equal to 5.0 mol. %. In some more embodiments, the glass composition may have a $K_2O+Rb_2O+Cs_2O$ greater than or equal to 0.0 mol. % and less than or equal to 9.5 mol. %, or greater than or equal to 0.0 mol. % and less than or equal to 5.0 mol. %.

In some other embodiments, the glass composition may have a sum of $ZnO+CuO+Cu_2O$ less than or equal to 0.5 mol. % or less than or equal to 0.25 mol. %. In some more embodiments, the glass composition may have a $ZnO+CuO+Cu_2O$ greater than or equal to 0.0 mol. % and less than or equal to 0.5 mol. %, or greater than or equal to 0.0 mol. % and less than or equal to 0.25 mol. %.

In some embodiments, the glass composition may have a sum of $R_2O+RO$ greater than or equal to 0.0 mol. %, greater than or equal to 0.5 mol. %, greater than or equal to 1.0 mol. %, greater than or equal to 8.0 mol. %, greater than or equal to 10.0 mol. %, or greater than or equal to 20.0 mol. %. In some other embodiments, the glass composition may have a sum of $R_2O+RO$ less than or equal to 28.0 mol. %, less than or equal to 20.0 mol. %, less than or equal to 15.0 mol. %, less than or equal to 12.0 mol. %, or less than or equal to 10.0 mol. %. In some more embodiments, the glass composition may have a sum of $R_2O+RO$ greater than or equal to 0.0 mol. % and less than or equal to 28.0 mol. %, greater than or equal to 1.0 mol. % and less than or equal to 15.0 mol. %, greater than or equal to 0.0 mol. % and less than or equal to 20.0 mol. %, greater than or equal to 0.0 mol. % and less than or equal to 15.0 mol. %, greater than or equal to 0.0 mol. % and less than or equal to 12.0 mol. %, or greater than or equal to 0.0 mol. % and less than or equal to 10.0 mol. %, greater than or equal to 1.0 mol. % and less than or equal to 28.0 mol. %, greater than or equal to 1.0 mol. % and less than or equal to 20.0 mol. %, greater than or equal to 1.0 mol. % and less than or equal to 12.0 mol. %, or greater than or equal to 1.0 mol. % and less than or equal to 10.0 mol. %, greater than or equal to 8.0 mol. % and less than or equal to 28.0 mol. %, greater than or equal to 8.0 mol. % and less than or equal to 20.0 mol. %, greater than or equal to 8.0 mol. % and less than or equal to 15.0 mol. %, greater than or equal to 8.0 mol. % and less than or equal to 12.0 mol. %, or greater than or equal to 8.0 mol. % and less than or equal to 10.0 mol. %, greater than or equal to 10.0 mol. % and less than or equal to 28.0 mol. %, greater than or equal to 10.0 mol. % and less than or equal to 20.0 mol. %, greater than or equal to 10.0 mol. % and less than or equal to 15.0 mol. %, or greater than or equal to 10.0 mol. % and less than or equal to 12.0 mol. %.

In some embodiments, the glass composition may have a sum of $R_2O+RO+B_2O_3$ greater than or equal to 0.0 mol. %, greater than or equal to 0.5 mol. %, greater than or equal to 10.0 mol. %, greater than or equal to 12.0 mol. %, or greater than or equal to 20.0 mol. %. In some other embodiments, the glass composition may have a sum of $R_2O+RO+B_2O_3$ less than or equal to 22.0 mol. %, less than or equal to 20.0 mol. %, or less than or equal to 10.0 mol. %. In some more embodiments, the glass composition may have a sum of $R_2O+RO+B_2O_3$ greater than or equal to 0.0 mol. % and less than or equal to 22.0 mol. %, greater than or equal to 0.0 mol. % and less than or equal to 20.0 mol. %, or greater than or equal to 0.0 mol. % and less than or equal to 10.0 mol. %, greater than or equal to 0.5 mol. % and less than or equal to 22.0 mol. %, greater than or equal to 0.5 mol. % and less than or equal to 20.0 mol. %, or greater than or equal to 0.5 mol. % and less than or equal to 10.0 mol. %, greater than or equal to 10.0 mol. % and less than or equal to 22.0 mol. %, or greater than or equal to 10.0 mol. % and less than or equal to 20.0 mol. %, greater than or equal to 12.0 mol. % and less than or equal to 22.0 mol. %, or greater than or equal to 12.0 mol. % and less than or equal to 20.0 mol. %.

In some embodiments, the glass composition may have a sum of $R_2O+RO+SnO_2+MnO_2$ greater than or equal to 0.0 mol. %, greater than or equal to 8.0 mol. %, or greater than or equal to 10.0 mol. %. In some other embodiments, the glass composition may have a sum of $R_2O+RO+SnO_2+MnO_2$ less than or equal to 15.0 mol. %, less than or equal to 12.0 mol. %, or less than or equal to 10.0 mol. %. In some more embodiments, the glass composition may have a sum of $R_2O+RO+SnO_2+MnO_2$ greater than or equal to 0.0 mol. % and less than or equal to 15.0 mol. %, greater than or equal to 0.0 mol. % and less than or equal to 12.0 mol. %, or greater than or equal to 0.0 mol. % and less than or equal to 10.0 mol. %, greater than or equal to 8.0 mol. % and less than or equal to 15.0 mol. %, greater than or equal to 8.0 mol. % and less than or equal to 12.0 mol. %, or greater than or equal to 8.0 mol. % and less than or equal to 10.0 mol. %, greater than or equal to 10.0 mol. % and less than or equal to 15.0 mol. %, or greater than or equal to 10.0 mol. % and less than or equal to 12.0 mol. %.

In some other embodiments, the glass composition may have a sum of $TeO_2+GeO_2$ less than or equal to 5.0 mol. %, less than or equal to 3.0 mol. %, or less than or equal to 2.5 mol. %. In some more embodiments, the glass composition may have a sum of $TeO_2+GeO_2$ greater than or equal to 0.0 mol. % and less than or equal to 5.0 mol. %, greater than or equal to 0.0 mol. % and less than or equal to 3.0 mol. %, or greater than or equal to 0.0 mol. % and less than or equal to 2.5 mol. %.

In some embodiments, the glass composition may have a sum of $TiO_2+La_2O_3+Y_2O_3+Ce_2O_3+CeO_2+ZrO_2$ greater than or equal to 0.0 mol. %, greater than or equal to 0.5 mol. %, or greater than or equal to 10.0 mol. %. In some other embodiments, the glass composition may have a sum of $TiO_2+La_2O_3+Y_2O_3+Ce_2O_3+CeO_2+ZrO_2$ less than or equal to 20.0 mol. %, less than or equal to 13.0 mol. %, or less than or equal to 10.0 mol. %. In some more embodiments, the glass composition may have a sum of $TiO_2+La_2O_3+Y_2O_3+Ce_2O_3+CeO_2+ZrO_2$ greater than or equal to 0.5 mol. % and less than or equal to 20.0 mol. %, greater than or equal to 0.0 mol. % and less than or equal to 20.0 mol. %, greater than or equal to 0.0 mol. % and less than or equal to 13.0 mol. %, or greater than or equal to 0.0 mol. % and less than or equal to 10.0 mol. %, greater than or equal to 0.5 mol. % and less than or equal to 13.0 mol. %, or greater than or equal to 0.5 mol. % and less than or equal to 10.0 mol. %, greater than or equal to 10.0 mol. % and less than or equal to 20.0 mol. %, or greater than or equal to 10.0 mol. % and less than or equal to 13.0 mol. %.

In some embodiments, the glass composition may have a sum of $TiO_2+ZrO_2$ greater than or equal to 0.0 mol. %, greater than or equal to 0.25 mol. %, or greater than or equal to 20.0 mol. %. In some other embodiments, the glass composition may have a sum of $TiO_2+ZrO_2$ less than or equal to 40.0 mol. % or less than or equal to 20.0 mol. %. In some more embodiments, the glass composition may have a sum of $TiO_2+ZrO_2$ greater than or equal to 0.25 mol. % and less than or equal to 40.0 mol. %, greater than or equal to 0.0 mol. % and less than or equal to 40.0 mol. %, or greater than or equal to 0.0 mol. % and less than or equal to 20.0 mol. %, or greater than or equal to 0.25 mol. % and less than or equal to 20.0 mol. %.

In some embodiments, the glass composition may have a value of $3*Al_2O_3+R_2O+RO-P_2O_5$ greater than or equal to −7 mol. %, greater than or equal to −5 mol. %, greater than or equal to −3 mol. %, or greater than or equal to 2 mol. %. In some other embodiments, the glass composition may have a value of $3*Al_2O_3+R_2O+RO-P_2O_5$ less than or equal to 2.1 mol. %, less than or equal to 2 mol. %, or less than or equal to −3 mol. %. In some more embodiments, the glass composition may have a $3*Al_2O_3+R_2O+RO-P_2O_5$ greater than or equal to −7 mol. % and less than or equal to 2.1 mol. %, greater than or equal to −7 mol. % and less than or equal to 2 mol. %, or greater than or equal to −7 mol. % and less than or equal to −3 mol. %, greater than or equal to −5 mol. % and less than or equal to 2.1 mol. %, greater than or equal to −5 mol. % and less than or equal to 2 mol. %, or greater than or equal to −5 mol. % and less than or equal to −3 mol. %, greater than or equal to −3 mol. % and less than or equal to 2.1 mol. %, or greater than or equal to −3 mol. % and less than or equal to 2 mol. %.

In some embodiments, glass composition may have limitations for $Al_2O_3$−$R_2O$−RO. It was empirically found that when the content of alumina in the glass is low and/or the total content of divalent and monovalent metal oxides is high, chemical durability may tend to decrease. In some embodiments, the glass composition may have a difference $Al_2O_3$−$R_2O$−RO greater than or equal to 3.0 mol. %, greater than or equal to 7.95 mol. %, or greater than or equal to 8.0 mol. %. In some other embodiments, the glass composition may have a difference $Al_2O_3$−$R_2O$−RO less than or equal to 9.0 mol. % or less than or equal to 8.0 mol. %. In some more embodiments, the glass composition may have a $Al_2O_3$−$R_2O$−RO greater than or equal to 3.0 mol. % and less than or equal to 9.0 mol. %, or greater than or equal to 3.0 mol. % and less than or equal to 8.0 mol. %, greater than or equal to 7.95 mol. % and less than or equal to 9.0 mol. %.

In some embodiments, glass composition may have limitations for a ratio $(La_2O_3+CeO_2+Ce_2O_3)/RE_mO_n$. Lanthanum and cerium oxides are the cheapest of the rare earth metal oxides. Accordingly, in the cases when low cost is demanded, it may be preferable to use these rare earth metal oxides. In some embodiments, the glass composition may have a ratio $(La_2O_3+CeO_2+Ce_2O_3)/RE_mO_n$ [mol. %] greater than or equal to 0.000, or greater than or equal to 0.51.

In some embodiments, glass composition may have limitations for a ratio $(Li_2O+Na_2O)/R_2O$. Lithium and sodium oxides have a greater impact on the Young's modulus than other monovalent metal oxides (such as $K_2O$, $Cs_2O$, $Cu_2O$, etc.). Accordingly, a high ratio $(Li_2O+Na_2O)/R_2O$ is correlated with a higher impact of the monovalent metal oxides on the Young's modulus. In some embodiments, the glass composition may have a ratio $(Li_2O+Na_2O)/R_2O$ greater than or equal to 0.750, greater than or equal to 0.850, or greater than or equal to 0.950. In some other embodiments, the glass composition may have a ratio $(Li_2O+Na_2O)/R_2O$ less than or equal to 1.000, less than or equal to 0.950, or less than or equal to 0.850. In some more embodiments, the glass composition may have a ratio $(Li_2O+Na_2O)/R_2O$ greater than or equal to 0.750 and less than or equal to 1.000, greater than or equal to 0.750 and less than or equal to 0.950, or greater than or equal to 0.750 and less than or equal to 0.850, greater than or equal to 0.850 and less than or equal to 1.000, or greater than or equal to 0.850 and less than or equal to 0.950.

In some embodiments, glass composition may have limitations for a ratio $P_2O_5/(3*Al_2O_3+B_2O_3)$. It was empirically found that when the ratio $P_2O_5/(3*Al_2O_3+B_2O_3)$ is close to unity, it is possible to reach high elastic modulus and adequate chemical durability, as well as to reduce volatilization of both $P_2O_5$ and $B_2O_3$ when melting. When the ratio $P_2O_5/(3*Al_2O_3+B_2O_3)$ is low, chemical durability may tend to decrease. When the ratio $P_2O_5/(3*Al_2O_3+B_2O_3)$ is high, $P_2O_5$ and $B_2O_3$ may volatilize when melting. Also, when the ratio $P_2O_5/(3*Al_2O_3+B_2O_3)$ is significantly lower or higher than 1.0, it may also be difficult to reach high elastic modulus. In some embodiments, the glass composition may have a ratio $P_2O_5/(3*Al_2O_3+B_2O_3)$ mol. %/mol. % greater than or equal to 0.95, greater than or equal to 1.00, or greater than or equal to 1.15. In some other embodiments, the glass composition may have a ratio $P_2O_5/(3*Al_2O_3+B_2O_3)$ mol. % less than or equal to 1.30, less than or equal to 1.25, less than or equal to 1.16, or less than or equal to 1.15. In some more embodiments, the glass composition may have a ratio $P_2O_5/(3*Al_2O_3+B_2O_3)$ mol. % greater than or equal to 0.95 and less than or equal to 1.20, greater than or equal to 0.95 and less than or equal to 1.30, greater than or equal to 0.95 and less than or equal to 1.16, or greater than or equal to 0.95 and less than or equal to 1.15, greater than or equal to 1.00 and less than or equal to 1.30, greater than or equal to 1.00 and less than or equal to 1.20, greater than or equal to 1.00 and less than or equal to 1.16, or greater than or equal to 1.00 and less than or equal to 1.15, greater than or equal to 1.15 and less than or equal to 1.30, greater than or equal to 1.15 and less than or equal to 1.25.

In some embodiments, the Young's modulus E of the glass is from greater than or equal to 60 GPa to less than or equal to 120 GPa and all ranges and sub-ranges between the foregoing values. In some embodiments, the Young's modulus E of the glass is greater than or equal to 60 GPa, greater than or equal to 70 GPa, greater than or equal to 74 GPa, greater than or equal to 75 GPa, greater than or equal to 80 GPa, greater than or equal to 85 GPa, greater than or equal to 105 GPa, greater than or equal to 110 GPa, or greater than or equal to 115 GPa. In some other embodiments, the Young's modulus E of the glass is less than or equal to 120 GPa, less than or equal to 115 GPa, less than or equal to 110 GPa, less than or equal to 105 GPa, less than or equal to 85 GPa, less than or equal to 80 GPa, or less than or equal to 70 GPa. In some more embodiments, the Young's modulus E of the glass is greater than or equal to 60 GPa and less than or equal to 120 GPa, greater than or equal to 70 GPa and less than or equal to 80 GPa, greater than or equal to 75 GPa and less than or equal to 120 GPa, greater than or equal to 75 GPa and less than or equal to 80 GPa, greater than or equal to 85 GPa and less than or equal to 105 GPa.

In some embodiments, the logarithm of liquidus viscosity $Log(\eta_{Lq}, [P])$ of the glass is greater than or equal to 2.

In some embodiments, the glass may have the average linear thermal expansion coefficient of glass in the range 20-300° C. $\alpha_{20-300}\times10^7$ from greater than or equal to 60.0 $K^{-1}$ to less than or equal to 70.0 $K^{-1}$, and all ranges and sub-ranges between the foregoing values. In some embodiments, the average linear thermal expansion coefficient of the glass in the range 20-300° C. $\alpha_{20-300}\times10^7$ is greater than or equal to 60.0 $K^{-1}$, greater than or equal to 61.0 $K^{-1}$, greater than or equal to 63.0 $K^{-1}$, greater than or equal to 65.0 $K^{-1}$, greater than or equal to 67.0 $K^{-1}$, greater than or equal to 68.0 $K^{-1}$, or greater than or equal to 69.0 $K^{-1}$. In some other embodiments, the average linear thermal expansion coefficient of the glass in the range 20-300° C. $\alpha_{20-300}\times10^7$ is less than or equal to 70.0 $K^{-1}$, less than or equal to 69.0 $K^{-1}$, less than or equal to 68.0 $K^{-1}$, less than or equal to 67.0 $K^{-1}$, less than or equal to 65.0 $K^{-1}$, or less than or equal to 61.0 $K^{-1}$. In some more embodiments, the average linear thermal expansion coefficient of the glass in the range 20-300° C. $\alpha_{20-300}\times10^7$ is greater than or equal to 60.0 $K^{-1}$ and less than or equal to 70.0 $K^{-1}$, greater than or equal to 63.0 $K^{-1}$ and less than or equal to 67.0 $K^{-1}$, greater than or equal to 60.0 $K^{-1}$ and less than or equal to 61.0 $K^{-1}$, greater than or equal to 61.0 $K^{-1}$ and less than or equal to 70.0 $K^{-1}$, greater than or equal to 61.0 $K^{-1}$, and less than or equal to 65.0 $K^{-1}$, greater than or equal to 63.0 $K^{-1}$, and less than or equal to 70.0 $K^{-1}$, greater than or equal to 63.0 $K^{-1}$, and less than or equal to 65.0 $K^{-1}$, greater than or equal to 65.0 $K^{-1}$, and less than or equal to 70.0 $K^{-1}$, greater than or equal to 65.0 $K^{-1}$, and less than or equal to 67.0 $K^{-1}$, greater than or equal to 67.0 $K^{-1}$, and less than or equal to 70.0 $K^{-1}$, greater than or equal to 67.0 $K^{-1}$ and less than or equal to 68.0 $K^{-1}$.

In some embodiments, the glass may have the Abbe number $v_d$ greater than or equal to 60, or greater than or equal to 65, or greater than or equal to 68, or greater than or equal to 70, or greater than or equal to 71.

The chemical durability of samples of glasses described herein was assessed with the acid durability tests and base durability tests described below. To prepare the glass samples for each of the tests, the glass samples were (1) rinsed under distilled water (16 MΩ resistance) for 5 minutes while squeezing the water from Tygon tubing to provide a shower-like rinse; (2) ultrasonicated (50/60 Hz frequency) at 60° C. to 65° C. in a 4% Semiclean Detergent bath for one minute; (3) rinsed under 16 MΩ distilled water for 5 minutes while squeezing the water from Tygon tubing to provide a shower-like rinse; and (4) rinsed in a cascading 18 MΩ distilled water bath for 5 minutes. The glass samples were then transferred onto glass racks on stainless steel trays and dried in a 110° C. oven for an hour, and placed in a desiccator until tested. Acid durability tests were done in Pyrex tubes in a hot water bath and base durability tests were done in platinum tubes in a hot water bath. The results of the acid and base durability tests are reported as the mass difference of the sample before and after the test divided by the initial surface area of the sample. The results are reported as the mass difference per unit area and are expressed in units of $mg/cm^2$. A small mass difference per unit area reflects a low loss of mass and signifies high durability.

Durability to acids was characterized in some embodiments according to the standard DIN12116. The measured quantity, specified in Table 6 below as "HCl[DIN12116]", is the mass difference per unit area determined according to the procedure specified in standard DIN12116.

Alternatively, for some Exemplary Glasses the durability to acids was tested by immersion of glass samples with dimensions of about 2×2" in a solution of 5 wt % HCl at 95° C. for 24 hours. The measured quantity, specified in Table 6 below as "Durability HCl 5% w/95 C/24 h", is the mass difference per unit area according to this acid durability test.

Durability to bases was characterized in some embodiments according to the standard ISO695. The measured quantity, specified in Table 6 below as "NaOH[ISO695]", is the mass difference per unit area according to the procedure specified in the standard ISO695.

Alternatively, for some Exemplary Glasses the durability to bases was tested by exposure glass samples with dimensions of about 2×2" in a solution of 5 wt % NaOH at 95° C. for 1 hour. The measured quantity, specified in Table 6 below as "Durability NaOH 5% w, 95 C, 1 hr", is the mass difference per unit area according to this base durability test.

When testing the durability of glass samples to vapor hydrofluoric acid (vHF or vHF durability test), the glass samples were wiped with ethanol or IPA (isopropyl alcohol), weighed, then placed in Teflon mesh baskets and placed in a closed vessel above 250 ml of 5 wt % HF solution held at a temperature of 50° C. The glass samples were exposed to vapor HF from the solution for 1 hour, then removed from the vessel and placed into 16 MΩ DI water to quench. The glass samples were then removed from the baskets and rinsed first under 16 MΩ DI water, then under 18 MΩ DI water. After rinsing, the glass samples were placed on a glass rack situated on a stainless steel tray and set in a 110° C. oven for about 30 min. Samples were cooled, then reweighed and visually evaluated for the surface damage. The result of the vHF durability test is reported as the mass difference of the sample before and after exposure to vHF divided by the initial surface area of the sample (referred to in Table 6 below as "vHF loss"), expressed in $mg/cm^2$, according to this test.

After the vHF test, appearance of surface was evaluated in terms of visually observed surface damage and gloss. This characteristic is specified in Table 6 below as "vHF appearance", where "OK" means no visible surface damage.

Weathering tests were conducted to evaluate the durability of glass samples to hot wet air. In the weathering test, glass sheets of about 30×30 mm size were exposed to air having a relative humidity of 85% at 85° C. for 144 hours. The mass difference per unit area of the glass samples after exposure to the humid air was determined. The measured quantity, specified in Table 6 below as "Weathering—85° C./85% RH", is the mass difference of the sample before and after exposure to the humid air divided by the initial surface area of the sample, expressed in units of $mg/cm^2$. The surface damage after the weathering test was visually characterized.

Batch index $I_B$ is a quantity calculated by the following formula (I):

$$I_B=(R_2O+RO+3*Al_2O_3+B_2O_3+3*RE_2O_3)-P_2O_5, \quad (I)$$

where $R_2O$ is total sum of monovalent metal oxides, RO is total sum of divalent metal oxides, $RE_2O_3$ is total sum of rare earth metal oxides in the "+3" redox state, and chemical formulas mean the amounts of corresponding components in the glass composition.

Batch index $I_B$ determines the viability of batching all $P_2O_5$ from solid starting materials, such as monovalent and divalent metal metaphosphates ($M_xO*P_2O_5$, where "M" refers to a metal cation, and x is 1 or 2, depending on the redox state of the metal cation M), aluminum metaphosphate ($Al_2O_3*3P_2O_5$), boron phosphate ($B_2O_3*P_2O_5$) and rare earth metals metaphosphates ($RE_2O_3*3P_2O_5$, where "RE" refers to a rare earth metal cation). Accordingly, the coefficients in the formula (I) correspond to the stoichiometric factors of $P_2O_5$ in the indicated solid phosphate starting materials. When the batch index $I_B$ is zero or positive then it is expected to be possible to batch $P_2O_5$ from the solid starting materials noted in this paragraph. This simplifies the melting process and reduces its cost.

Young's modulus E is a property of glass that can be predicted from the glass composition. A linear regression analysis of the Exemplary Glasses of the present disclosure in the EXAMPLES section below and other glass compositions reported in the literature was performed to determine an equation that can predict the composition dependence of the Young's modulus E.

The training dataset of glass compositions satisfying the compositional limitations specified in Table 1 below and having measured values of the Young's modulus E, about 100 glass compositions, was randomly selected from literature data presented in the publicly available SciGlass Information System database and from the Exemplary Glasses from the embodiments presented herein. The linear regression analysis on the above-specified dataset was used to determine the formula (II) for the parameter $P_E$ that predicts the Young's modulus E. Outliers in the dataset were excluded to improve the accuracy of the result. The resulting formula (II) is presented below and summarized in Table 2. Another subset of glass compositions satisfying the compositional limitations of Table 1 was used as a validation set to evaluate the ability to interpolate within the compositional limitations of Table 1 and was used to establish the standard deviation specified in Table 2 for the parameter $P_E$. An external dataset of prior art glass compositions, also randomly selected from the SciGlass Information System database, was used to evaluate the ability to predict the properties outside of the compositional limits of Table 1 with a reasonable accuracy. Multiple iterations of this process were performed in order to determine the best formula for predicting the Young's modulus E. Formula (II) is the result of the analysis.

The data for the Comparative Glass compositions used in the linear regression modeling, including the training dataset, validation dataset and external dataset were obtained from the publically available SciGlass Information System database. Formula (II) below were obtained from the linear regression analysis and defines a parameter $P_E$ used to predict the Young's modulus E of the glasses:

$$P_E=-0.27146*P_2O_5+0.96062*Al_2O_3+0.22431*B_2O_3-0.072878*BaO+0.35074*CaO+0.21526*(Ce_2O_3+CeO_2)-0.12628*Cu_2O-0.5807*K_2O+0.41579*La_2O_3+0.18714*Li_2O+0.20336*MgO+0.061862*MnO-0.057105*MnO_2-0.18615*Na_2O+0.64778*Nb_2O_5-0.35317*PbO-0.028357*SiO_2+0.17429*SnO+0.55551*SnO_2+0.8294*Ta_2O_5+0.60217*TiO_2+0.17356*WO_3+0.36256*Y_2O_3-0.19958*ZnO+0.7835*ZrO_2+0.46259*(RE_mO_n-La_2O_3-Y_2O_3-Ce_2O_3-CeO_2)+0.90549*(\max(0,\min(B_2O_3,P_2O_5-(3*Al_2O_3+3*RE_mO_n+R_2O+MgO+CaO))))+70. \quad (II)$$

In Formula (II) and Tables 1 and 2, $P_E$ is a parameter that predicts the Young's modulus [GPa], calculated from the components of the glass composition expressed in mol. %. In Table 1, $RE_mO_n$ is a total sum of rare earth metal oxides, $R_2O$ is a total sum of monovalent metal oxides, RO is a total sum of divalent metal oxides and $R_mO_n$ is a total sum of all oxides.

In Formula (II), each component of the glass composition is listed in terms of its chemical formula, where the chemical formula refers to the concentration of the component expressed in mol. %. For example, for purposes of Formula (II), $P_2O_5$ refers to the concentration of $P_2O_5$, expressed in mol. %, in the glass composition. It is understood that not all components listed in Formula (II) are necessarily present in a particular glass composition and that Formula (II) is equally valid for glass compositions that contain less than all of the components listed in the formula. It is further understood that Formula (II) is also valid for glass compositions within the scope and claims of the present disclosure that contain components in addition to the components listed in the formulas. If a component listed in Formula (II) is absent in a particular glass composition, the concentration of the component in the glass composition is 0 mol. % and the contribution of the component to the value calculated from the formulas is zero.

TABLE 1

Composition Space Used for Modeling

| Property | E, GPa | |
|---|---|---|
| Component limits | Min, mol. % | Max, mol. % |
| $P_2O_5 + B_2O_3$ | 30 | 75 |
| $P_2O_5$ | 20 | 75 |
| $Al_2O_3$ | 0 | 20 |
| $B_2O_3$ | 0 | 35 |
| $TiO_2$ | 0 | 20 |
| $Li_2O$ | 0 | 20 |
| $Y_2O_3$ | 0 | 20 |
| $La_2O_3$ | 0 | 20 |
| $CeO_2$ | 0 | 20 |
| $Nb_2O_5$ | 0 | 20 |
| $Ta_2O_5$ | 0 | 20 |
| $WO_3$ | 0 | 20 |
| $RE_mO_n$ | 0 | 20 |
| $Na_2O + K_2O$ | 0 | 20 |
| $Rb_2O + Cs_2O$ | 0 | 10 |
| $R_2O$ + RO | 0 | 25 |
| $R_mO_n$ | 99 | Not limited |
| Other species | 0 | Not limited |

TABLE 2

Property prediction model

| Property | Abbreviation | Unit | Predicting Parameter | Regression Formula | Composition Unit | Standard Deviation |
|---|---|---|---|---|---|---|
| Young's modulus | E | GPa | $P_E$ | Formula (II) | Mol. % | 10 |

FIG. 1 is a plot of the parameter $P_E$ calculated by Formula (II) as a function of the measured Young's modulus E for some Comparative Glasses ("Comp. Glasses") taken from the literature and some Exemplary Glasses ("Ex. Glasses"). As illustrated by the data in FIG. 1, the compositional dependence of the parameter $P_E$ had a deviation within a range of ±10 GPa of the measured Young's modulus E for the majority of glasses. This deviation corresponds to the standard deviation specified in Table 2.

In the expression for $P_E$, the term "$RE_mO_n-La_2O_3-Y_2O_3-Ce_2O_3-CeO_2$" refers to the residual amount of the rare earth metal oxides after deducting lanthanum, yttrium and cerium oxides that are accounted individually. Accordingly, this term approximately considers the impacts of the rare earth metal oxides other than lanthanum, yttrium and cerium oxides on the Young's modulus E.

The term "$\max(0,\min(B_2O_3, P_2O_5-3*Al_2O_3-(3*RE_mO_n+R_2O+MgO+CaO)))$" describes the anomalously high Young's modulus observed in the data set for some aluminoborophosphate glasses with high content of $P_2O_5$. The anomaly was observed when the content of $P_2O_5$ in the glass composition exceeded the total amount of $P_2O_5$ that, according to stoichiometry, can be bound in metaphosphates of alumina ($Al_2O_3*3P_2O_5$), rare earth metals ($RE_2O_3*3P_2O_5$), monovalent metals ($R_2O*P_2O_5$) and magnesium and calcium oxides ($RO*P_2O_5$, where R=Mg or Ca).

Not referring to any specific theory, it is believed that the residual amount of $P_2O_5$, which can be calculated as $P_2O_5-(3*Al_2O_3+3*RE_mO_n+R_2O+MgO+CaO)$, can be bound with $B_2O_3$, forming some structural units containing only bridging oxygen atoms, where boron and phosphorus atoms are fourfold-coordinated like those in crystalline boron phosphate ($BPO_4$). Then, in the case when the difference $P_2O_5-(3*Al_2O_3+3*RE_mO_n+R_2O+MgO+CaO)$ is positive, it is believed that alumina is also bounded with $P_2O_5$.

In the case when the value of $P_2O_5-(3*Al_2O_3+3*RE_mO_n+R_2O+MgO+CaO)$ exceeds the amount of $B_2O_3$, it is believed that the effective amount of $P_2O_5$ is equal to the content of $B_2O_3$ in the glass composition. Accordingly, the quantity "min($B_2O_3$, $P_2O_5$−(3*$Al_2O_3$+3*$RE_mO_n$+$R_2O$+MgO+CaO))" works both in cases when the glass composition has an excess of $P_2O_5$ and an excess of $B_2O_3$.

In turn, in the case when the content of $P_2O_5$ in the glass composition is insufficient to bind alumina, rare earth metals, monovalent metals and divalent metals in their metaphosphates (corresponding to negative values of min($B_2O_3$, $P_2O_5$−(3*$Al_2O_3$+3*$RE_mO_n$+$R_2O$+MgO+CaO)), it is believed that binding of $P_2O_5$ with $B_2O_3$ does not take place, which means that the anomalous effect does not occur. Accordingly, the term "max(0,min($B_2O_3$, $P_2O_5$−(3*$Al_2O_3$+3*$RE_mO_n$+$R_2O$+MgO+CaO)))" generalizes the above-presented expression to the case when this quantity is equal to zero.

According to some data (see, for example, Ohkawa H., Min K. H., Akiyama R., Yamamoto K., Sugimoto N., Refractive index behavior in phosphate glass from the viewpoint of $B_3^+$ and $Al_3^+$ coordination., J. Non-Cryst. Solids, 2008, vol. 354, No. 2-9, p. 90-93), the glasses containing simultaneously $P_2O_5$, $Al_2O_3$, $B_2O_3$ and some monovalent and/or divalent metal oxides, the composition dependences of physical properties may become nonlinear because of coordination changes of cations. In turn, this may cause variable (including sign-changed) deviations of predicted values of those properties from the measured values. The above-described nonlinear term is assumed to approximately consider the effects of the mentioned coordination changes on the Young's modulus of glasses and, therefore, reduce the error of prediction for this property.

Table 3 identifies the combination of components and their respective amounts according to some embodiments of the present disclosure. The Exemplary Glasses A in Table 3 may include additional components according to any aspects of the present disclosure as described herein.

TABLE 3

| Exemplary Glasses A | |
|---|---|
| Composition | Amount (mol. %) |
| $B_2O_3$ | 0.3 to 50.0 mol. % |
| $P_2O_5$ | 0.0 to 75.0 mol. % |
| MgO | 0.5 to 15.0 mol. % |
| $Al_2O_3$ | 0.0 to 30.0 mol. % |
| Sum of ($P_2O_5$ + $B_2O_3$) | 15.0 to 75.0 mol. % |
| Total sum of monovalent metal oxides $R_2O$ | 0.3 to 15.0 mol. % |
| Sum of ($R_2O$ + RO + $SnO_2$ + $MnO_2$) | 0.8 to 15.0 mol. % |
| Sum of ($TeO_2$ + $GeO_2$) | 0.0 to 5.0 mol. % |

Exemplary Glasses A according to embodiments of the present disclosure may optionally fluorine (F) in an amount 0.0 to 0.5 at. %.

According to some embodiments of the present disclosure, Exemplary Glasses A may also satisfy the following condition:

$$(Li_2O+Na_2O)/R_2O[mol.\ \%]\geq 0.75,$$

where chemical formulas refer to the amounts of the components in the glass composition, expressed in mol. %.

Table 4 identifies the combination of components and their respective amounts according to some embodiments of the present disclosure. The Exemplary Glasses B in Table 4 may include additional components according to any aspects of the present disclosure as described herein.

TABLE 4

| Exemplary Glasses B | |
|---|---|
| Composition | Amount (mol. %) |
| $P_2O_5$ | 40.0 to 75.0 mol. % |
| $B_2O_3$ | 0.5 to 10.5 mol. % |
| $Al_2O_3$ | 0.0 to 25.0 mol. % |
| Sum of ($R_2O$ + RO) | 2 0.5 mol. % |
| Sum of ($K_2O$ + $Rb_2O$ + $Cs_2O$) | 0.0 to 9.5 mol. % |

Exemplary Glasses B according to embodiments of the present disclosure may also optionally contain fluorine (F) in an amount 0.0 to 5.0 at. %.

Exemplary Glasses B according to embodiments of the present disclosure may also satisfy the following condition:

$$P_2O_5/(3*Al_2O_3+B_2O_3)[mol.\ \%]\leq 1.3,$$

where chemical formulas refer to the amounts of the components in the glass composition, expressed in mol. %.

According to some embodiments of the present disclosure, Exemplary Glasses B may also satisfy the following condition:

$$3*Al_2O_3+R_2O+RO-P_2O_5[mol.\ \%]\geq -7.0,$$

where chemical formulas refer to the amounts of components in glass, expressed in mol. %.

According to some embodiments of the present disclosure, Exemplary Glasses B may also satisfy the following condition:

$$Al_2O_3-R_2O-RO[mol.\ \%]\geq 7.95,$$

where chemical formulas refer to the amounts of components in glass, expressed in mol. %.

Table 5 identifies the combination of components and their respective amounts according to some embodiments of the present disclosure. The Exemplary Glasses C in Table 5 may include additional components according to any aspects of the present disclosure as described herein.

TABLE 5

| Exemplary Glasses C | |
|---|---|
| Composition | Amount (mol. %) |
| $P_2O_5$ | 40.0 to 75.0 mol. % |
| $Al_2O_3$ | 3.0 to 30.0 mol. % |
| $Li_2O$ | 0.0 to 20.0 mol. % |
| ZnO | 0.0 to 15.0 mol. % |
| $B_2O_3$ | 0.0 to 15.0 mol. % |
| Sum of ($TiO_2$ + $La_2O_3$ + $Y_2O_3$ + $Ce_2O_3$ + $CeO_2$ + $ZrO_2$) | 0.5 to 20.0 mol. % |
| Sum of ($R_2O$ + RO + $B_2O_3$) | >0.5 mol. % |
| Sum of ($R_2O$ + RO) | 0.0 to 28.0 mol. % |
| Total sum of divalent metal oxides RO | 0.0 to 20.0 mol. % |

Exemplary Glasses C according to embodiments of the present disclosure may optionally contain fluorine (F) in an amount 0.0 to 1.0 at. %.

According to some embodiments of the present disclosure, Exemplary Glasses C may also have a Young's modulus E [GPa] of greater than or equal to 75.

EXAMPLES

The following examples describe various features and advantages provided by the disclosure, and are in no way intended to limit the invention and appended claims.

Figure 2:
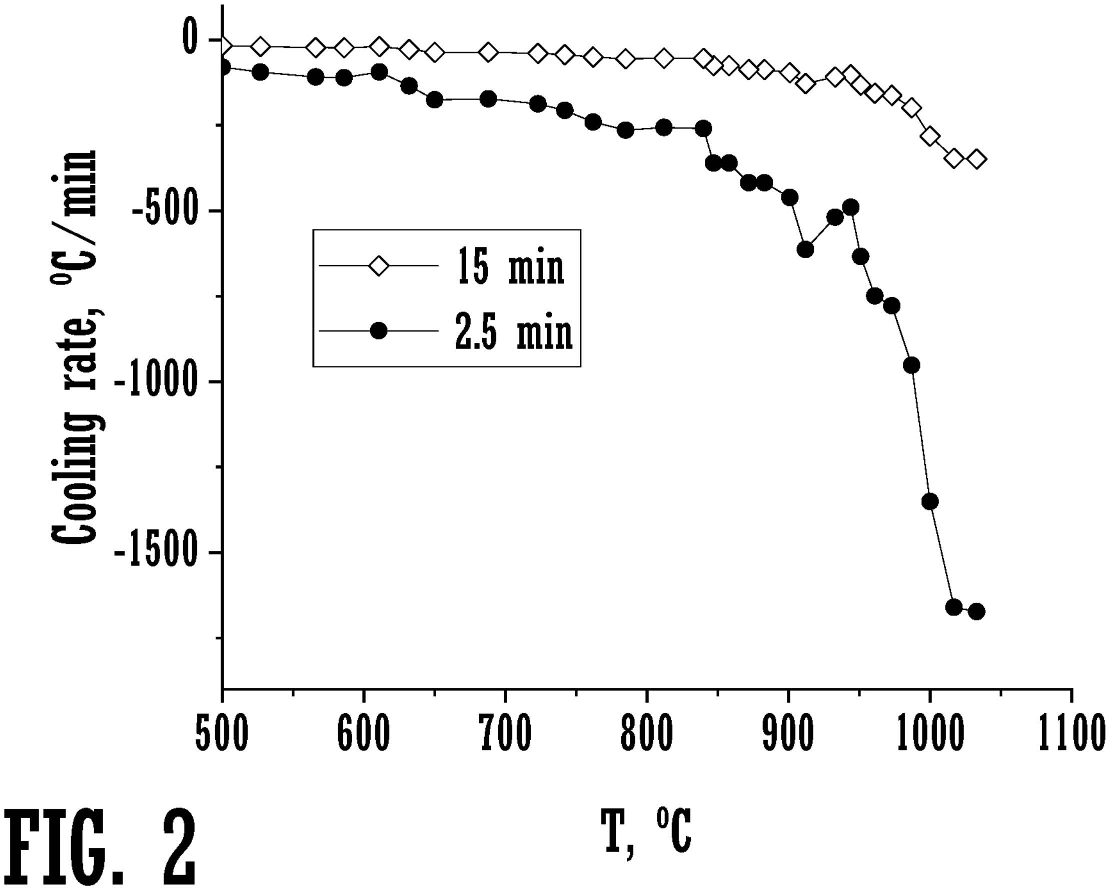
FIG. 2 is a plot of an exemplary cooling schedule according to a "15 min devit test" condition for some Exemplary Glasses according to an embodiment of the present disclosure.

To prepare the glass samples for some exemplary glasses of the present disclosure, about 15 grams of each sample (content of target species was more than 99.99 wt %) was melted from batch raw materials at a temperature of 1300-1500° C. in platinum or platinum-rhodium crucibles (Pt:Rh=80:20) for 1 hour. Two controlled cooling conditions were applied. In the first condition (referred to as "15 min test" or "15 min devit test"), the cooling conditions were controlled so that it took about 15 min for the samples to cool from 1100° C. to 500° C. in air inside a furnace. In the second condition (referred to as "2.5 min test" or "2.5 min devit test"), the cooling conditions were controlled so that it took about 2.5 min for the samples to cool from 1100° C. to 500° C. in air inside a furnace. Temperature readings were obtained by direct reading of the furnace temperature or using an IR camera reading with calibration scaling. The first condition (15 min test) approximately corresponds to a cooling rate of up to 300° C./min at a temperature of 1000° C. and the second test approximately corresponds to a cooling rate of up to 600° C./min at 1000° C. (the temperature of 1000° C. corresponds approximately to the temperature at which the cooling rate was expected to approach a maximum). When the temperature is lower, the cooling rate also decreases significantly. Typical schedules of the first and second cooling regimes are shown in FIG. 2. For these samples, observations referred to as "15-min devit test" and "2.5-min devit test" are specified in Table 6 below; the observation "1" is used to denote that a glass composition passed the indicated devit test, where a composition is deemed to have passed the indicated devit test if a melt of the composition forms a glass free of crystals visible under an optical microscope under magnification from 100× to 500×. The observation "0" is used to denote that a glass composition failed the indicated devit test.

No direct chemical analysis of some of the glass samples was performed because chemical analysis was performed for similar samples prepared in independent meltings by XRF method (X-ray fluorescence—for all oxides, except for $B_2O_3$ and $Li_2O$), by ICP method (inductively coupled plasma mass spectrometry—for $B_2O_3$) and by FES method (flame emission spectrometry—for $Li_2O$). These analyses gave deviations from the batched compositions within ±1.0-1.5 mass % for the major components such as $Al_2O_3$ which is equivalent to about 1 mol %.

To prepare other glass samples for exemplary glasses of the present disclosure, unless otherwise specified, a one kilogram batch was prepared in a pure platinum crucible. The crucible was placed in a furnace set at a temperature of 1300-1500° C. for 4 hours. The glass melt was then poured on a steel table and annealed at temperature close to $T_g$ for an hour. The annealed glasses were inspected under an optical microscope to check for crystallization and were found to be crystal free. The glass quality observed under the optical microscope was good and the samples were free of striae and bubbles. The samples were analyzed by XRF and FES methods.

Table 6 summarizes representative glass compositions in accordance with the present disclosure and selected properties of each. In Table 6, $T_{200\ P}$ refers to the temperature at which the glass has a viscosity of 200 Poise and $T_x$ refers to the temperature corresponding to the onset of crystallization.

TABLE 6

| Exemplary Glass Compositions | | | | | |
|---|---|---|---|---|---|
| Exemplary Glass | | 1 | 2 | 3 | 4 |
| Composition-mol. % | | | | | |
| $P_2O_5$ | mol. % | 62.19 | 58.97 | 57.07 | 64.97 |
| $Al_2O_3$ | mol. % | 17.48 | 17.53 | 15.84 | 29.99 |
| $B_2O_3$ | mol. % | 4.85 | 7.60 | 2.90 | 0 |
| $La_2O_3$ | mol. % | 2.91 | 5.91 | 5.84 | 0 |
| $Li_2O$ | mol. % | 7.74 | 7.77 | 7.69 | 2.52 |
| $TiO_2$ | mol. % | 0 | 0 | 0 | 2.50 |
| MgO | mol. % | 0 | 1.16 | 0.93 | 0 |
| $Na_2O$ | mol. % | 0.95 | 1.03 | 0.0223 | 0 |
| $CeO_2$ | mol. % | 0.97 | 0.0377 | 1.95 | 0 |
| CaO | mol. % | 0.96 | 0 | 1.93 | 0 |
| $Y_2O_3$ | mol. % | 1.95 | 0 | 5.83 | 0 |
| $SiO_2$ | mol. % | 0 | 0 | 0 | 0.0209 |
| Exemplary Glass Compositions | | | | | |
| Exemplary Glass | | 5 | 6 | 7 | 8 |
| Composition-mol. % | | | | | |
| $P_2O_5$ | mol. % | 64.98 | 64.98 | 64.93 | 60.02 |
| $Al_2O_3$ | mol. % | 24.99 | 19.99 | 19.98 | 20.01 |
| $B_2O_3$ | mol. % | 0 | 0 | 0 | 0 |
| $La_2O_3$ | mol. % | 0 | 0 | 0 | 0 |
| $Li_2O$ | mol. % | 4.99 | 7.48 | 10.00 | 0 |
| $TiO_2$ | mol. % | 5.00 | 7.51 | 5.00 | 10.00 |
| MgO | mol. % | 0 | 0 | 0 | 0 |
| $Na_2O$ | mol. % | 0 | 0 | 0 | 9.97 |
| $CeO_2$ | mol. % | 0 | 0 | 0 | 0 |
| CaO | mol. % | 0.022 | 0.0216 | 0.0426 | 0 |
| $Y_2O_3$ | mol. % | 0 | 0 | 0 | 0 |
| $SiO_2$ | mol. % | 0.0205 | 0.0201 | 0.0398 | 0 |
| Composition constraints | | | | | |
| $P_2O_5 + B_2O_3$ | mol. % | 67.37 | 66.58 | 60.57 | 64.97 |
| $R_2O + RO + SnO_2 + MnO_2$ | mol. % | 9.701 | 9.949 | 10.67 | 2.521 |

TABLE 6-continued

| | | | | | |
|---|---|---|---|---|---|
| $(Li_2O + Na_2O)/R_2O$ | mol. % | 1.000 | 1.000 | 1.000 | 1.000 |
| $R_2O + RO$ | mol. % | 9.701 | 9.949 | 10.67 | 2.521 |
| $3 * Al_2O_3 + R_2O + RO - P_2O_5$ | mol. % | −0.1054 | 3.568 | 1.015 | 27.51 |
| $Al_2O_3 - R_2O - RO$ | mol. % | 7.860 | 7.585 | 5.319 | 27.46 |
| $TiO_2 + La_2O_3 + Y_2O_3 + Ce_2O_3 + CeO_2 + ZrO_2$ | mol. % | 5.371 | 5.932 | 12.77 | 2.499 |
| $R_2O + RO + B_2O_3$ | mol. % | 14.58 | 17.55 | 13.61 | 2.521 |
| Composition constraints | | | | | |
| $P_2O_5 + B_2O_3$ | mol. % | 64.98 | 64.98 | 64.93 | 60.02 |
| $R_2O + RO + SnO_2 + MnO_2$ | mol. % | 5.012 | 7.506 | 10.05 | 9.972 |
| $(Li_2O + Na_2O)/R_2O$ | mol. % | 1.000 | 1.000 | 1.000 | 1.000 |
| $R_2O + RO$ | mol. % | 5.012 | 7.506 | 10.05 | 9.972 |
| $3 * Al_2O_3 + R_2O + RO - P_2O_5$ | mol. % | 15.01 | 2.493 | 5.056 | 9.967 |
| $Al_2O_3 - R_2O - RO$ | mol. % | 19.98 | 12.48 | 9.936 | 10.03 |
| $TiO_2 + La_2O_3 + Y_2O_3 + Ce_2O_3 + CeO_2 + ZrO_2$ | mol. % | 4.998 | 7.506 | 4.999 | 10.00 |
| $R_2O + RO + B_2O_3$ | mol. % | 5.012 | 7.506 | 10.05 | 9.972 |
| Measured properties | | | | | |
| $d_{RT}$ | $g/cm^3$ | 2.683 | 2.727 | 2.866 | |
| E | GPa | 72.880 | 70.743 | | 80.051 |
| μ | | 0.20900 | 0.22400 | | 0.20100 |
| $E/d_{RT}$ | $GPa \cdot cm^3/g$ | 27.160 | 25.950 | | |
| $n_d$ | | 1.5322 | 1.5345 | | |
| $v_d$ | | | 68.1 | | |
| $\alpha_{20-300} \times 10^7$ | $K^{-1}$ | 69.140 | 69.258 | 66.142 | 57.000 |
| $T_{liq}$ | ° C. | 1010 | 1310 | | |
| An.P. | ° C. | 516 | 507 | 522 | |
| $T_{soft}$ | ° C. | 663 | 648 | 665 | |
| $T_{200\ P}$ | ° C. | | 1187 | | |
| $Log(\eta_{liq})$ | P | | 2.55 | | |
| HCl[DIN12116] | $mg/cm^2$ | | 13.34 | | |
| HCl (5 wt %, 95° C., 24 hrs) | $mg/cm^2$ | | 20.170 | | |
| NaOH[ISO695] | $mg/cm^2$ | | 121.41 | | |
| vHF loss | $mg/cm^2$ | 0.29 | 0.46 | | |
| Weathering-85° C./85% RH | $mg/cm^2$ | | 0.63 | | |
| Measured properties | | | | | |
| $d_{RT}$ | $g/cm^3$ | | | | |
| E | GPa | 79.844 | 78.603 | 75.707 | 81.775 |
| μ | | 0.20400 | 0.21000 | 0.21700 | 0.21500 |
| $E/d_{RT}$ | $GPa \cdot cm^3/g$ | | | | |
| $n_d$ | | | | | |
| $v_d$ | | | | | |
| $\alpha_{20-300} \times 10^7$ | $K^{-1}$ | 64.000 | 73.000 | 82.000 | 69.000 |
| $T_{liq}$ | ° C. | | | | |
| An.P. | ° C. | | | | |
| $T_{soft}$ | ° C. | | | | |
| $T_{200\ P}$ | ° C. | | | | |
| $Log(\eta_{liq})$ | P | | | | |
| HCl[DIN12116] | $mg/cm^2$ | | | | |
| HCl (5 wt %, 95° C., 24 hrs) | $mg/cm^2$ | | | | |
| NaOH[ISO695] | $mg/cm^2$ | | | | |
| vHF loss | $mg/cm^2$ | | | | |
| Weathering-85° C./85% RH | $mg/cm^2$ | | | | |
| Predicted and calculated properties | | | | | |
| $I_B$, mol. % | | 22.223 | 28.987 | 44.751 | 27.504 |
| $P_E$ [for E] | GPa | 74.65 | 76.50 | 77.50 | 83.14 |
| Predicted and calculated properties | | | | | |
| $I_B$, mol. % | | 15.017 | 2.5147 | 5.0371 | 9.9693 |
| $P_E$ [for E] | GPa | 80.32 | 77.49 | 76.46 | 77.09 |

| Exemplary Glass | | 9 | 10 | 11 | 12 |
|---|---|---|---|---|---|
| Composition-mol. % | | | | | |
| $P_2O_5$ | mol. % | 59.97 | 59.99 | 54.99 | 58.32 |
| $Al_2O_3$ | mol. % | 16.99 | 16.99 | 14.00 | 16.01 |
| $B_2O_3$ | mol. % | 2.00 | 2.01 | 2.00 | 1.99 |
| $La_2O_3$ | mol. % | 3.00 | 0 | 6.00 | 2.00 |
| $Li_2O$ | mol. % | 5.01 | 5.01 | 9.99 | 2.98 |
| $TiO_2$ | mol. % | 5.00 | 7.99 | 9.99 | 6.70 |
| MgO | mol. % | 3.01 | 2.99 | 2.99 | 4.99 |
| $Na_2O$ | mol. % | 0 | 0 | 0 | 0 |
| $CeO_2$ | mol. % | 5.00 | 5.00 | 0 | 7.01 |

TABLE 6-continued

| | | | | | |
|---|---|---|---|---|---|
| $Y_2O_3$ | mol. % | 0 | 0 | 0 | 0 |
| $SiO_2$ | mol. % | 0.0215 | 0.0202 | 0.0418 | 0 |

| Exemplary Glass | | 13 | 14 | 15 | 16 |
|---|---|---|---|---|---|
| Composition-mol. % | | | | | |
| $P_2O_5$ | mol. % | 59.18 | 61.49 | 57.67 | 57.56 |
| $Al_2O_3$ | mol. % | 14.79 | 17.99 | 16.31 | 16.17 |
| $B_2O_3$ | mol. % | 7.69 | 7.50 | 3.63 | 2.78 |
| $La_2O_3$ | mol. % | 0 | 0 | 4.86 | 3.97 |
| $Li_2O$ | mol. % | 3.65 | 0 | 7.97 | 7.14 |
| $TiO_2$ | mol. % | 4.95 | 4.01 | 0.0838 | 1.62 |
| MgO | mol. % | 5.93 | 7.01 | 2.79 | 3.44 |
| $Na_2O$ | mol. % | 0 | 0 | 0.50 | 0.22 |
| $CeO_2$ | mol. % | 3.79 | 2.00 | 1.62 | 1.32 |
| $Y_2O_3$ | mol. % | 0 | 0 | 4.56 | 5.79 |
| $SiO_2$ | mol. % | 0.0197 | 0 | 0 | 0 |
| Composition constraints | | | | | |
| $P_2O_5 + B_2O_3$ | mol. % | 63.56 | 63.59 | 56.99 | 62.50 |
| $R_2O + RO + SnO_2 + MnO_2$ | mol. % | 8.217 | 8.196 | 12.98 | 8.264 |
| $(Li_2O + Na_2O)/R_2O$ | mol. % | 1.000 | 1.000 | 1.000 | 1.000 |
| $R_2O + RO$ | mol. % | 8.217 | 8.196 | 12.98 | 8.264 |
| $3 * Al_2O_3 + R_2O + RO - P_2O5$ | mol. % | −1.004 | −1.051 | 3.744E−03 | −2.397 |
| $Al_2O_3 - R_2O - RO$ | mol. % | 9.213 | 9.232 | 1.022 | 8.327 |
| $TiO_2 + La_2O_3 + Y_2O_3 + Ce_2O_3 + CeO_2 + ZrO_2$ | mol. % | 10.77 | 10.76 | 15.99 | 12.64 |
| $R_2O + RO + B_2O_3$ | mol. % | 10.27 | 10.26 | 14.98 | 10.33 |
| Composition constraints | | | | | |
| $P_2O_5 + B_2O_3$ | mol. % | 68.16 | 69.68 | 61.80 | 60.74 |
| $R_2O + RO + SnO_2 + MnO_2$ | mol. % | 9.764 | 7.085 | 11.35 | 10.87 |
| $(Li_2O + Na_2O)/R_2O$ | mol. % | 1.000 | 0 | 1.000 | 1.000 |
| $R_2O + RO$ | mol. % | 9.764 | 7.085 | 11.35 | 10.87 |
| $3 * Al_2O_3 + R_2O + RO - P_2O5$ | mol. % | −5.321 | −0.4993 | 2.551 | 1.763 |
| $Al_2O_3 - R_2O - RO$ | mol. % | 5.315 | 11.09 | 5.098 | 5.416 |
| $TiO_2 + La_2O_3 + Y_2O_3 + Ce_2O_3 + CeO_2 + ZrO_2$ | mol. % | 6.978 | 5.056 | 10.40 | 12.11 |
| $R_2O + RO + B_2O_3$ | mol. % | 17.60 | 14.66 | 15.01 | 13.66 |
| Measured properties | | | | | |
| $d_{RT}$ | g/cm$^3$ | 2.724 | 2.654 | 2.796 | 2.720 |
| E | GPa | 75.690 | 83.200 | 73.501 | 69.226 |
| μ | | 0.21400 | 0.20500 | 0.22300 | 0.21500 |
| $E/d_{RT}$ | GPa · cm$^3$/g | 26.100 | 31.430 | 26.290 | 25.450 |
| $n_d$ | | 1.553 | 1.5634 | 1.5877 | 1.5582 |
| $v_d$ | | 52.0 | 46.3 | 41.7 | 48.3 |
| $T_{liq}$ | ° C. | 1240 | 1280 | 1310 | 1280 |
| $T_g$ | ° C. | | 576 | | |
| An.P. | ° C. | 531 | 556 | 519 | 554 |
| HCl[DIN12116] | mg/cm$^2$ | 4.78 | 2.05 | 9.69 | 5.82 |
| NaOH[ISO695] | mg/cm$^2$ | 90.05 | 74.96 | 66.88 | 77.1 |
| vHF loss | mg/cm$^2$ | 0.29 | 0.12 | 0.34 | 0.39 |
| Weathering-85° C./85% RH | mg/cm$^2$ | 0.41 | 0.08 | 0.24 | 0.35 |
| 15-min devit test (0/1) | | 1 | 1 | 1 | 1 |
| Measured properties | | | | | |
| $d_{RT}$ | g/cm$^3$ | 2.595 | 2.560 | | |
| E | GPa | 76.397 | 76.741 | | |
| μ | | 0.20400 | 0.19900 | | |
| $E/d_{RT}$ | GPa · cm$^3$/g | 29.440 | 29.980 | | |
| $n_d$ | | 1.5438 | 1.5341 | | |
| $v_d$ | | 51.8 | 55.4 | | |
| $T_{liq}$ | ° C. | 1265 | 1250 | | |
| $T_g$ | ° C. | | | | |
| An.P. | ° C. | | | | |
| HCl[DIN12116] | mg/cm$^2$ | 3.26 | 2.29 | | |
| NaOH[ISO695] | mg/cm$^2$ | 79.38 | 89.48 | | |
| vHF loss | mg/cm$^2$ | 0.16 | 0.17 | | |
| Weathering-85° C./85% RH | mg/cm$^2$ | 0.21 | 0.16 | | |
| 15-min devit test (0/1) | | | | 1 | 1 |
| Predicted and calculated properties | | | | | |
| $I_B$, mol. % | | 25.038 | 16.021 | 20.105 | 26.724 |
| $P_E$ [for E] | GPa | 77.01 | 77.57 | 79.96 | 77.45 |

TABLE 6-continued

| | | | | | |
|---|---|---|---|---|---|
| Predicted and calculated properties | | | | | |
| $I_B$, mol. % | | 13.839 | 12.991 | 39.278 | 37.734 |
| $P_E$ [for E] | GPa | 75.25 | 76.39 | 76.75 | 77.44 |
| Exemplary Glass | | 17 | 18 | 19 | 20 |
| Composition-mol. % | | | | | |
| $P_2O_5$ | mol. % | 58.90 | 58.67 | 59.96 | 59.97 |
| $Al_2O_3$ | mol. % | 16.60 | 16.44 | 17.01 | 16.91 |
| $B_2O_3$ | mol. % | 3.31 | 2.58 | 4.42 | 3.70 |
| $La_2O_3$ | mol. % | 3.35 | 2.72 | 3.65 | 2.80 |
| $Li_2O$ | mol. % | 7.20 | 6.53 | 7.96 | 7.23 |
| $TiO_2$ | mol. % | 1.46 | 2.67 | 0.0813 | 1.42 |
| MgO | mol. % | 2.86 | 3.45 | 1.90 | 2.44 |
| $Na_2O$ | mol. % | 0.47 | 0.21 | 0.86 | 0.65 |
| $CeO_2$ | mol. % | 1.12 | 0.91 | 1.22 | 0.93 |
| $Y_2O_3$ | mol. % | 4.73 | 5.83 | 2.95 | 3.96 |
| Exemplary Glass | | 21 | 22 | 23 | 24 |
| Composition-mol. % | | | | | |
| $P_2O_5$ | mol. % | 59.90 | 59.69 | 61.42 | 61.32 |
| $Al_2O_3$ | mol. % | 16.82 | 16.67 | 17.46 | 17.33 |
| $B_2O_3$ | mol. % | 3.11 | 2.39 | 4.92 | 4.12 |
| $La_2O_3$ | mol. % | 2.19 | 1.53 | 2.88 | 2.05 |
| $Li_2O$ | mol. % | 6.65 | 5.99 | 7.93 | 7.14 |
| $TiO_2$ | mol. % | 2.47 | 3.71 | 0.0638 | 1.50 |
| MgO | mol. % | 2.88 | 3.45 | 1.33 | 1.95 |
| $Na_2O$ | mol. % | 0.46 | 0.21 | 1.11 | 0.84 |
| $CeO_2$ | mol. % | 0.73 | 0.51 | 0.96 | 0.68 |
| $Y_2O_3$ | mol. % | 4.79 | 5.86 | 1.92 | 3.08 |
| Composition constraints | | | | | |
| $P_2O_5 + B_2O_3$ | mol. % | 62.57 | 61.53 | 64.78 | 63.97 |
| $R_2O + RO + SnO_2 + MnO_2$ | mol. % | 10.58 | 10.24 | 10.78 | 10.36 |
| $(Li_2O + Na_2O)/R_2O$ | mol. % | 1.000 | 1.000 | 1.000 | 1.000 |
| $R_2O + RO$ | mol. % | 10.58 | 10.24 | 10.78 | 10.36 |
| $3 * Al_2O_3 + R_2O + RO - P_2O_5$ | mol. % | 1.422 | 0.8313 | 1.791 | 1.082 |
| $Al_2O_3 - R_2O - RO$ | mol. % | 6.110 | 6.273 | 6.331 | 6.635 |
| $TiO_2 + La_2O_3 + Y_2O_3 + Ce_2O_3 + CeO_2 + ZrO_2$ | mol. % | 10.16 | 11.73 | 7.327 | 8.684 |
| $R_2O + RO + B_2O_3$ | mol. % | 13.91 | 12.83 | 15.23 | 14.07 |
| Composition constraints | | | | | |
| $P_2O_5 + B_2O_3$ | mol. % | 63.24 | 62.23 | 66.66 | 65.66 |
| $R_2O + RO + SnO_2 + MnO_2$ | mol. % | 10.02 | 9.671 | 10.42 | 9.968 |
| $(Li_2O + Na_2O)/R_2O$ | mol. % | 1.000 | 1.000 | 1.000 | 1.000 |
| $R_2O + RO$ | mol. % | 10.02 | 9.671 | 10.42 | 9.968 |
| $3 * Al_2O_3 + R_2O + RO - P_2O_5$ | mol. % | 0.5520 | −0.04162 | 1.341 | 0.5988 |
| $Al_2O_3 - R_2O - RO$ | mol. % | 6.863 | 7.039 | 7.124 | 7.418 |
| $TiO_2 + La_2O_3 + Y_2O_3 + Ce_2O_3 + CeO_2 + ZrO_2$ | mol. % | 9.852 | 11.38 | 5.372 | 6.981 |
| $R_2O + RO + B_2O_3$ | mol. % | 13.14 | 12.06 | 15.37 | 14.11 |
| Measured properties | | | | | |
| $d_{RT}$ | $g/cm^3$ | 2.670 | 2.660 | | |
| E | GPa | 69.300 | 69.100 | | |
| $E/d_{RT}$ | $GPa \cdot cm^3/g$ | 25.960 | 25.980 | | |
| $T_g$ | ° C. | | 536 | | |
| vHF appearance | | | | | OK |
| 15-min devit test (0/1) | | 1 | 1 | 1 | 1 |
| Measured properties | | | | | |
| $d_{RT}$ | $g/cm^3$ | 2.635 | | 2.700 | |
| E | GPa | 70.900 | | 75.400 | |
| $E/d_{RT}$ | $GPa \cdot cm^3/g$ | 26.910 | | 27.930 | |
| $T_g$ | ° C. | 523 | | | 522 |
| vHF appearance | | | OK | | |
| 15-min devit test (0/1) | | 1 | 1 | 1 | 1 |
| Predicted and calculated properties | | | | | |
| $I_B$, mol. % | | 32.309 | 31.772 | 29.626 | 27.807 |
| $P_E$ [for E] | GPa | 76.69 | 77.31 | 75.57 | 76.11 |

TABLE 6-continued

| | | | | | |
|---|---|---|---|---|---|
| Predicted and calculated properties | | | | | |
| $I_B$, mol. % | | 26.803 | 26.042 | 23.546 | 22.145 |
| $P_E$ [for E] | GPa | 76.58 | 77.19 | 74.81 | 75.46 |
| Exemplary Glass | | 25 | 26 | 27 | 28 |
| Composition-mol. % | | | | | |
| $P_2O_5$ | mol. % | 61.22 | 61.16 | 61.04 | 59.95 |
| $Al_2O_3$ | mol. % | 17.22 | 17.12 | 16.97 | 16.99 |
| $B_2O_3$ | mol. % | 3.53 | 2.94 | 2.13 | 2.00 |
| $La_2O_3$ | mol. % | 1.43 | 0.82 | 0 | 6.00 |
| $Li_2O$ | mol. % | 6.57 | 6.00 | 5.27 | 6.02 |
| $TiO_2$ | mol. % | 2.55 | 3.61 | 5.01 | 6.00 |
| MgO | mol. % | 2.42 | 2.85 | 3.47 | 3.00 |
| $Na_2O$ | mol. % | 0.65 | 0.45 | 0.20 | 0 |
| $CeO_2$ | mol. % | 0.48 | 0.27 | 0 | 0.0381 |
| CaO | mol. % | 0 | 0 | 0 | 0.0234 |
| $Y_2O_3$ | mol. % | 3.93 | 4.77 | 5.91 | 0 |
| Exemplary Glass | | 29 | 30 | 31 | 32 |
| Composition-mol. % | | | | | |
| $P_2O_5$ | mol. % | 59.96 | 58.42 | 60.00 | 58.52 |
| $Al_2O_3$ | mol. % | 16.99 | 16.06 | 17.00 | 16.13 |
| $B_2O_3$ | mol. % | 2.01 | 2.01 | 2.00 | 2.00 |
| $La_2O_3$ | mol. % | 5.15 | 6.00 | 4.52 | 5.24 |
| $Li_2O$ | mol. % | 5.72 | 7.24 | 5.49 | 6.90 |
| $TiO_2$ | mol. % | 5.72 | 7.23 | 5.51 | 6.89 |
| MgO | mol. % | 3.01 | 2.99 | 3.00 | 3.01 |
| $Na_2O$ | mol. % | 0.0211 | 0 | 0.021 | 0.0208 |
| $CeO_2$ | mol. % | 1.41 | 0.0376 | 2.47 | 1.27 |
| CaO | mol. % | 0.0233 | 0.0231 | 0 | 0.023 |
| $Y_2O_3$ | mol. % | 0 | 0 | 0 | 0 |
| Composition constraints | | | | | |
| $P_2O_5 + B_2O_3$ | mol. % | 64.91 | 64.18 | 63.17 | 61.96 |
| $R_2O + RO + SnO_2 + MnO_2$ | mol. % | 9.666 | 9.318 | 8.935 | 9.036 |
| $(Li_2O + Na_2O)/R_2O$ | mol. % | 1.000 | 1.000 | 1.000 | 1.000 |
| $R_2O + RO$ | mol. % | 9.666 | 9.318 | 8.935 | 9.036 |
| $3 * Al_2O_3 + R_2O + RO - P_2O_5$ | mol. % | 0.06508 | −0.4793 | −1.178 | 0.03884 |
| $Al_2O_3 - R_2O - RO$ | mol. % | 7.591 | 7.830 | 8.039 | 7.954 |
| $TiO_2 + La_2O_3 + Y_2O_3 + Ce_2O_3 + CeO_2 + ZrO_2$ | mol. % | 8.171 | 9.349 | 10.92 | 12.01 |
| $R_2O + RO + B_2O_3$ | mol. % | 13.20 | 12.26 | 11.07 | 11.03 |
| Composition constraints | | | | | |
| $P_2O_5 + B_2O_3$ | mol. % | 62.40 | 60.44 | 62.77 | 60.90 |
| $R_2O + RO + SnO_2 + MnO_2$ | mol. % | 8.839 | 10.25 | 8.617 | 10.02 |
| $(Li_2O + Na_2O)/R_2O$ | mol. % | 1.000 | 1.000 | 1.000 | 1.000 |
| $R_2O + RO$ | mol. % | 8.839 | 10.25 | 8.617 | 10.02 |
| $3 * Al_2O_3 + R_2O + RO - P_2O_5$ | mol. % | −0.2246 | 4.816E−03 | −0.4980 | −0.1643 |
| $Al_2O_3 - R_2O - RO$ | mol. % | 8.266 | 5.817 | 8.595 | 6.219 |
| $TiO_2 + La_2O_3 + Y_2O_3 + Ce_2O_3 + CeO_2 + ZrO_2$ | mol. % | 11.65 | 13.25 | 11.40 | 12.84 |
| $R_2O + RO + B_2O_3$ | mol. % | 10.86 | 12.26 | 10.64 | 12.03 |
| Measured properties | | | | | |
| $d_{RT}$ | $g/cm^3$ | | 2.590 | 2.550 | |
| E | GPa | | 72.400 | 72.000 | |
| $E/d_{RT}$ | $GPa \cdot cm^3/g$ | | 27.950 | 28.240 | |
| $\alpha_{20-300} \times 10^7$ | $K^{-1}$ | | | | |
| 15-min devit test (0/1) | | 1 | 1 | 1 | 1 |
| Measured properties | | | | | |
| $d_{RT}$ | $g/cm^3$ | | 2.710 | | |
| E | GPa | | 72.900 | | |
| $E/d_{RT}$ | $GPa \cdot cm^3/g$ | | 26.900 | | |
| $\alpha_{20-300} \times 10^7$ | $K^{-1}$ | | | 66.000 | |
| 15-min devit test (0/1) | | 1 | 1 | 1 | 1 |
| Predicted and calculated properties | | | | | |
| $I_B$, mol. % | | 21.091 | 20.080 | 18.667 | 20.114 |
| $P_E$ [for E] | GPa | 75.93 | 76.41 | 77.03 | 78.34 |

TABLE 6-continued

| Predicted and calculated properties | | | | | |
|---|---|---|---|---|---|
| $I_B$, mol. % | | 21.426 | 20.100 | 22.490 | 21.316 |
| $P_E$ [for E] | GPa | 77.97 | 78.84 | 77.68 | 78.49 |
| Exemplary Glass | | 33 | 34 | 35 | 36 |
| Composition-mol. % | | | | | |
| $P_2O_5$ | mol. % | 57.34 | 60.00 | 58.53 | 57.48 |
| $Al_2O_3$ | mol. % | 15.41 | 17.00 | 16.13 | 15.50 |
| $B_2O_3$ | mol. % | 2.01 | 1.99 | 1.99 | 2.00 |
| $La_2O_3$ | mol. % | 6.00 | 3.88 | 4.65 | 5.25 |
| $Li_2O$ | mol. % | 8.11 | 5.29 | 6.71 | 7.74 |
| $TiO_2$ | mol. % | 8.09 | 5.29 | 6.69 | 7.74 |
| MgO | mol. % | 2.99 | 2.99 | 3.00 | 3.01 |
| $Na_2O$ | mol. % | 0 | 0.0209 | 0.0207 | 0.0206 |
| $CeO_2$ | mol. % | 0.0372 | 3.54 | 2.26 | 1.25 |
| CaO | mol. % | 0.0229 | 0 | 0.0229 | 0.0228 |
| Exemplary Glass | | 37 | 38 | 39 | 40 |
| Composition-mol. % | | | | | |
| $P_2O_5$ | mol. % | 56.30 | 58.42 | 57.31 | 56.29 |
| $Al_2O_3$ | mol. % | 14.80 | 16.06 | 15.40 | 14.78 |
| $B_2O_3$ | mol. % | 2.01 | 2.00 | 2.01 | 2.00 |
| $La_2O_3$ | mol. % | 6.00 | 3.94 | 4.59 | 5.21 |
| $Li_2O$ | mol. % | 8.93 | 6.55 | 7.65 | 8.67 |
| $TiO_2$ | mol. % | 8.92 | 6.56 | 7.65 | 8.68 |
| MgO | mol. % | 2.99 | 3.01 | 3.00 | 3.01 |
| $Na_2O$ | mol. % | 0 | 0.0206 | 0.0205 | 0.0204 |
| $CeO_2$ | mol. % | 0.0369 | 3.43 | 2.35 | 1.31 |
| CaO | mol. % | 0.0227 | 0 | 0.0227 | 0.0225 |
| Composition constraints | | | | | |
| $P_2O_5 + B_2O_3$ | mol. % | 59.36 | 63.11 | 61.21 | 59.85 |
| $R_2O + RO + SnO_2 + MnO_2$ | mol. % | 11.12 | 8.455 | 9.861 | 10.86 |
| $(Li_2O + Na_2O)/R_2O$ | mol. % | 1.000 | 1.000 | 1.000 | 1.000 |
| $R_2O + RO$ | mol. % | 11.12 | 8.455 | 9.861 | 10.86 |
| $3 * Al_2O_3 + R_2O + RO - P_2O_5$ | mol. % | 0.02417 | −0.7045 | −0.3870 | −0.1954 |
| $Al_2O_3 - R_2O - RO$ | mol. % | 4.294 | 8.851 | 6.456 | 4.735 |
| $TiO_2 + La_2O_3 + Y_2O_3 + Ce_2O_3 + CeO_2 + ZrO_2$ | mol. % | 14.11 | 11.13 | 12.61 | 13.70 |
| $R_2O + RO + B_2O_3$ | mol. % | 13.13 | 10.48 | 11.88 | 12.87 |
| Composition constraints | | | | | |
| $P_2O_5 + B_2O_3$ | mol. % | 58.32 | 61.48 | 60.02 | 58.67 |
| $R_2O + RO + SnO_2 + MnO_2$ | mol. % | 11.94 | 9.748 | 10.82 | 11.80 |
| $(Li_2O + Na_2O)/R_2O$ | mol. % | 1.000 | 1.000 | 1.000 | 1.000 |
| $R_2O + RO$ | mol. % | 11.94 | 9.748 | 10.82 | 11.80 |
| $3 * Al_2O_3 + R_2O + RO - P_2O_5$ | mol. % | 0.02909 | −0.6631 | −0.4212 | −0.2223 |
| $Al_2O_3 - R_2O - RO$ | mol. % | 2.856 | 6.596 | 4.766 | 3.083 |
| $TiO_2 + La_2O_3 + Y_2O_3 + Ce_2O_3 + CeO_2 + ZrO_2$ | mol. % | 14.94 | 12.43 | 13.57 | 14.65 |
| $R_2O + RO + B_2O_3$ | mol. % | 13.95 | 11.78 | 12.85 | 13.81 |
| Measured properties | | | | | |
| $d_{RT}$ | $g/cm^3$ | | 2.670 | | |
| E | GPa | | 71.700 | | |
| $E/d_{RT}$ | $GPa \cdot cm^3/g$ | | 26.850 | | |
| $\alpha_{20-300} \times 10^7$ | $K^{-1}$ | | 63.600 | | |
| 15-min devit test (0/1) | | 1 | 1 | 1 | 1 |
| Measured properties | | | | | |
| $d_{RT}$ | $g/cm^3$ | | | | 2.710 |
| E | GPa | | | | 72.600 |
| $E/d_{RT}$ | $GPa \cdot cm^3/g$ | | | | 26.790 |
| $\alpha_{20-300} \times 10^7$ | $K^{-1}$ | | | | 69.700 |
| 15-min devit test (0/1) | | 1 | 1 | 1 | 1 |
| Predicted and calculated properties | | | | | |
| $I_B$, mol. % | | 20.112 | 23.570 | 22.296 | 21.258 |
| $P_E$ [for E] | GPa | 79.20 | 77.40 | 78.22 | 78.83 |

TABLE 6-continued

| Predicted and calculated properties | | | | | |
|---|---|---|---|---|---|
| $I_B$, mol. % | | 20.118 | 23.471 | 22.380 | 21.337 |
| $P_E$ [for E] | GPa | 79.54 | 77.95 | 78.60 | 79.20 |

| Exemplary Glass | | 41 | 42 | 43 | 44 |
|---|---|---|---|---|---|
| Composition-mol. % | | | | | |
| $P_2O_5$ | mol. % | 56.90 | 59.48 | 54.74 | 56.72 |
| $Al_2O_3$ | mol. % | 16.98 | 16.70 | 16.99 | 16.73 |
| $B_2O_3$ | mol. % | 5.05 | 1.99 | 7.21 | 4.80 |
| $La_2O_3$ | mol. % | 3.00 | 2.71 | 3.00 | 2.74 |
| $Li_2O$ | mol. % | 3.48 | 4.43 | 2.39 | 3.05 |
| $TiO_2$ | mol. % | 5.00 | 5.50 | 4.99 | 5.45 |
| MgO | mol. % | 4.53 | 3.57 | 5.60 | 4.93 |
| $Na_2O$ | mol. % | 0.0409 | 0.0415 | 0.0607 | 0.0409 |
| $CeO_2$ | mol. % | 5.00 | 5.58 | 5.00 | 5.52 |
| CaO | mol. % | 0.0226 | 0 | 0.0224 | 0.0226 |

| Exemplary Glass | | 45 | 46 | 47 | 48 |
|---|---|---|---|---|---|
| Composition-mol. % | | | | | |
| $P_2O_5$ | mol. % | 59.12 | 54.63 | 56.39 | 58.76 |
| $Al_2O_3$ | mol. % | 16.48 | 16.72 | 16.52 | 16.28 |
| $B_2O_3$ | mol. % | 2.01 | 6.87 | 4.79 | 2.00 |
| $La_2O_3$ | mol. % | 2.49 | 2.74 | 2.54 | 2.28 |
| $Li_2O$ | mol. % | 3.99 | 2.05 | 2.66 | 3.55 |
| $TiO_2$ | mol. % | 5.85 | 5.44 | 5.79 | 6.22 |
| MgO | mol. % | 4.01 | 5.96 | 5.33 | 4.44 |
| $Na_2O$ | mol. % | 0.0413 | 0.0606 | 0.0408 | 0.0412 |
| $CeO_2$ | mol. % | 6.01 | 5.51 | 5.93 | 6.44 |
| CaO | mol. % | 0 | 0.0223 | 0.0225 | 0 |
| Composition constraints | | | | | |
| $P_2O_5 + B_2O_3$ | mol. % | 63.53 | 63.23 | 63.54 | 63.26 |
| $R_2O + RO + SnO_2 + MnO_2$ | mol. % | 8.283 | 8.269 | 8.283 | 8.274 |
| $(Li_2O + Na_2O)/R_2O$ | mol. % | 1.000 | 1.000 | 1.000 | 1.000 |
| $R_2O + RO$ | mol. % | 8.283 | 8.269 | 8.283 | 8.274 |
| $3 * Al_2O_3 + R_2O + RO - P_2O_5$ | mol. % | 2.178 | −1.366 | 4.402 | 1.547 |
| $Al_2O_3 - R_2O - RO$ | mol. % | 9.133 | 8.914 | 9.138 | 8.926 |
| $TiO_2 + LaO_3 + Y_2O_3 + Ce_2O_3 + CeO_2 + ZrO_2$ | mol. % | 10.77 | 11.31 | 10.76 | 11.26 |
| $R_2O + RO + B_2O_3$ | mol. % | 13.46 | 10.32 | 15.67 | 13.21 |
| Composition constraints | | | | | |
| $P_2O_5 + B_2O_3$ | mol. % | 63.02 | 63.24 | 63.04 | 62.78 |
| $R_2O + RO + SnO_2 + MnO_2$ | mol. % | 8.282 | 8.327 | 8.298 | 8.294 |
| $(Li_2O + Na_2O)/R_2O$ | mol. % | 1.000 | 1.000 | 1.000 | 1.000 |
| $R_2O + RO$ | mol. % | 8.282 | 8.327 | 8.298 | 8.294 |
| $3 * Al_2O_3 + R_2O + RO - P_2O_5$ | mol. % | −1.688 | 3.733 | 1.269 | −1.971 |
| $Al_2O_3 - R_2O - RO$ | mol. % | 8.712 | 8.866 | 8.729 | 8.522 |
| $TiO_2 + LaO_3 + Y_2O_3 + Ce_2O_3 + CeO_2 + ZrO_2$ | mol. % | 11.70 | 11.24 | 11.63 | 12.11 |
| $R_2O + RO + B_2O_3$ | mol. % | 10.35 | 15.39 | 13.23 | 10.36 |
| Measured properties | | | | | |
| E | GPa | 72.390 | | | |
| 15-min devit test (0/1) | | 1 | 1 | 1 | 1 |
| Measured properties | | | | | |
| E | GPa | | | 77.460 | |
| 15-min devit test (0/1) | | 1 | 1 | 1 | 1 |
| Predicted and calculated properties | | | | | |
| $I_B$, mol. % | | 31.129 | 25.537 | 35.464 | 31.091 |
| $P_E$ [for E] | GPa | 78.58 | 77.13 | 79.69 | 78.57 |
| Predicted and calculated properties | | | | | |
| $I_B$, mol. % | | 25.881 | 35.221 | 31.402 | 26.253 |
| $P_E$ [for E] | GPa | 77.21 | 79.64 | 78.65 | 77.31 |

| Exemplary Glass | | 49 | 50 | 51 | 52 |
|---|---|---|---|---|---|
| Composition-mol. % | | | | | |
| $P_2O_5$ | mol. % | 53.97 | 55.76 | 59.49 | 58.92 |
| $Al_2O_3$ | mol. % | 16.50 | 16.28 | 17.49 | 18.06 |
| $B_2O_3$ | mol. % | 7.14 | 5.00 | 2.00 | 1.99 |

TABLE 6-continued

| | | | | | |
|---|---|---|---|---|---|
| $La_2O_3$ | mol. % | 2.51 | 2.30 | 3.00 | 3.00 |
| $Li_2O$ | mol. % | 1.46 | 2.10 | 5.00 | 4.99 |
| $TiO_2$ | mol. % | 5.82 | 6.18 | 5.00 | 5.00 |
| MgO | mol. % | 6.55 | 5.89 | 3.00 | 3.00 |
| $Na_2O$ | mol. % | 0.0603 | 0.0608 | 0.0208 | 0.0415 |
| $ZrO_2$ | mol. % | 0 | 0 | 0 | 0 |
| $CeO_2$ | mol. % | 5.97 | 6.40 | 5.00 | 5.00 |
| CaO | mol. % | 0.0222 | 0.0224 | 0 | 0 |

| Exemplary Glass | | 53 | 54 | 55 | 56 |
|---|---|---|---|---|---|
| Composition-mol. % | | | | | |
| $P_2O_5$ | mol. % | 59.01 | 58.49 | 58.52 | 58.04 |
| $Al_2O_3$ | mol. % | 17.61 | 18.48 | 18.12 | 18.90 |
| $B_2O_3$ | mol. % | 2.04 | 1.99 | 2.04 | 2.01 |
| $La_2O_3$ | mol. % | 3.05 | 3.00 | 3.04 | 3.00 |
| $Li_2O$ | mol. % | 5.09 | 4.98 | 5.09 | 5.02 |
| $TiO_2$ | mol. % | 5.07 | 5.00 | 5.07 | 4.99 |
| MgO | mol. % | 3.05 | 2.99 | 3.04 | 2.99 |
| $Na_2O$ | mol. % | 0.0206 | 0.0414 | 0.0206 | 0.0414 |
| $ZrO_2$ | mol. % | 1.52 | 0 | 1.41 | 0 |
| $CeO_2$ | mol. % | 3.56 | 5.00 | 3.66 | 5.00 |
| CaO | mol. % | 0 | 0.0229 | 0 | 0.0229 |
| Composition constraints | | | | | |
| $P_2O_5 + B_2O_3$ | mol. % | 62.99 | 62.76 | 63.06 | 62.47 |
| $R_2O + RO + SnO_2 + MnO_2$ | mol. % | 8.345 | 8.347 | 8.229 | 8.234 |
| $(Li_2O + Na_2O)/R_2O$ | mol. % | 1.000 | 1.000 | 1.000 | 1.000 |
| $R_2O + RO$ | mol. % | 8.345 | 8.347 | 8.229 | 8.234 |
| $3 * Al_2O_3 + R_2O + RO - P_2O_5$ | mol. % | 3.732 | 1.213 | 1.040 | 3.385 |
| $Al_2O_3 - R_2O - RO$ | mol. % | 8.660 | 8.475 | 9.712 | 10.29 |
| $TiO_2 + La_2O_3 + Y_2O_3 + Ce_2O_3 + CeO_2 + ZrO_2$ | mol. % | 11.66 | 12.07 | 10.77 | 10.77 |
| $R_2O + RO + B_2O_3$ | mol. % | 15.71 | 13.51 | 10.28 | 10.28 |
| Composition constraints | | | | | |
| $P_2O_5 + B_2O_3$ | mol. % | 62.15 | 62.03 | 61.68 | 61.58 |
| $R_2O + RO + SnO_2 + MnO_2$ | mol. % | 8.305 | 8.247 | 8.299 | 8.277 |
| $(Li_2O + Na_2O)/R_2O$ | mol. % | 1.000 | 1.000 | 1.000 | 1.000 |
| $R_2O + RO$ | mol. % | 8.305 | 8.247 | 8.299 | 8.277 |
| $3 * Al_2O_3 + R_2O + RO - P_2O_5$ | mol. % | 2.002 | 5.122 | 4.068 | 6.910 |
| $Al_2O_3 - R_2O - RO$ | mol. % | 9.619 | 10.71 | 10.16 | 11.11 |
| $TiO_2 + La_2O_3 + Y_2O_3 + Ce_2O_3 + CeO_2 + ZrO_2$ | mol. % | 11.62 | 10.76 | 11.56 | 10.75 |
| $R_2O + RO + B_2O_3$ | mol. % | 10.38 | 10.29 | 10.37 | 10.33 |
| Measured properties | | | | | |
| E | GPa | | | 88.920 | |
| 15-min devit test (0/1) | | 1 | 1 | 1 | 1 |
| Measured properties | | | | | |
| E | GPa | 93.030 | 86.740 | 90.590 | |
| 15-min devit test (0/1) | | 1 | 1 | 1 | 1 |
| Predicted and calculated properties | | | | | |
| $I_B$, mol. % | | 36.166 | 32.226 | 27.020 | 29.296 |
| $P_E$ [for E] | GPa | 79.89 | 78.87 | 77.63 | 78.35 |
| Predicted and calculated properties | | | | | |
| $I_B$, mol. % | | 23.797 | 30.986 | 26.114 | 32.702 |
| $P_E$ [for E] | GPa | 78.97 | 78.88 | 79.53 | 79.42 |

| Exemplary Glass | | 57 | 58 | 59 | 60 |
|---|---|---|---|---|---|
| Composition-mol. % | | | | | |
| $P_2O_5$ | mol. % | 58.11 | 58.76 | 56.47 | 55.69 |
| $Al_2O_3$ | mol. % | 18.52 | 16.09 | 16.12 | 15.36 |
| $B_2O_3$ | mol. % | 2.03 | 2.92 | 2.87 | 3.63 |
| $WO_3$ | mol. % | 0 | 0 | 0 | 0 |
| $La_2O_3$ | mol. % | 3.04 | 0 | 0.88 | 0.79 |
| $Nb_2O_5$ | mol. % | 0 | 0 | 0 | 0 |
| $Li_2O$ | mol. % | 5.08 | 5.00 | 5.60 | 5.52 |
| $TiO_2$ | mol. % | 5.06 | 9.82 | 8.58 | 10.21 |
| MgO | mol. % | 3.04 | 3.29 | 4.45 | 4.59 |
| $Na_2O$ | mol. % | 0.0412 | 0.0386 | 0.0389 | 0.0383 |
| $ZrO_2$ | mol. % | 1.42 | 0 | 0 | 0 |
| $CeO_2$ | mol. % | 3.65 | 4.08 | 5.00 | 4.16 |
| CaO | mol. % | 0 | 0 | 0 | 0 |

TABLE 6-continued

| | | | | | |
|---|---|---|---|---|---|
| $Y_2O_3$ | mol. % | 0 | 0 | 0 | 0 |
| $SiO_2$ | mol. % | 0 | 0 | 0 | 0 |
| $TaO_5$ | mol. % | 0 | 0 | 0 | 0 |
| Exemplary Glass | | 61 | 62 | 63 | 64 |
| Composition-mol. % | | | | | |
| $P_2O_5$ | mol. % | 53.91 | 53.28 | 52.09 | 0 |
| $Al_2O_3$ | mol. % | 15.48 | 14.76 | 14.00 | 0 |
| $B_2O_3$ | mol. % | 3.52 | 4.23 | 4.99 | 21.48 |
| $WO_3$ | mol. % | 0 | 0 | 0 | 20.98 |
| $La_2O_3$ | mol. % | 1.52 | 1.40 | 1.46 | 17.09 |
| $Nb_2O_5$ | mol. % | 0 | 0 | 0 | 17.19 |
| $Li_2O$ | mol. % | 6.00 | 5.92 | 5.99 | 0.82 |
| $TiO_2$ | mol. % | 9.01 | 10.59 | 12.05 | 12.29 |
| MgO | mol. % | 5.52 | 5.62 | 5.94 | 0.70 |
| $Na_2O$ | mol. % | 0.0386 | 0.038 | 0.0375 | 0 |
| $ZrO_2$ | mol. % | 0 | 0 | 0 | 8.00 |
| $CeO_2$ | mol. % | 5.00 | 4.16 | 3.46 | 0 |
| CaO | mol. % | 0 | 0 | 0 | 0.60 |
| $Y_2O_3$ | mol. % | 0 | 0 | 0 | 0.80 |
| $SiO_2$ | mol. % | 0 | 0 | 0 | 0.0312 |
| $TaO_5$ | mol. % | 0 | 0 | 0 | 0.017 |
| Composition constraints | | | | | |
| $P_2O_5 + B_2O_3$ | mol. % | 61.26 | 62.97 | 60.86 | 60.58 |
| $R_2O + RO + SnO_2 + MnO_2$ | mol. % | 8.309 | 8.506 | 10.35 | 10.37 |
| $(Li_2O + Na_2O)/R_2O$ | mol. % | 1.000 | 1.000 | 1.000 | 1.000 |
| $R_2O + RO$ | mol. % | 8.309 | 8.506 | 10.35 | 10.37 |
| $3 * Al_2O_3 + R_2O + RO - P_2O_5$ | mol. % | 5.722 | −2.215 | 2.022 | 0.5648 |
| $Al_2O_3 - R_2O - RO$ | mol. % | 10.56 | 7.916 | 6.182 | 5.323 |
| $TiO_2 + La_2O_3 + Y_2O_3 + Ce_2O_3 + CeO_2 + ZrO_2$ | mol. % | 11.56 | 12.11 | 12.26 | 13.36 |
| $R_2O + RO + B_2O_3$ | mol. % | 10.38 | 11.49 | 13.29 | 14.08 |
| Composition constraints | | | | | |
| $P_2O_5 + B_2O_3$ | mol. % | 58.91 | 58.74 | 58.08 | 21.48 |
| $R_2O + RO + SnO_2 + MnO_2$ | mol. % | 11.85 | 11.82 | 12.18 | 2.114 |
| $(Li_2O + Na_2O)/R_2O$ | mol. % | 1.000 | 1.000 | 1.000 | 1.000 |
| $R_2O + RO$ | mol. % | 11.85 | 11.82 | 12.18 | 2.114 |
| $3 * Al_2O_3 + R_2O + RO - P_2O_5$ | mol. % | 4.182 | 2.625 | 1.902 | 2.114 |
| $Al_2O_3 - R_2O - RO$ | mol. % | 4.021 | 3.260 | 2.066 | −2.114 |
| $TiO_2 + La_2O_3 + Y_2O_3 + Ce_2O_3 + CeO_2 + ZrO_2$ | mol. % | 13.36 | 14.37 | 15.50 | 38.18 |
| $R_2O + RO + B_2O_3$ | mol. % | 15.46 | 16.14 | 17.26 | 23.60 |
| Measured properties | | | | | |
| $d_{RT}$ | g/cm³ | | | 2.653 | 2.644 |
| E | GPa | 91.090 | | | |
| $E/d_{RT}$ | GPa · cm³/g | | | | |
| $T_g$ | ° C. | | | | |
| $T_x$ | | | | | |
| $T_x$-$T_g$ | ° C. | | | | |
| 15-min devit test (0/1) | | 1 | 1 | 1 | 1 |
| Measured properties | | | | | |
| $d_{RT}$ | g/cm³ | 2.665 | 2.658 | 2.662 | |
| E | GPa | 76.200 | 79.600 | 79.600 | 123.00 |
| $E/d_{RT}$ | GPa · cm³/g | 28.590 | 29.950 | 29.900 | |
| $T_g$ | ° C. | 545 | | 559 | |
| $T_x$ | | 787 | | 765 | |
| $T_x$-$T_g$ | ° C. | 242 | | 206 | |
| 15-min devit test (0/1) | | 1 | 1 | 1 | |
| Predicted and calculated properties | | | | | |
| $I_B$, mol. % | | 27.710 | 12.999 | 22.469 | 19.061 |
| $P_E$ [for E] | GPa | 80.04 | 78.28 | 79.04 | 79.54 |
| Predicted and calculated properties | | | | | |
| $I_B$, mol. % | | 27.172 | 23.481 | 21.601 | 77.269 |
| $P_E$ [for E] | GPa | 80.11 | 80.54 | 81.17 | 111.2 |
| Exemplary Glass | | 65 | 66 | 67 | 68 |
| Composition-mol. % | | | | | |
| $B_2O_3$ | mol. % | 21.77 | 21.78 | 21.98 | 22.02 |
| $WO_3$ | mol. % | 20.56 | 20.55 | 20.25 | 20.19 |
| $La_2O_3$ | mol. % | 17.74 | 16.89 | 18.23 | 17.50 |

TABLE 6-continued

| | | | | | |
|---|---|---|---|---|---|
| $Nb_2O_2$ | mol. % | 16.77 | 16.75 | 16.45 | 16.39 |
| $Li_2O$ | mol. % | 0.81 | 0.81 | 0.81 | 0.81 |
| $TiO_2$ | mol. % | 12.72 | 12.73 | 13.03 | 13.09 |
| MgO | mol. % | 0.70 | 0.69 | 0.70 | 0.69 |
| $ZrO_2$ | mol. % | 7.71 | 7.71 | 7.51 | 7.46 |
| CaO | mol. % | 0.60 | 0.60 | 0.60 | 0.60 |
| $Y_2O_3$ | mol. % | 0.57 | 1.44 | 0.41 | 1.20 |
| $SiO_2$ | mol. % | 0.0311 | 0.031 | 0.0311 | 0.031 |
| $TaO_5$ | mol. % | 0.0169 | 0.0169 | 0.0169 | 0.0168 |

| Exemplary Glass | | 69 | 70 | 71 | 72 |
|---|---|---|---|---|---|
| Composition-mol. % | | | | | |
| $B_2O_3$ | mol. % | 21.99 | 22.20 | 22.23 | 22.24 |
| $WO_3$ | mol. % | 20.23 | 19.92 | 19.89 | 19.89 |
| $La_2O_3$ | mol. % | 16.74 | 18.72 | 17.95 | 17.35 |
| $Nb_2O_2$ | mol. % | 16.43 | 16.13 | 16.09 | 16.09 |
| $Li_2O$ | mol. % | 0.81 | 0.81 | 0.81 | 0.81 |
| $TiO_2$ | mol. % | 13.07 | 13.36 | 13.40 | 13.40 |
| MgO | mol. % | 0.69 | 0.69 | 0.69 | 0.69 |
| $ZrO_2$ | mol. % | 7.49 | 7.29 | 7.27 | 7.26 |
| CaO | mol. % | 0.60 | 0.60 | 0.60 | 0.59 |
| $Y_2O_3$ | mol. % | 1.91 | 0.23 | 1.04 | 1.65 |
| $SiO_2$ | mol. % | 0.0309 | 0.0311 | 0.0309 | 0.0308 |
| $TaO_5$ | mol. % | 0.0168 | 0.0169 | 0.0168 | 0.0168 |
| Composition constraints | | | | | |
| $P_2O_5 + B_2O_3$ | mol. % | 21.77 | 21.78 | 21.98 | 22.02 |
| $R_2O + RO + SnO_2 + MnO_2$ | mol. % | 2.111 | 2.101 | 2.108 | 2.099 |
| $(Li_2O + Na_2O)/R_2O$ | mol. % | 1.000 | 1.000 | 1.000 | 1.000 |
| $R_2O + RO$ | mol. % | 2.111 | 2.101 | 2.108 | 2.099 |
| $3 * Al_2O_3 + R_2O + RO - P_2O_5$ | mol. % | 2.111 | 2.101 | 2.108 | 2.099 |
| $Al_2O_3 - R_2O - RO$ | mol. % | −2.111 | −2.101 | −2.108 | −2.099 |
| $TiO_2 + La_2O_3 + Y_2O_3 +$ $Ce_2O_3 + CeO_2 +$ $ZrO_2$ | mol. % mol. % | 38.74 | 38.77 | 39.17 | 39.24 |
| $R_2O + RO + B_2O_3$ | mol. % | 23.88 | 23.88 | 24.09 | 24.12 |
| Composition constraints | | | | | |
| $P_2O_5 + B_2O_3$ | mol. % | 21.99 | 22.20 | 22.23 | 22.24 |
| $R_2O + RO + SnO_2 + MnO_2$ | mol. % | 2.091 | 2.106 | 2.096 | 2.089 |
| $(Li_2O + Na_2O)/R_2O$ | mol. % | 1.000 | 1.000 | 1.000 | 1.000 |
| $R_2O + RO$ | mol. % | 2.091 | 2.106 | 2.096 | 2.089 |
| $3 * Al_2O_3 + R_2O + RO - P_2O_5$ | mol. % | 2.091 | 2.106 | 2.096 | 2.089 |
| $Al_2O_3 - R_2O - RO$ | mol. % | −2.091 | −2.106 | −2.096 | −2.089 |
| $TiO_2 + La_2O_3 + Y_2O_3 +$ $Ce_2O_3 + CeO_2 +$ $ZrO_2$ | mol. % mol. % | 39.21 | 39.60 | 39.65 | 39.66 |
| $R_2O + RO + B_2O_3$ | mol. % | 24.08 | 24.30 | 24.32 | 24.32 |
| Measured properties | | | | | |
| vHF loss | $mg/cm^2$ | | | | 0.1 |
| vHF appearance | | | | | shiny |
| 15-min devit test (0/1) | | 1 | 1 | 1 | 1 |
| Measured properties | | | | | |
| vHF loss | $mg/cm^2$ | | | | |
| vHF appearance | | | | | |
| 15-min devit test (0/1) | | 1 | 1 | 1 | 1 |
| Predicted and calculated properties | | | | | |
| $I_B$, mol. % | | 78.821 | 78.876 | 79.984 | 80.192 |
| $P_E$ [for E] | GPa | 111.1 | 111.1 | 111.1 | 111.0 |
| Predicted and calculated properties | | | | | |
| $I_B$, mol. % | | 80.059 | 81.167 | 81.299 | 81.322 |
| $P_E$ [for E] | GPa | 111.0 | 111.0 | 111.0 | 110.9 |

| Exemplary Glass | | 73 | 74 | 75 | 76 |
|---|---|---|---|---|---|
| Composition-mol. % | | | | | |
| $P_2O_5$ | mol. % | 0 | 0 | 0 | 0 |
| $Al_2O_3$ | mol. % | 0 | 0 | 0 | 0 |
| $B_2O_3$ | mol. % | 22.21 | 22.48 | 22.49 | 22.49 |
| $WO_3$ | mol. % | 19.91 | 19.49 | 19.50 | 19.49 |
| $La_2O_3$ | mol. % | 16.59 | 19.39 | 18.50 | 17.86 |
| $Nb_2O_5$ | mol. % | 16.12 | 15.70 | 15.69 | 15.69 |
| $Li_2O$ | mol. % | 0.80 | 0.81 | 0.81 | 0.80 |

TABLE 6-continued

| | | | | | |
|---|---|---|---|---|---|
| $TiO_2$ | mol. % | 13.38 | 13.79 | 13.79 | 13.79 |
| MgO | mol. % | 0.69 | 0.69 | 0.69 | 0.69 |
| $Na_2O$ | mol. % | 0 | 0 | 0 | 0 |
| $ZrO_2$ | mol. % | 7.28 | 7.00 | 7.00 | 7.01 |
| CaO | mol. % | 0.59 | 0.60 | 0.60 | 0.59 |
| $Y_2O_3$ | mol. % | 2.38 | 0 | 0.90 | 1.54 |
| $SiO_2$ | mol. % | 0.0307 | 0.031 | 0.0309 | 0.0308 |
| $TaO_5$ | mol. % | 0.0167 | 0.0127 | 0.0126 | 0.0167 |

| Exemplary Glass | | 77 | 78 | 79 | 80 |
|---|---|---|---|---|---|
| Composition-mol. % | | | | | |
| $P_2O_5$ | mol. % | 0 | 0 | 63.57 | 63.49 |
| $Al_2O_3$ | mol. % | 0 | 0 | 17.49 | 17.49 |
| $B_2O_3$ | mol. % | 22.49 | 22.50 | 7.19 | 6.63 |
| $WO_3$ | mol. % | 19.50 | 19.50 | 0 | 0 |
| $La_2O_3$ | mol. % | 17.23 | 16.40 | 0 | 0 |
| $Nb_2O_5$ | mol. % | 15.70 | 15.70 | 0 | 0 |
| $Li_2O$ | mol. % | 0.80 | 0.80 | 7.20 | 6.20 |
| $TiO_2$ | mol. % | 13.79 | 13.80 | 0 | 0 |
| MgO | mol. % | 0.69 | 0.68 | 3.99 | 4.01 |
| $Na_2O$ | mol. % | 0 | 0 | 0.019 | 1.07 |
| $ZrO_2$ | mol. % | 7.00 | 7.00 | 0.50 | 1.07 |
| CaO | mol. % | 0.59 | 0.59 | 0.021 | 0.0211 |
| $Y_2O_3$ | mol. % | 2.17 | 3.00 | 0 | 0 |
| $SiO_2$ | mol. % | 0.0307 | 0.0305 | 0.0196 | 0.0196 |
| $TaO_5$ | mol. % | 0.0167 | 0.0166 | 0 | 0 |
| Composition constraints | | | | | |
| $P_2O_5 + B_2O_3$ | mol. % | 22.21 | 22.48 | 22.49 | 22.49 |
| $R_2O + RO + SnO_2 + MnO_2$ | mol. % | 2.082 | 2.102 | 2.093 | 2.085 |
| $(Li_2O + Na_2O)/R_2O$ | mol. % | 1.000 | 1.000 | 1.000 | 1.000 |
| $R_2O + RO$ | mol. % | 2.082 | 2.102 | 2.093 | 2.085 |
| $3 * Al_2O_3 + R_2O + RO - P_2O_5$ | mol. % | 2.082 | 2.102 | 2.093 | 2.085 |
| $Al_2O_3 - R_2O - RO$ | mol. % | −2.082 | −2.102 | −2.093 | −2.085 |
| $TiO_2 + La_2O_3 + Y_2O_3 + Ce_2O_3 + CeO_2 + ZrO_2$ | mol. % | 39.63 | 40.18 | 40.19 | 40.19 |
| $R_2O + RO + B_2O_3$ | mol. % | 24.29 | 24.59 | 24.58 | 24.57 |
| Composition constraints | | | | | |
| $P_2O_5 + B_2O_3$ | mol. % | 22.49 | 22.50 | 70.76 | 70.12 |
| $R_2O + RO + SnO_2 + MnO_2$ | mol. % | 2.078 | 2.069 | 11.23 | 11.30 |
| $(Li_2O + Na_2O)/R_2O$ | mol. % | 1.000 | 1.000 | 1.000 | 1.000 |
| $R_2O + RO$ | mol. % | 2.078 | 2.069 | 11.23 | 11.30 |
| $3 * Al_2O_3 + R_2O + RO - P_2O_5$ | mol. % | 2.078 | 2.069 | 0.1359 | 0.2797 |
| $Al_2O_3 - R_2O - RO$ | mol. % | −2.078 | −2.069 | 6.263 | 6.190 |
| $TiO_2 + La_2O_3 + Y_2O_3 + Ce_2O_3 + CeO_2 + ZrO_2$ | mol. % | 40.19 | 40.19 | 0.4958 | 1.073 |
| $R_2O + RO + B_2O_3$ | mol. % | 24.57 | 24.57 | 18.42 | 17.93 |
| Measured properties | | | | | |
| 15-min devit test (0/1) | | 1 | 1 | 1 | 1 |
| E | GPa | | 123.90 | | |
| $\alpha_{20-300} \times 10^7$ | $K^1$ | | | | |
| Measured properties | | | | | |
| 15-min devit test (0/1) | | 1 | 1 | 1 | 1 |
| E | GPa | | 123.80 | 87.800 | |
| $\alpha_{20-300} \times 10^7$ | $K^1$ | | | 71.800 | |
| Predicted and calculated properties | | | | | |
| $I_B$, mol. % | | 81.223 | 82.768 | 82.763 | 82.770 |
| $P_E$ [for E] | GPa | 110.9 | 111.0 | 110.9 | 110.9 |
| Predicted and calculated properties | | | | | |
| $I_B$, mol. % | | 82.761 | 82.762 | 7.3325 | 6.8716 |
| $P_E$ [for E] | GPa | 110.8 | 110.8 | 73.71 | 73.68 |

| Exemplary Glass | | 81 | 82 | 83 | 84 |
|---|---|---|---|---|---|
| Composition-mol. % | | | | | |
| $P_2O_5$ | mol. % | 63.56 | 63.48 | 63.49 | 63.57 |
| $Al_2O_3$ | mol. % | 17.49 | 17.49 | 17.48 | 17.50 |
| $B_2O_3$ | mol. % | 6.63 | 6.20 | 6.14 | 6.20 |
| $Li_2O$ | mol. % | 7.20 | 5.43 | 6.28 | 7.20 |
| $TiO_2$ | mol. % | 0.57 | 0 | 0.53 | 0.99 |
| MgO | mol. % | 4.00 | 4.00 | 4.01 | 4.00 |
| $Na_2O$ | mol. % | 0.019 | 1.86 | 0.99 | 0.019 |

TABLE 6-continued

| | | | | | |
|---|---|---|---|---|---|
| $ZrO_2$ | mol. % | 0.50 | 1.50 | 1.04 | 0.50 |
| CaO | mol. % | 0.021 | 0.0211 | 0.0211 | 0.021 |
| $SiO_2$ | mol. % | 0.0196 | 0.0197 | 0.0197 | 0.0196 |

| Exemplary Glass | | 85 | 86 | 87 | 88 |
|---|---|---|---|---|---|
| Composition-mol. % | | | | | |
| $P_2O_5$ | mol. % | 63.43 | 63.48 | 63.53 | 63.56 |
| $Al_2O_3$ | mol. % | 17.50 | 17.49 | 17.50 | 17.49 |
| $B_2O_3$ | mol. % | 5.77 | 5.74 | 5.74 | 5.78 |
| $Li_2O$ | mol. % | 4.70 | 5.55 | 6.25 | 7.20 |
| $TiO_2$ | mol. % | 0 | 0.52 | 0.93 | 1.41 |
| MgO | mol. % | 4.01 | 4.00 | 3.99 | 4.00 |
| $Na_2O$ | mol. % | 2.63 | 1.74 | 0.99 | 0.019 |
| $ZrO_2$ | mol. % | 1.92 | 1.44 | 1.04 | 0.50 |
| CaO | mol. % | 0.0212 | 0.0211 | 0.0211 | 0.021 |
| $SiO_2$ | mol. % | 0.0198 | 0.0197 | 0.0197 | 0.0196 |
| Composition constraints | | | | | |
| $P_2O_5 + B_2O_3$ | mol. % | 70.19 | 69.68 | 69.63 | 69.76 |
| $R_2O + RO + SnO_2 + MnO_2$ | mol. % | 11.23 | 11.31 | 11.30 | 11.24 |
| $(Li_2O + Na_2O)/R_2O$ | mol. % | 1.000 | 1.000 | 1.000 | 1.000 |
| $R_2O + RO$ | mol. % | 11.23 | 11.31 | 11.30 | 11.24 |
| $3 * Al_2O_3 + R_2O + RO - P_2O_5$ | mol. % | 0.1345 | 0.3085 | 0.2561 | 0.1594 |
| $Al_2O_3 - R_2O - RO$ | mol. % | 6.254 | 6.185 | 6.176 | 6.257 |
| $TiO_2 + La_2O_3 + Y_2O_3 + Ce_2O_3 + CeO_2 + ZrO_2$ | mol. % | 1.070 | 1.500 | 1.567 | 1.483 |
| $R_2O + RO + B_2O_3$ | mol. % | 17.87 | 17.51 | 17.44 | 17.44 |
| Composition constraints | | | | | |
| $P_2O_5 + B_2O_3$ | mol. % | 69.20 | 69.22 | 69.27 | 69.34 |
| $R_2O + RO + SnO_2 + MnO_2$ | mol. % | 11.36 | 11.31 | 11.25 | 11.24 |
| $(Li_2O + Na_2O)/R_2O$ | mol. % | 1.000 | 1.000 | 1.000 | 1.000 |
| $R_2O + RO$ | mol. % | 11.36 | 11.31 | 11.25 | 11.24 |
| $3 * Al_2O_3 + R_2O + RO - P_2O_5$ | mol. % | 0.4225 | 0.3044 | 0.2042 | 0.1414 |
| $Al_2O_3 - R_2O - RO$ | mol. % | 6.137 | 6.180 | 6.251 | 6.247 |
| $TiO_2 + La_2O_3 + Y_2O_3 + Ce_2O_3 + CeO_2 + ZrO_2$ | mol. % | 1.921 | 1.962 | 1.967 | 1.910 |
| $R_2O + RO + B_2O_3$ | mol. % | 17.13 | 17.05 | 16.98 | 17.02 |
| Measured properties | | | | | |
| 15-min devit test (0/1) | | 1 | 1 | 1 | 1 |
| NaOH[ISO695] | $mg/cm^2$ | | | | |
| Measured properties | | | | | |
| 15-min devit test (0/1) | | 1 | 1 | 1 | 1 |
| NaOH[ISO695] | $mg/cm^2$ | 90 | | | 90 |
| Predicted and calculated properties | | | | | |
| $I_B$, mol. % | | 6.7587 | 6.5158 | 6.3585 | 6.3553 |
| $P_E$ [for E] | GPa | 73.93 | 73.63 | 73.88 | 74.09 |
| Predicted and calculated properties | | | | | |
| $I_B$, mol. % | | 6.1895 | 6.0352 | 5.9613 | 5.9065 |
| $P_E$ [for E] | GPa | 73.60 | 73.84 | 74.02 | 74.25 |

| Exemplary Glass | | 89 | 90 | 91 | 92 |
|---|---|---|---|---|---|
| Composition-mol. % | | | | | |
| $P_2O_5$ | mol. % | 63.35 | 63.43 | 63.47 | 63.53 |
| $Al_2O_3$ | mol. % | 17.48 | 17.50 | 17.50 | 17.50 |
| $B_2O_3$ | mol. % | 5.20 | 5.20 | 5.20 | 5.20 |
| $Li_2O$ | mol. % | 3.72 | 4.70 | 5.44 | 6.17 |
| $TiO_2$ | mol. % | 0 | 0.57 | 0.99 | 1.42 |
| MgO | mol. % | 4.00 | 3.99 | 4.00 | 3.99 |
| $Na_2O$ | mol. % | 3.70 | 2.65 | 1.86 | 1.07 |
| $ZrO_2$ | mol. % | 2.50 | 1.93 | 1.50 | 1.08 |
| CaO | mol. % | 0.0213 | 0.0212 | 0.0212 | 0.0211 |
| $K_2O$ | mol. % | 0 | 0 | 0 | 0 |
| $SiO_2$ | mol. % | 0.0199 | 0.0198 | 0.0197 | 0.0197 |

| Exemplary Glass | | 93 | 94 | 95 | 96 |
|---|---|---|---|---|---|
| Composition-mol. % | | | | | |
| $P_2O_5$ | mol. % | 63.56 | 65.31 | 65.46 | 65.27 |
| $Al_2O_3$ | mol. % | 17.48 | 16.98 | 16.97 | 16.97 |
| $B_2O_3$ | mol. % | 5.21 | 7.81 | 7.79 | 7.79 |

TABLE 6-continued

| | | | | | |
|---|---|---|---|---|---|
| $Li_2O$ | mol. % | 7.21 | 7.78 | 5.63 | 5.67 |
| $TiO_2$ | mol. % | 2.00 | 0 | 0 | 0 |
| MgO | mol. % | 4.00 | 2.06 | 2.93 | 3.08 |
| $Na_2O$ | mol. % | 0 | 0.0191 | 1.17 | 0.62 |
| $ZrO_2$ | mol. % | 0.50 | 0 | 0 | 0 |
| CaO | mol. % | 0.021 | 0.0212 | 0.0213 | 0.0213 |
| $K_2O$ | mol. % | 0 | 0 | 0 | 0.57 |
| $SiO_2$ | mol. % | 0.0196 | 0.0198 | 0.0199 | 0.0199 |
| Composition constraints | | | | | |
| $P_2O_5 + B_2O_3$ | mol. % | 68.55 | 68.63 | 68.67 | 68.72 |
| $R_2O + RO + SnO_2 + MnO_2$ | mol. % | 11.44 | 11.36 | 11.32 | 11.25 |
| $(Li_2O + Na_2O)/R_2O$ | mol. % | 1.000 | 1.000 | 1.000 | 1.000 |
| $R_2O + RO$ | mol. % | 11.44 | 11.36 | 11.32 | 11.25 |
| $K_2O + Rb_2O + CS_2O$ | mol. % | 0 | 0 | 0 | 0 |
| $3 * Al_2O_3 + R_2O + RO - P_2O_5$ | mol. % | 0.5446 | 0.4109 | 0.3323 | 0.2250 |
| $Al_2O_3 - R_2O - RO$ | mol. % | 6.041 | 6.139 | 6.178 | 6.247 |
| $TiO_2 + La_2O_3 + Y_2O_3 + Ce_2O_3 + CeO_2 + ZrO_2$ | mol. % | 2.502 | 2.498 | 2.496 | 2.505 |
| $R_2O + RO + B_2O_3$ | mol. % | 16.64 | 16.55 | 16.51 | 16.45 |
| Composition constraints | | | | | |
| $P_2O_5 + B_2O_3$ | mol. % | 68.77 | 73.12 | 73.26 | 73.06 |
| $R_2O + RO + SnO_2 + MnO_2$ | mol. % | 11.23 | 9.884 | 9.752 | 9.950 |
| $(Li_2O + Na_2O)/R_2O$ | mol. % | 1.000 | 1.000 | 1.000 | 0.9169 |
| $R_2O + RO$ | mol. % | 11.23 | 9.884 | 9.752 | 9.950 |
| $K_2O + Rb_2O + CS_2O$ | mol. % | 0 | 0 | 0 | 0.5697 |
| $3 * Al_2O_3 + R_2O + RO - P_2O_5$ | mol. % | 0.1210 | −4.491 | −4.792 | −4.407 |
| $Al_2O_3 - R_2O - RO$ | mol. % | 6.257 | 7.095 | 7.220 | 7.019 |
| $TiO_2 + La_2O_3 + Y_2O_3 + Ce_2O_3 + CeO_2 + ZrO_2$ | mol. % | 2.500 | 0 | 0 | 0 |
| $R_2O + RO + B_2O_3$ | mol. % | 16.43 | 17.69 | 17.55 | 17.74 |
| Measured properties | | | | | |
| $d_{RT}$ | $g/cm^3$ | | | | |
| E | GPa | 88.300 | | | |
| $E/d_{RT}$ | $GPa \cdot cm^3/g$ | | | | |
| $\alpha_{20-300} \times 10^7$ | $K^{-1}$ | 74.100 | | | |
| vHF loss | $mg/cm^2$ | | 0.1 | 0.1 | |
| vHF appearance | | | clear. shiny | clear. shiny | |
| 15-min devit test (0/1) | | 1 | 1 | 1 | 1 |
| Measured properties | | | | | |
| $d_{RT}$ | $g/cm^3$ | | 2.535 | | |
| E | GPa | 88.900 | 88.400 | | |
| $E/d_{RT}$ | $GPa \cdot cm^3/g$ | | 34.870 | | |
| $\alpha_{20-300} \times 10^7$ | $K^{-1}$ | 70.200 | | | |
| vHF loss | $mg/cm^2$ | | | | |
| vHF appearance | | | | | |
| 15-min devit test (0/1) | | 1 | 1 | 1 | 1 |
| Predicted and calculated properties | | | | | |
| $I_B$, mol. % | | 5.7073 | 5.6087 | 5.5308 | 5.4491 |
| $P_E$ [for E] | GPa | 73.55 | 73.81 | 74.01 | 74.21 |
| Predicted and calculated properties | | | | | |
| $I_B$, mol. % | | 5.3181 | 3.8075 | 2.9984 | 3.3771 |
| $P_E$ [for E] | GPa | 74.47 | 76.28 | 76.06 | 75.57 |

| Exemplary Glass | | 97 | 98 | 99 | 100 |
|---|---|---|---|---|---|
| Composition mol. % | | | | | |
| $P_2O_5$ | mol. % | 65.56 | 65.42 | 65.25 | 65.72 |
| $Al_2O_3$ | mol. % | 16.97 | 16.98 | 16.96 | 16.98 |
| $B_2O_3$ | mol. % | 7.81 | 7.79 | 7.81 | 7.81 |
| $Li_2O$ | mol. % | 4.05 | 3.81 | 4.05 | 2.41 |
| MgO | mol. % | 3.56 | 3.80 | 3.86 | 4.21 |
| $Na_2O$ | mol. % | 2.01 | 1.62 | 1.04 | 2.87 |
| CaO | mol. % | 0.0213 | 0.0214 | 0.0214 | 0 |
| $K_2O$ | mol. % | 0 | 0.53 | 0.99 | 0 |
| $SiO_2$ | mol. % | 0.0199 | 0.0199 | 0.0199 | 0 |

| Exemplary Glass | | 101 | 102 | 103 | 104 |
|---|---|---|---|---|---|
| Composition mol. % | | | | | |
| $P_2O_5$ | mol. % | 65.56 | 65.42 | 65.89 | 65.69 |
| $Al_2O_3$ | mol. % | 16.98 | 16.97 | 16.98 | 16.97 |

TABLE 6-continued

| | | | | | |
|---|---|---|---|---|---|
| $B_2O_3$ | mol. % | 7.81 | 7.81 | 7.80 | 7.81 |
| $Li_2O$ | mol. % | 2.25 | 2.29 | 0.20 | 0.24 |
| MgO | mol. % | 4.45 | 4.54 | 5.10 | 5.25 |
| $Na_2O$ | mol. % | 2.43 | 2.04 | 4.04 | 3.45 |
| CaO | mol. % | 0 | 0 | 0 | 0 |
| $K_2O$ | mol. % | 0.52 | 0.93 | 0 | 0.58 |
| $SiO_2$ | mol. % | 0 | 0 | 0 | 0 |
| Composition constraints | | | | | |
| $P_2O_5 + B_2O_3$ | mol. % | 73.37 | 73.21 | 73.05 | 73.53 |
| $R_2O + RO + SnO_2 + MnO_2$ | mol. % | 9.639 | 9.791 | 9.963 | 9.492 |
| $(Li_2O + Na_2O)/R_2O$ | mol. % | 1.000 | 0.9105 | 0.8370 | 1.000 |
| $R_2O + RO$ | mol. % | 9.639 | 9.791 | 9.963 | 9.492 |
| $K_2O + Rb_2O + Cs_2O$ | mol. % | 0 | 0.5341 | 0.9912 | 0 |
| $3 * Al_2O_3 + R_2O + RO - P_2O_5$ | mol. % | −4.999 | −4.699 | −4.391 | −5.281 |
| $Al_2O_3 - R_2O - RO$ | mol. % | 7.336 | 7.185 | 7.002 | 7.490 |
| $R_2O + RO + B_2O_3$ | mol. % | 17.44 | 17.59 | 17.77 | 17.30 |
| Composition constraints | | | | | |
| $P_2O_5 + B_2O_3$ | mol. % | 73.37 | 73.23 | 73.68 | 73.51 |
| $R_2O + RO + SnO_2 + MnO_2$ | mol. % | 9.650 | 9.798 | 9.338 | 9.520 |
| $(Li_2O + Na_2O)/R_2O$ | mol. % | 0.8994 | 0.8229 | 1.000 | 0.8648 |
| $R_2O + RO$ | mol. % | 9.650 | 9.798 | 9.338 | 9.520 |
| $K_2O + Rb_2O + Cs_2O$ | mol. % | 0.5236 | 0.9320 | 0 | 0.5774 |
| $3 * Al_2O_3 + R_2O + RO - P_2O_5$ | mol. % | −4.985 | −4.707 | −5.619 | −5.248 |
| $Al_2O_3 - R_2O - RO$ | mol. % | 7.326 | 7.174 | 7.639 | 7.455 |
| $R_2O + RO + B_2O_3$ | mol. % | 17.46 | 17.61 | 17.13 | 17.33 |
| Measured properties | | | | | |
| $d_{RT}$ | $g/cm^3$ | | 2.549 | | |
| E | GPa | | 89.700 | | |
| $E/d_{RT}$ | $GPa \cdot cm^3/g$ | | 35.190 | | |
| 15-min devit test (0/1) | | 1 | 1 | 1 | 1 |
| Measured properties | | | | | |
| $d_{RT}$ | $g/cm^3$ | | | 2.556 | |
| E | GPa | | | 88.000 | |
| $E/d_{RT}$ | $GPa \cdot cm^3/g$ | | | 34.430 | |
| 15-min devit test (0/1) | | 1 | 1 | 1 | 1 |
| Predicted and calculated properties | | | | | |
| $I_B$, mol. % | | 2.7833 | 3.0922 | 3.3995 | 2.5354 |
| $P_E$ [for E] | GPa | 75.90 | 75.43 | 75.09 | 75.78 |
| Predicted and calculated properties | | | | | |
| $I_B$, mol. % | | 2.8391 | 3.1031 | 2.1917 | 2.5753 |
| $P_E$ [for E] | GPa | 75.35 | 74.99 | 75.58 | 75.11 |

| Exemplary Glass | | 105 | 106 | 107 | 108 |
|---|---|---|---|---|---|
| Composition-mol. % | | | | | |
| $P_2O_5$ | mol. % | 62.94 | 63.12 | 62.93 | 62.74 |
| $Al_2O_3$ | mol. % | 17.45 | 17.63 | 17.75 | 17.85 |
| $B_2O_3$ | mol. % | 5.22 | 5.72 | 6.10 | 6.48 |
| $Li_2O$ | mol. % | 3.98 | 2.65 | 1.85 | 1.05 |
| $TiO_2$ | mol. % | 0 | 0 | 0.0151 | 0.0151 |
| MgO | mol. % | 4.14 | 3.99 | 4.00 | 4.01 |
| $Na_2O$ | mol. % | 3.75 | 4.06 | 4.35 | 4.63 |
| $ZrO_2$ | mol. % | 2.48 | 2.78 | 3.00 | 3.21 |
| CaO | mol. % | 0.0212 | 0.0214 | 0 | 0 |
| $SiO_2$ | mol. % | 0.0198 | 0.02 | 0.02 | 0.0201 |

| Exemplary Glass | | 109 | 110 | 111 | 112 |
|---|---|---|---|---|---|
| Composition-mol. % | | | | | |
| $P_2O_5$ | mol. % | 62.49 | 66.20 | 66.21 | 65.84 |
| $Al_2O_3$ | mol. % | 18.00 | 17.00 | 17.00 | 17.29 |
| $B_2O_3$ | mol. % | 7.00 | 7.80 | 7.80 | 7.85 |
| $Li_2O$ | mol. % | 0 | 0 | 0 | 0 |
| $TiO_2$ | mol. % | 0.0151 | 0 | 0 | 0 |
| MgO | mol. % | 3.99 | 4.99 | 6.15 | 3.57 |
| $Na_2O$ | mol. % | 5.00 | 4.01 | 2.83 | 4.29 |
| $ZrO_2$ | mol. % | 3.51 | 0 | 0 | 1.15 |
| CaO | mol. % | 0 | 0 | 0 | 0 |
| $SiO_2$ | mol. % | 0 | 0 | 0 | 0 |

TABLE 6-continued

| Composition constraints | | | | | |
|---|---|---|---|---|---|
| $P_2O_5 + B_2O_3$ | mol. % | 68.16 | 68.84 | 69.03 | 69.22 |
| $R_2O + RO + SnO_2 + MnO_2$ | mol. % | 11.89 | 10.72 | 10.19 | 9.686 |
| $(Li_2O + Na_2O)/R_2O$ | mol. % | 1.000 | 1.000 | 1.000 | 1.000 |
| $R_2O + RO$ | mol. % | 11.89 | 10.72 | 10.19 | 9.686 |
| $3 * Al_2O_3 + R_2O + RO - P_2O_5$ | mol. % | 1.308 | 0.5017 | 0.5079 | 0.5002 |
| $Al_2O_3 - R_2O - RO$ | mol. % | 5.569 | 6.911 | 7.554 | 8.167 |
| $TiO_2 + La_2O_3 + Y_2O_3 + Ce_2O_3 + CeO_2 + ZrO_2$ | mol. % | 2.483 | 2.784 | 3.011 | 3.224 |
| $R_2O + RO + B_2O_3$ | mol. % | 17.10 | 16.44 | 16.29 | 16.16 |
| Composition constraints | | | | | |
| $P_2O_5 + B_2O_3$ | mol. % | 69.49 | 74.00 | 74.01 | 73.70 |
| $R_2O + RO + SnO_2 + MnO_2$ | mol. % | 8.988 | 9.002 | 8.984 | 7.867 |
| $(Li_2O + Na_2O)/R_2O$ | mol. % | 1.000 | 1.000 | 1.000 | 1.000 |
| $R_2O + RO$ | mol. % | 8.988 | 9.002 | 8.984 | 7.867 |
| $3 * Al_2O_3 + R_2O + RO - P_2O_5$ | mol. % | 0.4885 | −6.188 | −6.215 | −6.117 |
| $Al_2O_3 - R_2O - RO$ | mol. % | 9.009 | 7.999 | 8.020 | 9.420 |
| $TiO_2 + La_2O_3 + Y_2O_3 + Ce_2O_3 + CeO_2 + ZrO_2$ | mol. % | 3.520 | 0 | 0 | 1.149 |
| $R_2O + RO + B_2O_3$ | mol. % | 15.99 | 16.80 | 16.79 | 15.72 |
| Measured properties | | | | | |
| 15-min devit test (0/1) | | 1 | 1 | 1 | 1 |
| Measured properties | | | | | |
| 15-min devit test (0/1) | | 1 | 1 | 1 | 1 |
| Predicted and calculated properties | | | | | |
| $I_B$, mol. % | | 6.5449 | 6.2132 | 6.6130 | 6.9886 |
| $P_E$ [for E] | GPa | 73.69 | 73.83 | 74.04 | 74.24 |
| Predicted and calculated properties | | | | | |
| $I_B$, mol. % | | 7.4997 | 1.6182 | 1.6038 | 1.7250 |
| $P_E$ [for E] | GPa | 74.53 | 75.99 | 76.46 | 76.86 |

| Exemplary Glass | | 113 | 114 | 115 | 116 |
|---|---|---|---|---|---|
| Composition-mol. % | | | | | |
| $P_2O_5$ | mol. % | 66.20 | 65.88 | 65.61 | 66.20 |
| $Al_2O_3$ | mol. % | 17.00 | 17.26 | 17.50 | 17.00 |
| $B_2O_3$ | mol. % | 7.81 | 7.85 | 7.90 | 7.80 |
| MgO | mol. % | 7.01 | 4.77 | 2.50 | 7.87 |
| $Na_2O$ | mol. % | 1.99 | 3.18 | 4.50 | 1.13 |
| $ZrO_2$ | mol. % | 0 | 1.06 | 1.99 | 0 |

| Exemplary Glass | | 117 | 118 | 119 | 120 |
|---|---|---|---|---|---|
| Composition-mol. % | | | | | |
| $P_2O_5$ | mol. % | 65.88 | 65.62 | 65.35 | 65.87 |
| $Al_2O_3$ | mol. % | 17.26 | 17.46 | 17.71 | 17.29 |
| $B_2O_3$ | mol. % | 7.86 | 7.89 | 7.94 | 7.85 |
| MgO | mol. % | 5.58 | 3.76 | 1.44 | 6.45 |
| $Na_2O$ | mol. % | 2.37 | 3.40 | 4.72 | 1.41 |
| $ZrO_2$ | mol. % | 1.05 | 1.87 | 2.84 | 1.13 |
| Composition constraints | | | | | |
| $P_2O_5 + B_2O_3$ | mol. % | 74.00 | 73.73 | 73.51 | 74.00 |
| $R_2O + RO + SnO_2 + MnO_2$ | mol. % | 9.000 | 7.956 | 6.993 | 9.000 |
| $(Li_2O + Na_2O)/R_2O$ | mol. % | 1.000 | 1.000 | 1.000 | 1.000 |
| $R_2O + RO$ | mol. % | 9.000 | 7.956 | 6.993 | 9.000 |
| $3 * Al_2O_3 + R_2O + RO - P_2O_5$ | mol. % | −6.204 | −6.148 | −6.112 | −6.207 |
| $Al_2O_3 - R_2O - RO$ | mol. % | 7.998 | 9.301 | 10.51 | 8.000 |
| $TiO_2 + La_2O_3 + Y_2O_3 + Ce_2O_3 + CeO_2 + ZrO_2$ | mol. % | 0 | 1.057 | 1.992 | 0 |
| $R_2O + RO + B_2O_3$ | mol. % | 16.81 | 15.81 | 14.89 | 16.80 |
| Composition constraints | | | | | |
| $P_2O_5 + B_2O_3$ | mol. % | 73.74 | 73.51 | 73.29 | 73.72 |
| $R_2O + RO + SnO_2 + MnO_2$ | mol. % | 7.955 | 7.160 | 6.156 | 7.861 |
| $(Li_2O + Na_2O)/R_2O$ | mol. % | 1.000 | 1.000 | 1.000 | 1.000 |
| $R_2O + RO$ | mol. % | 7.955 | 7.160 | 6.156 | 7.861 |
| $3 * Al_2O_3 + R_2O + RO - P_2O_5$ | mol. % | −6.160 | −6.083 | −6.053 | −6.148 |
| $Al_2O_3 - R_2O - RO$ | mol. % | 9.301 | 10.30 | 11.56 | 9.426 |
| $TiO_2 + La_2O_3 + Y_2O_3 + Ce_2O_3 + CeO_2 + ZrO_2$ | mol. % | 1.046 | 1.867 | 2.843 | 1.134 |
| $R_2O + RO + B_2O_3$ | mol. % | 15.81 | 15.05 | 14.09 | 15.71 |

TABLE 6-continued

| | | | | | |
|---|---|---|---|---|---|
| Measured properties | | | | | |
| 15-min devit test (0/1) | | 1 | 1 | 1 | 1 |
| Measured properties | | | | | |
| 15-min devit test (0/1) | | 1 | 1 | 1 | 1 |
| Predicted and calculated properties | | | | | |
| $I_B$, mol. % | | 1.5959 | 1.6940 | 1.8025 | 1.5975 |
| $P_E$ [for E] | GPa | 76.78 | 77.23 | 77.54 | 77.12 |
| Predicted and calculated properties | | | | | |
| $I_B$, mol. % | | 1.6889 | 1.7834 | 1.8862 | 1.7208 |
| $P_E$ [for E] | GPa | 77.55 | 77.83 | 78.18 | 77.99 |

| Exemplary Glass | | 121 | 122 | 123 | 124 |
|---|---|---|---|---|---|
| Composition-mol. % | | | | | |
| $P_2O_5$ | mol. % | 65.61 | 65.36 | 64.99 | 65.48 |
| $Al_2O_3$ | mol. % | 17.50 | 17.71 | 17.99 | 16.99 |
| $B_2O_3$ | mol. % | 7.90 | 7.94 | 7.99 | 7.80 |
| $Li_2O$ | mol. % | 0 | 0 | 0 | 5.50 |
| $TiO_2$ | mol. % | 0 | 0 | 0.0156 | 0 |
| MgO | mol. % | 4.55 | 2.63 | 0 | 4.19 |
| $Na_2O$ | mol. % | 2.47 | 3.54 | 5.01 | 0 |
| $ZrO_2$ | mol. % | 1.98 | 2.83 | 4.00 | 0 |
| CaO | mol. % | 0 | 0 | 0 | 0.0212 |
| $SiO_2$ | mol. % | 0 | 0 | 0 | 0.0198 |

| Exemplary Glass | | 125 | 126 | 127 | 128 |
|---|---|---|---|---|---|
| Composition-mol. % | | | | | |
| $P_2O_5$ | mol. % | 65.07 | 65.48 | 65.10 | 64.75 |
| $Al_2O_3$ | mol. % | 17.29 | 16.99 | 17.27 | 17.50 |
| $B_2O_3$ | mol. % | 7.80 | 7.79 | 7.80 | 7.79 |
| $Li_2O$ | mol. % | 7.74 | 3.87 | 5.73 | 7.81 |
| $TiO_2$ | mol. % | 0 | 0 | 0 | 0 |
| MgO | mol. % | 2.06 | 5.83 | 4.07 | 2.12 |
| $Na_2O$ | mol. % | 0 | 0 | 0 | 0 |
| $ZrO_2$ | mol. % | 0 | 0 | 0 | 0 |
| CaO | mol. % | 0.0212 | 0.0213 | 0.0212 | 0.0211 |
| $SiO_2$ | mol. % | 0.0197 | 0.0198 | 0.0198 | 0.0197 |
| Composition constraints | | | | | |
| $P_2O_5 + B_2O_3$ | mol. % | 73.51 | 73.30 | 72.98 | 73.28 |
| $R_2O + RO + SnO_2 + MnO_2$ | mol. % | 7.017 | 6.162 | 5.010 | 9.714 |
| $(Li_2O + Na_2O)/R_2O$ | mol. % | 1.000 | 1.000 | 1.000 | 1.000 |
| $R_2O + RO$ | mol. % | 7.017 | 6.162 | 5.010 | 9.714 |
| $3 * Al_2O_3 + R_2O + RO - P_2O_5$ | mol. % | −6.099 | −6.059 | −6.002 | −4.799 |
| $Al_2O_3 - R_2O - RO$ | mol. % | 10.48 | 11.55 | 12.98 | 7.275 |
| $TiO_2 + La_2O_3 + Y_2O_3 + Ce_2O_3 + CeO_2 + ZrO_2$ | mol. % | 1.975 | 2.827 | 4.017 | 0 |
| $R_2O + RO + B_2O_3$ | mol. % | 14.92 | 14.10 | 13.00 | 17.51 |
| Composition constraints | | | | | |
| $P_2O_5 + B_2O_3$ | mol. % | 72.87 | 73.27 | 72.90 | 72.54 |
| $R_2O + RO + SnO_2 + MnO_2$ | mol. % | 9.821 | 9.719 | 9.815 | 9.941 |
| $(Li_2O + Na_2O)/R_2O$ | mol. % | 1.000 | 1.000 | 1.000 | 1.000 |
| $R_2O + RO$ | mol. % | 9.821 | 9.719 | 9.815 | 9.941 |
| $3 * Al_2O_3 + R_2O + RO - P_2O_5$ | mol. % | −3.396 | −4.792 | −3.473 | −2.321 |
| $Al_2O_3 - R_2O - RO$ | mol. % | 7.464 | 7.271 | 7.454 | 7.557 |
| $TiO_2 + La_2O_3 + Y_2O_3 + Ce_2O_3 + CeO_2 + ZrO_2$ | mol. % | 0 | 0 | 0 | 0 |
| $R_2O + RO + B_2O_3$ | mol. % | 17.62 | 17.51 | 17.61 | 17.73 |
| Measured properties | | | | | |
| 15-min devit test (0/1) | | 1 | 1 | 1 | 1 |
| Measured properties | | | | | |
| 15-min devit test (0/1) | | 1 | 1 | 1 | 1 |
| Predicted and calculated properties | | | | | |
| $I_B$, mol. % | | 1.8073 | 1.8902 | 1.9863 | 3.0037 |
| $P_E$ [for E] | GPa | 78.31 | 78.63 | 79.08 | 76.52 |

TABLE 6-continued

| | | | | | |
|---|---|---|---|---|---|
| Predicted and calculated properties | | | | | |
| $I_B$, mol. % | | 4.4231 | 3.0022 | 4.3372 | 5.4620 |
| $P_E$ [for E] | GPa | 75.62 | 76.55 | 75.73 | 74.99 |
| Exemplary Glass | | 129 | 130 | 131 | 132 |
| Composition-mol. % | | | | | |
| $P_2O_5$ | mol. % | 65.48 | 65.09 | 64.81 | 64.46 |
| $Al_2O_3$ | mol. % | 16.99 | 17.27 | 17.47 | 17.71 |
| $B_2O_3$ | mol. % | 7.80 | 7.79 | 7.81 | 7.80 |
| $Li_2O$ | mol. % | 2.24 | 4.18 | 5.76 | 7.83 |
| MgO | mol. % | 7.49 | 5.64 | 4.12 | 2.14 |
| CaO | mol. % | 0 | 0.0212 | 0.0212 | 0.0211 |
| $SiO_2$ | mol. % | 0 | 0.0198 | 0.0198 | 0.0394 |
| Exemplary Glass | | 133 | 134 | 135 | 136 |
| Composition-mol. % | | | | | |
| $P_2O_5$ | mol. % | 65.07 | 64.76 | 64.46 | 63.72 |
| $Al_2O_3$ | mol. % | 17.28 | 17.50 | 17.72 | 17.97 |
| $B_2O_3$ | mol. % | 7.80 | 7.80 | 7.79 | 7.80 |
| $Li_2O$ | mol. % | 2.31 | 4.02 | 5.67 | 8.11 |
| MgO | mol. % | 7.51 | 5.89 | 4.32 | 2.33 |
| CaO | mol. % | 0 | 0.0212 | 0.0211 | 0.021 |
| $SiO_2$ | mol. % | 0.0198 | 0.0198 | 0.0197 | 0.0392 |
| Composition constraints | | | | | |
| $P_2O_5 + B_2O_3$ | mol. % | 73.28 | 72.88 | 72.62 | 72.26 |
| $R_2O + RO + SnO_2 + MnO_2$ | mol. % | 9.731 | 9.838 | 9.899 | 10.00 |
| $(Li_2O + Na_2O)/R_2O$ | mol. % | 1.000 | 1.000 | 1.000 | 1.000 |
| $R_2O + RO$ | mol. % | 9.731 | 9.838 | 9.899 | 10.00 |
| $3 * Al_2O_3 + R_2O + RO - P_2O_5$ | mol. % | −4.777 | −3.452 | −2.514 | −1.345 |
| $Al_2O_3 - R_2O - RO$ | mol. % | 7.258 | 7.428 | 7.566 | 7.710 |
| $R_2O + RO + B_2O_3$ | mol. % | 17.53 | 17.63 | 17.70 | 17.79 |
| Composition constraints | | | | | |
| $P_2O_5 + B_2O_3$ | mol. % | 72.88 | 72.55 | 72.25 | 71.53 |
| $R_2O + RO + SnO_2 + MnO_2$ | mol. % | 9.822 | 9.930 | 10.01 | 10.46 |
| $(Li_2O + Na_2O)/R_2O$ | mol. % | 1.000 | 1.000 | 1.000 | 1.000 |
| $R_2O + RO$ | mol. % | 9.822 | 9.930 | 10.01 | 10.46 |
| $3 * Al_2O_3 + R_2O + RO - P_2O_5$ | mol. % | −3.400 | −2.337 | −1.305 | 0.6520 |
| $Al_2O_3 - R_2O - RO$ | mol. % | 7.462 | 7.567 | 7.706 | 7.508 |
| $R_2O + RO + B_2O_3$ | mol. % | 17.63 | 17.73 | 17.80 | 18.27 |
| Measured properties | | | | | |
| 15-min devit test (0/1) | | 1 | 1 | 1 | 1 |
| Measured properties | | | | | |
| 15-min devit test (0/1) | | 1 | 1 | 1 | 1 |
| Predicted and calculated properties | | | | | |
| $I_B$, mol. % | | 2.9983 | 4.3285 | 5.2909 | 6.4787 |
| $P_E$ [for E] | GPa | 76.58 | 75.74 | 75.13 | 74.37 |
| Predicted and calculated properties | | | | | |
| $I_B$, mol. % | | 4.4016 | 5.4447 | 6.4887 | 8.4740 |
| $P_E$ [for E] | GPa | 75.73 | 75.06 | 74.42 | 73.72 |
| Exemplary Glass | | 137 | 138 | 139 | 140 |
| Composition-mol. % | | | | | |
| $P_2O_5$ | mol. % | 64.58 | 64.65 | 64.24 | 64.23 |
| $Al_2O_3$ | mol. % | 17.10 | 17.10 | 17.20 | 17.22 |
| $B_2O_3$ | mol. % | 6.43 | 5.62 | 5.42 | 4.52 |
| $Li_2O$ | mol. % | 6.92 | 6.35 | 6.16 | 5.50 |
| $TiO_2$ | mol. % | 1.14 | 1.40 | 1.98 | 2.34 |
| MgO | mol. % | 3.72 | 3.83 | 4.89 | 5.17 |
| $Na_2O$ | mol. % | 0.0762 | 0.61 | 0.0761 | 0.59 |

TABLE 6-continued

| | | | | | |
|---|---|---|---|---|---|
| $ZrO_2$ | mol. % | 0 | 0.41 | 0 | 0.38 |
| CaO | mol. % | 0.0211 | 0.0212 | 0.021 | 0.0211 |
| $SiO_2$ | mol. % | 0.0197 | 0.0197 | 0.0196 | 0.0197 |

| Exemplary Glass | | 141 | 142 | 143 | 144 |
|---|---|---|---|---|---|
| Composition-mol. % | | | | | |
| $P_2O_5$ | mol. % | 64.33 | 63.87 | 63.88 | 63.94 |
| $Al_2O_3$ | mol. % | 17.20 | 17.30 | 17.31 | 17.32 |
| $B_2O_3$ | mol. % | 3.99 | 4.42 | 3.55 | 2.94 |
| $Li_2O$ | mol. % | 5.17 | 5.40 | 4.78 | 4.36 |
| $TiO_2$ | mol. % | 2.44 | 2.82 | 3.17 | 3.35 |
| MgO | mol. % | 5.07 | 6.08 | 6.30 | 6.38 |
| $Na_2O$ | mol. % | 1.03 | 0.076 | 0.59 | 0.98 |
| $ZrO_2$ | mol. % | 0.73 | 0 | 0.38 | 0.69 |
| CaO | mol. % | 0.0212 | 0.021 | 0.0211 | 0.0211 |
| $SiO_2$ | mol. % | 0.0198 | 0.0196 | 0.0197 | 0.0197 |
| Composition constraints | | | | | |
| $P_2O_5 + B_2O_3$ | mol. % | 71.01 | 70.27 | 69.66 | 68.75 |
| $R_2O + RO + SnO_2 + MnO_2$ | mol. % | 10.74 | 10.81 | 11.14 | 11.28 |
| $(Al_2O + Na_2O)/R_2O$ | mol. % | 1.000 | 1.000 | 1.000 | 1.000 |
| $R_2O + RO$ | mol. % | 10.74 | 10.81 | 11.14 | 11.28 |
| $3 * Al_2O_3 + R_2O + RO - P_2O_5$ | mol. % | −2.541 | −2.548 | −1.486 | −1.280 |
| $Al_2O_3 - R_2O - RO$ | mol. % | 6.362 | 6.289 | 6.060 | 5.938 |
| $TiO_2 + La_2O_3 + Y_2O_3 + Ce_2O_3 + CeO_2 + ZrO_2$ | mol. % | 1.139 | 1.809 | 1.979 | 2.725 |
| $R_2O + RO + B_2O_3$ | mol. % | 17.17 | 16.43 | 16.56 | 15.80 |
| Composition constraints | | | | | |
| $P_2O_5 + B_2O_3$ | mol. % | 68.32 | 68.29 | 67.42 | 66.88 |
| $R_2O + RO + SnO_2 + MnO_2$ | mol. % | 11.29 | 11.57 | 11.70 | 11.74 |
| $(Al_2O + Na_2O)/R_2O$ | mol. % | 1.000 | 1.000 | 1.000 | 1.000 |
| $R_2O + RO$ | mol. % | 11.29 | 11.57 | 11.70 | 11.74 |
| $3 * Al_2O_3 + R_2O + RO - P_2O_5$ | mol. % | −1.447 | −0.3958 | −0.2490 | −0.2508 |
| $Al_2O_3 - R_2O - RO$ | mol. % | 5.911 | 5.728 | 5.613 | 5.578 |
| $TiO_2 + La_2O_3 + Y_2O_3 + Ce_2O_3 + CeO_2 + ZrO_2$ | mol. % | 3.170 | 2.816 | 3.548 | 4.045 |
| $R_2O + RO + B_2O_3$ | mol. % | 15.28 | 15.99 | 15.24 | 14.68 |
| Measured properties | | | | | |
| $d_{RT}$ | g/cm³ | | 2.546 | 2.532 | 2.547 |
| 15-min devit test (0/1) | | 1 | 1 | 1 | 1 |
| Measured properties | | | | | |
| $d_{RT}$ | g/cm³ | | | | 2.554 |
| 15-min devit test (0/1) | | 1 | 1 | 1 | 1 |
| Predicted and calculated properties | | | | | |
| $I_B$, mol. % | | 3.8888 | 3.0720 | 3.9444 | 3.2257 |
| $P_E$ [for E] | GPa | 75.37 | 75.47 | 74.98 | 74.97 |
| Predicted and calculated properties | | | | | |
| $I_B$, mol. % | | 2.5290 | 4.0018 | 3.2609 | 2.6843 |
| $P_E$ [for E] | GPa | 75.12 | 74.56 | 74.59 | 74.67 |

| Exemplary Glass | | 145 | 146 | 147 | 148 |
|---|---|---|---|---|---|
| Composition mol. % | | | | | |
| $P_2O_5$ | mol. % | 64.02 | 63.42 | 63.46 | 63.50 |
| $Al_2O_3$ | mol. % | 17.32 | 17.44 | 17.45 | 17.45 |
| $B_2O_3$ | mol. % | 2.34 | 3.04 | 2.20 | 1.56 |
| $La_2O_3$ | mol. % | 0 | 0 | 0 | 0 |
| $Li_2O$ | mol. % | 3.94 | 4.37 | 3.75 | 3.33 |
| $TiO_2$ | mol. % | 3.50 | 3.96 | 4.25 | 4.46 |
| MgO | mol. % | 6.34 | 7.64 | 7.79 | 7.87 |
| $Na_2O$ | mol. % | 1.46 | 0.0948 | 0.63 | 1.05 |
| $ZrO_2$ | mol. % | 1.05 | 0 | 0.42 | 0.74 |

TABLE 6-continued

| | | | | | |
|---|---|---|---|---|---|
| $CeO_2$ | mol. % | 0 | 0 | 0 | 0 |
| CaO | mol. % | 0.0212 | 0.021 | 0.021 | 0.0211 |
| $SiO_2$ | mol. % | 0.0198 | 0.0196 | 0.0196 | 0.0197 |
| $Fe_2O_3$ | mol. % | 0 | 0 | 0 | 0 |

| Exemplary Glass | | 149 | 150 | 151 | 152 |
|---|---|---|---|---|---|
| Composition mol. % | | | | | |
| $P_2O_5$ | mol. % | 63.54 | 54.97 | 54.99 | 54.98 |
| $Al_2O_3$ | mol. % | 17.46 | 14.00 | 13.99 | 14.00 |
| $B_2O_3$ | mol. % | 0.92 | 2.00 | 2.00 | 2.00 |
| $La_2O_3$ | mol. % | 0 | 3.00 | 0 | 3.00 |
| $Li_2O$ | mol. % | 2.86 | 10.00 | 10.00 | 12.99 |
| $TiO_2$ | mol. % | 4.68 | 10.00 | 10.00 | 10.00 |
| MgO | mol. % | 7.98 | 6.00 | 9.00 | 3.00 |
| $Na_2O$ | mol. % | 1.47 | 0.0102 | 0.0103 | 0.0066 |
| $ZrO_2$ | mol. % | 1.05 | 0 | 0 | 0 |
| $CeO_2$ | mol. % | 0 | 0.0179 | 0 | 0.0178 |
| CaO | mol. % | 0.0212 | 0.0058 | 5.80E−4 | 0.0056 |
| $SiO_2$ | mol. % | 0.0198 | 0.0039 | 0.004 | 0.0039 |
| $Fe_2O_3$ | mol. % | 0 | 7.30E−5 | 1.40E−4 | 7.30E−5 |
| Composition constraints | | | | | |
| $P_2O_5 + B_2O_3$ | mol. % | 66.36 | 66.46 | 65.67 | 65.06 |
| $R_2O + RO + SnO_2 + MnO_2$ | mol. % | 11.76 | 12.12 | 12.19 | 12.26 |
| $(Li_2O + Na_2O)/R_2O$ | mol. % | 1.000 | 1.000 | 1.000 | 1.000 |
| $R_2O + RO$ | mol. % | 11.76 | 12.12 | 12.19 | 12.26 |
| $3 * Al_2O_3 + R_2O + RO - P_2O_5$ | mol. % | −0.3095 | 1.034 | 1.074 | 1.123 |
| $Al_2O_3 - R_2O - RO$ | mol. % | 5.555 | 5.319 | 5.263 | 5.188 |
| $TiO_2 + La_2O_3 + Y_2O_3 + Ce_2O_3 + CeO_2 + ZrO_2$ | mol. % | 4.549 | 3.958 | 4.675 | 5.198 |
| $R_2O + RO + B_2O_3$ | mol. % | 14.10 | 15.16 | 14.39 | 13.83 |
| Composition constraints | | | | | |
| $P_2O_5 + B_2O_3$ | mol. % | 64.46 | 56.98 | 56.99 | 56.99 |
| $R_2O + RO + SnO_2 + MnO_2$ | mol. % | 12.33 | 16.01 | 19.01 | 16.01 |
| $(Li_2O + Na_2O)/R_2O$ | mol. % | 1.000 | 1.000 | 1.000 | 1.000 |
| $R_2O + RO$ | mol. % | 12.33 | 16.01 | 19.01 | 16.01 |
| $3 * Al_2O_3 + R_2O + RO - P_2O_5$ | mol. % | 1.161 | 3.034 | 5.996 | 3.010 |
| $Al_2O_3 - R_2O - RO$ | mol. % | 5.124 | −2.011 | −5.013 | −2.009 |
| $TiO_2 + La_2O_3 + Y_2O_3 + Ce_2O_3 + CeO_2 + ZrO_2$ | mol. % | 5.729 | 13.01 | 10.00 | 13.01 |
| $R_2O + RO + B_2O_3$ | mol. % | 13.25 | 18.01 | 21.01 | 18.01 |
| Measured properties | | | | | |
| $d_{RT}$ | g/cm$^3$ | 2.564 | 2.539 | | 2.551 |
| E | GPa | | | | |
| μ | | | | | |
| NaOH[ISO695] | mg/cm$^2$ | | | | |
| 15-min devit test (0/1) | | 1 | 1 | 1 | 1 |
| Measured properties | | | | | |
| $d_{RT}$ | g/cm$^3$ | | 75.570 | 79.220 | 76.260 |
| E | GPa | | 0.21500 | 0.21100 | 0.21700 |
| μ | | | 1.25406 | 1.40687 | 1.16778 |
| NaOH[ISO695] | mg/cm$^2$ | 1 | | | |
| 15-min devit test (0/1) | | | | | |
| Predicted and calculated properties | | | | | |
| $I_B$, mol. % | | 2.0055 | 4.0688 | 3.2843 | 2.6824 |
| $P_E$ [for E] | GPa | 74.75 | 74.97 | 75.10 | 75.18 |
| Predicted and calculated properties | | | | | |
| $I_B$, mol. % | | 2.0748 | 14.058 | 7.9954 | 14.035 |
| $P_E$ [for E] | GPa | 75.26 | 79.33 | 78.69 | 79.28 |

| Exemplary Glass | | 153 | 154 | 155 | 156 |
|---|---|---|---|---|---|
| Composition-mol. % | | | | | |
| $P_2O_5$ | mol. % | 54.99 | 54.98 | 54.99 | 62.93 |
| $Al_2O_3$ | mol. % | 14.00 | 13.99 | 14.00 | 17.46 |
| $B_2O_3$ | mol. % | 2.00 | 2.00 | 2.00 | 5.92 |
| $La_2O_3$ | mol. % | 0 | 3.00 | 0 | 0 |
| $Li_2O$ | mol. % | 16.00 | 11.50 | 13.00 | 2.94 |
| $TiO_2$ | mol. % | 10.00 | 10.00 | 10.00 | 0 |
| MgO | mol. % | 3.00 | 4.50 | 6.00 | 5.19 |
| $Na_2O$ | mol. % | 0.007 | 0.0085 | 0.0087 | 3.74 |
| $ZrO_2$ | mol. % | 0 | 0 | 0 | 1.78 |

TABLE 6-continued

| | | | | | |
|---|---|---|---|---|---|
| $CeO_2$ | mol. % | 0 | 0.0178 | 0 | 0 |
| CaO | mol. % | 3.80E−4 | 0.0056 | 5.80E−4 | 0.0212 |
| $SiO_2$ | mol. % | 0.0039 | 0.0039 | 0.004 | 0.0198 |
| $Fe_2O_3$ | mol. % | 6.70E−5 | 7.30E−5 | 6.80E−5 | 0 |

| Exemplary Glass | | 157 | 158 | 159 | 160 |
|---|---|---|---|---|---|
| Composition-mol. % | | | | | |
| $P_2O_5$ | mol. % | 63.58 | 62.91 | 63.54 | 63.99 |
| $Al_2O_3$ | mol. % | 17.48 | 17.45 | 17.48 | 17.49 |
| $B_2O_3$ | mol. % | 5.21 | 6.45 | 5.86 | 5.19 |
| $La_2O_3$ | mol. % | 0 | 0 | 0 | 0 |
| $Li_2O$ | mol. % | 2.75 | 2.18 | 1.87 | 1.88 |
| $TiO_2$ | mol. % | 0 | 0 | 0 | 0 |
| MgO | mol. % | 5.09 | 5.97 | 5.99 | 5.83 |
| $Na_2O$ | mol. % | 2.65 | 3.75 | 2.73 | 1.85 |
| $ZrO_2$ | mol. % | 1.78 | 1.25 | 1.18 | 1.26 |
| $CeO_2$ | mol. % | 0 | 0 | 0 | 0 |
| CaO | mol. % | 1.45 | 0.0211 | 1.34 | 2.49 |
| $SiO_2$ | mol. % | 0.0198 | 0.0197 | 0.0198 | 0.0199 |
| $Fe_2O_3$ | mol. % | 0 | 0 | 0 | 0 |
| Composition constraints | | | | | |
| $P_2O_5 + B_2O_3$ | mol. % | 56.99 | 56.98 | 56.99 | 68.85 |
| $R_2O + RO + SnO_2 + MnO_2$ | mol. % | 19.01 | 16.01 | 19.01 | 11.88 |
| $(Li_2O + Na_2O)/R_2O$ | mol. % | 1.000 | 1.000 | 1.000 | 1.000 |
| $R_2O + RO$ | mol. % | 19.01 | 16.01 | 19.01 | 11.88 |
| $3 * Al_2O_3 + R_2O + RO - P_2O_5$ | mol. % | 6.005 | 3.009 | 6.001 | 1.330 |
| $Al_2O_3 - R_2O - RO$ | mol. % | −5.009 | −2.015 | −5.011 | 5.575 |
| $TiO_2 + La_2O_3 + Y_2O_3 + Ce_2O_3 + CeO_2 + ZrO_2$ | mol. % | 10.00 | 13.01 | 10.00 | 1.783 |
| $R_2O + RO + B_2O_3$ | mol. % | 21.01 | 18.01 | 21.01 | 17.80 |
| Composition constraints | | | | | |
| $P_2O_5 + B_2O_3$ | mol. % | 68.78 | 69.36 | 69.40 | 69.18 |
| $R_2O + RO + SnO_2 + MnO_2$ | mol. % | 11.94 | 11.92 | 11.93 | 12.05 |
| $(Li_2O + Na_2O)/R_2O$ | mol. % | 1.000 | 1.000 | 1.000 | 1.000 |
| $R_2O + RO$ | mol. % | 11.94 | 11.92 | 11.93 | 12.05 |
| $3 * Al_2O_3 + R_2O + RO - P_2O_5$ | mol. % | 0.8015 | 1.348 | 0.8226 | 0.5364 |
| $Al_2O_3 - R_2O - RO$ | mol. % | 5.539 | 5.527 | 5.553 | 5.448 |
| $TiO_2 + La_2O_3 + Y_2O_3 + Ce_2O_3 + CeO_2 + ZrO_2$ | mol. % | 1.780 | 1.250 | 1.178 | 1.259 |
| $R_2O + RO + B_2O_3$ | mol. % | 17.15 | 18.37 | 17.79 | 17.24 |
| Measured properties | | | | | |
| E | GPa | 79.150 | 76.260 | 79.500 | |
| μ | | 0.21200 | 0.21800 | 0.21400 | |
| $\alpha_{20-300} \times 10^7$ | $K^{-1}$ | | 67.400 | 69.200 | |
| NaOH[ISO695] | $mg/cm^2$ | 1.43833 | 1.2234 | 1.26623 | 1 |
| 15-min devit test (0/1) | | | | | |
| Measured properties | | | | | |
| E | GPa | | | | |
| μ | | | | | |
| $\alpha_{20-300} \times 10^7$ | $K^{-1}$ | | | | |
| NaOH[ISO695] | $mg/cm^2$ | | | | |
| 15-min devit test (0/1) | | 1 | 1 | 1 | 1 |
| Predicted and calculated properties | | | | | |
| $I_B$, mol. % | | 8.0057 | 14.033 | 8.0010 | 7.2629 |
| $P_E$ [for E] | GPa | 78.59 | 79.30 | 78.64 | 73.33 |
| Predicted and calculated properties | | | | | |
| $I_B$, mol. % | | 5.9895 | 7.7611 | 6.6703 | 5.7377 |
| $P_E$ [for E] | GPa | 73.66 | 73.04 | 73.31 | 73.65 |

| Exemplary Glass | | 161 | 162 | 163 | 164 |
|---|---|---|---|---|---|
| Composition-mol. % | | | | | |
| $P_2O_5$ | mol. % | 62.93 | 63.54 | 63.96 | 64.24 |
| $Al_2O_3$ | mol. % | 17.46 | 17.48 | 17.50 | 17.50 |
| $B_2O_3$ | mol. % | 6.97 | 6.36 | 5.85 | 5.20 |
| $Li_2O$ | mol. % | 1.39 | 1.11 | 1.00 | 1.08 |
| MgO | mol. % | 6.75 | 6.75 | 6.71 | 6.62 |
| $Na_2O$ | mol. % | 3.74 | 2.72 | 1.96 | 1.08 |
| $ZrO_2$ | mol. % | 0.72 | 0.67 | 0.67 | 0.73 |

TABLE 6-continued

| | | | | | |
|---|---|---|---|---|---|
| CaO | mol. % | 0.0211 | 1.33 | 2.36 | 3.55 |
| $SiO_2$ | mol. % | 0.0197 | 0.0198 | 0 | 0 |

| Exemplary Glass | | 165 | 166 | 167 | 168 |
|---|---|---|---|---|---|
| Composition-mol. % | | | | | |
| $P_2O_5$ | mol. % | 62.95 | 63.61 | 64.00 | 64.25 |
| $Al_2O_3$ | mol. % | 17.45 | 17.49 | 17.51 | 17.50 |
| $B_2O_3$ | mol. % | 7.70 | 6.98 | 6.44 | 5.91 |
| $Li_2O$ | mol. % | 0.32 | 0.0794 | 0 | 0 |
| MgO | mol. % | 7.82 | 7.74 | 7.70 | 7.70 |
| $Na_2O$ | mol. % | 3.73 | 2.64 | 1.84 | 1.06 |
| $ZrO_2$ | mol. % | 0 | 0 | 0 | 0 |
| CaO | mol. % | 0.0211 | 1.46 | 2.52 | 3.58 |
| $SiO_2$ | mol. % | 0 | 0 | 0 | 0 |
| Composition constraints | | | | | |
| $P_2O_5 + B_2O_3$ | mol. % | 69.90 | 69.90 | 69.81 | 69.45 |
| $R_2O + RO + SnO_2 + MnO_2$ | mol. % | 11.90 | 11.92 | 12.02 | 12.33 |
| $(Li_2O + Na_2O)/R_2O$ | mol. % | 1.000 | 1.000 | 1.000 | 1.000 |
| $R_2O + RO$ | mol. % | 11.90 | 11.92 | 12.02 | 12.33 |
| $3 * Al_2O_3 + R_2O + RO - P_2O_5$ | mol. % | 1.343 | 0.8283 | 0.5723 | 0.5812 |
| $Al_2O_3 - R_2O - RO$ | mol. % | 5.553 | 5.568 | 5.486 | 5.172 |
| $TiO_2 + La_2O_3 + Y_2O_3 + Ce_2O_3 + CeO_2 + ZrO_2$ | mol. % | 0.7203 | 0.6747 | 0.6667 | 0.7254 |
| $R_2O + RO + B_2O_3$ | mol. % | 18.87 | 18.28 | 17.87 | 17.53 |
| Composition constraints | | | | | |
| $P_2O_5 + B_2O_3$ | mol. % | 70.65 | 70.59 | 70.44 | 70.16 |
| $R_2O + RO + SnO_2 + MnO_2$ | mol. % | 11.89 | 11.92 | 12.06 | 12.34 |
| $(Li_2O + Na_2O)/R_2O$ | mol. % | 1.000 | 1.000 | 1.000 | 1.000 |
| $R_2O + RO$ | mol. % | 11.89 | 11.92 | 12.06 | 12.34 |
| $3 * Al_2O_3 + R_2O + RO - P_2O_5$ | mol. % | 1.303 | 0.7750 | 0.5714 | 0.5745 |
| $Al_2O_3 - R_2O - RO$ | mol. % | 5.559 | 5.575 | 5.448 | 5.155 |
| $TiO_2 + La_2O_3 + Y_2O_3 + Ce_2O_3 + CeO_2 + ZrO_2$ | mol. % | 0 | 0 | 0 | 0 |
| $R_2O + RO + B_2O_3$ | mol. % | 19.59 | 18.90 | 18.49 | 18.25 |
| Measured properties | | | | | |
| 15-min devit test (0/1) | | 1 | 1 | 1 | 1 |
| Measured properties | | | | | |
| 15-min devit test (0/1) | | 1 | 1 | 1 | 1 |
| Predicted and calculated properties | | | | | |
| $I_B$, mol. % | | 8.3010 | 7.1907 | 6.4184 | 5.7755 |
| $P_E$ [for E] | GPa | 72.76 | 73.04 | 73.29 | 73.70 |
| Predicted and calculated properties | | | | | |
| $I_B$, mol. % | | 8.9932 | 7.7442 | 7.0088 | 6.4724 |
| $P_E$ [for E] | GPa | 72.36 | 72.71 | 72.99 | 73.32 |

| Exemplary Glass | | 169 | 170 | 171 | 172 |
|---|---|---|---|---|---|
| Composition mol. % | | | | | |
| $P_2O_5$ | mol. % | 63.29 | 60.25 | 61.92 | 63.80 |
| $Al_2O_3$ | mol. % | 17.37 | 16.35 | 16.21 | 16.22 |
| $B_2O_3$ | mol. % | 7.00 | 11.13 | 11.30 | 10.97 |
| $Li_2O$ | mol. % | 7.18 | 7.14 | 6.71 | 6.30 |
| MgO | mol. % | 5.09 | 5.07 | 3.82 | 2.66 |
| CaO | mol. % | 0.0208 | 0.0204 | 0.0207 | 0.021 |
| $SiO_2$ | mol. % | 0.0388 | 0.038 | 0.0193 | 0.0196 |

| Exemplary Glass | | 173 | 174 | 175 | 176 |
|---|---|---|---|---|---|
| Composition mol. % | | | | | |
| $P_2O_5$ | mol. % | 59.00 | 60.68 | 62.11 | 57.37 |
| $Al_2O_3$ | mol. % | 15.93 | 15.81 | 15.76 | 15.38 |
| $B_2O_3$ | mol. % | 12.79 | 12.91 | 12.89 | 14.98 |
| $Li_2O$ | mol. % | 7.15 | 6.69 | 6.34 | 7.14 |
| MgO | mol. % | 5.08 | 3.85 | 2.86 | 5.07 |
| CaO | mol. % | 0.0202 | 0.0205 | 0.0207 | 0.0199 |
| $SiO_2$ | mol. % | 0.0377 | 0.0382 | 0.0194 | 0.0372 |
| Composition constraints | | | | | |
| $P_2O_5 + B_2O_3$ | mol. % | 70.30 | 71.38 | 73.22 | 74.78 |
| $R_2O + RO + SnO_2 + MnO_2$ | mol. % | 12.30 | 12.23 | 10.55 | 8.982 |

TABLE 6-continued

| | | | | | |
|---|---|---|---|---|---|
| $(Li_2O + Na_2O)/R_2O$ | mol. % | 1.000 | 1.000 | 1.000 | 1.000 |
| $R_2O + RO$ | mol. % | 12.30 | 12.23 | 10.55 | 8.982 |
| $3 * Al_2O_3 + R_2O + RO - P_2O_5$ | mol. % | 1.103 | 1.020 | −2.722 | −6.154 |
| $Al_2O_3 - R_2O - RO$ | mol. % | 5.069 | 4.112 | 5.663 | 7.239 |
| $R_2O + RO + B_2O_3$ | mol. % | 19.30 | 23.37 | 21.85 | 19.96 |
| Composition constraints | | | | | |
| $P_2O_5 + B_2O_3$ | mol. % | 71.78 | 73.60 | 75.00 | 72.35 |
| $R_2O + RO + SnO_2 + MnO_2$ | mol. % | 12.25 | 10.55 | 9.219 | 12.24 |
| $(Li_2O + Na_2O)/R_2O$ | mol. % | 1.000 | 1.000 | 1.000 | 1.000 |
| $R_2O + RO$ | mol. % | 12.25 | 10.55 | 9.219 | 12.24 |
| $3 * Al_2O_3 + R_2O + RO - P_2O_5$ | mol. % | 1.045 | −2.692 | −5.609 | 0.9907 |
| $Al_2O_3 - R_2O - RO$ | mol. % | 3.676 | 5.259 | 6.541 | 3.140 |
| $R_2O + RO + B_2O_3$ | mol. % | 25.04 | 23.47 | 22.11 | 27.21 |
| Measured properties | | | | | |
| 15-min devit test (0/1) | | 1 | 1 | 1 | 1 |
| Measured properties | | | | | |
| 15-min devit test (0/1) | | 1 | 1 | 1 | 1 |
| Predicted and calculated properties | | | | | |
| $I_B$, mol. % | | 8.0934 | 12.164 | 8.5653 | 4.8143 |
| $P_E$ [for E] | GPa | 73.46 | 74.22 | 75.81 | 78.03 |
| Predicted and calculated properties | | | | | |
| $I_B$, mol. % | | 13.825 | 10.227 | 7.2730 | 15.949 |
| $P_E$ [for E] | GPa | 74.53 | 76.09 | 78.03 | 74.93 |

| Exemplary Glass | | 177 | 178 | 179 | 180 |
|---|---|---|---|---|---|
| Composition-mol. % | | | | | |
| $P_2O_5$ | mol. % | 59.28 | 63.60 | 63.60 | 63.60 |
| $Al_2O_3$ | mol. % | 15.30 | 17.50 | 17.50 | 17.50 |
| $B_2O_3$ | mol. % | 14.96 | 7.20 | 7.20 | 7.20 |
| $Li_2O$ | mol. % | 6.66 | 3.40 | 5.40 | 2.40 |
| $TiO_2$ | mol. % | 0 | 0 | 0 | 0 |
| MgO | mol. % | 3.75 | 8.30 | 6.30 | 9.30 |
| CaO | mol. % | 0.0203 | 0 | 0 | 0 |
| $SiO_2$ | mol. % | 0.0378 | 0 | 0 | 0 |

| Exemplary Glass | | 181 | 182 | 183 | 184 |
|---|---|---|---|---|---|
| Composition-mol. % | | | | | |
| $P_2O_5$ | mol. % | 64.20 | 63.10 | 64.60 | 60.01 |
| $Al_2O_3$ | mol. % | 18.00 | 17.00 | 17.00 | 16.00 |
| $B_2O_3$ | mol. % | 7.20 | 7.20 | 4.20 | 6.00 |
| $Li_2O$ | mol. % | 5.00 | 5.00 | 4.40 | 3.99 |
| $TiO_2$ | mol. % | 0 | 0 | 0 | 8.00 |
| MgO | mol. % | 5.60 | 7.70 | 9.80 | 6.00 |
| CaO | mol. % | 0 | 0 | 0 | 0 |
| $SiO_2$ | mol. % | 0 | 0 | 0 | 0 |
| Composition constraints | | | | | |
| $P_2O_5 + B_2O_3$ | mol. % | 74.23 | 70.80 | 70.80 | 70.80 |
| $R_2O + RO + SnO_2 + MnO_2$ | mol. % | 10.43 | 11.70 | 11.70 | 11.70 |
| $(Li_2O + Na_2O)/R_2O$ | mol. % | 1.000 | 1.000 | 1.000 | 1.000 |
| $R_2O + RO$ | mol. % | 10.43 | 11.70 | 11.70 | 11.70 |
| $3 * Al_2O_3 + R_2O + RO - P_2O_5$ | mol. % | −2.953 | 0.6075 | 0.5904 | 0.5858 |
| $Al_2O_3 - R_2O - RO$ | mol. % | 4.868 | 5.804 | 5.795 | 5.798 |
| $TiO_2 + La_2O_3 + Y_2O_3 + Ce_2O_3 + CeO_2 + ZrO_2$ | mol. % | 0 | 0 | 0 | 0 |
| $R_2O + RO + B_2O_3$ | mol. % | 25.39 | 18.90 | 18.90 | 18.90 |
| Composition constraints | | | | | |
| $P_2O_5 + B_2O_3$ | mol. % | 71.40 | 70.30 | 68.80 | 66.01 |
| $R_2O + RO + SnO_2 + MnO_2$ | mol. % | 10.60 | 12.70 | 14.20 | 9.99 |
| $(Li_2O + Na_2O)/R_2O$ | mol. % | 1.000 | 1.000 | 1.000 | 1.000 |
| $R_2O + RO$ | mol. % | 10.60 | 12.70 | 14.20 | 9.99 |
| $3 * Al_2O_3 + R_2O + RO - P_2O_5$ | mol. % | 0.3961 | 0.6133 | 0.6090 | −2.013 |
| $Al_2O_3 - R_2O - RO$ | mol. % | 7.396 | 4.304 | 2.800 | 6.013 |
| $TiO_2 + La_2O_3 + Y_2O_3 + Ce_2O_3 + CeO_2 + ZrO_2$ | mol. % | 0 | 0 | 0 | 7.997 |
| $R_2O + RO + B_2O_3$ | mol. % | 17.80 | 19.90 | 18.40 | 15.99 |
| Measured properties | | | | | |
| Tg | ° C. | | | | |
| 15-min devit test (0/1) | | 1 | 1 | 1 | 1 |

TABLE 6-continued

| | | | | | |
|---|---|---|---|---|---|
| Measured properties | | | | | |
| Tg | ° C. | | | | 571 |
| 15-min devit test (0/1) | | 1 | 1 | 1 | |
| Predicted and calculated properties | | | | | |
| $I_B$, mol. % | | 12.008 | 7.8065 | 7.7909 | 7.7867 |
| $P_E$ [for E] | GPa | 76.65 | 73.49 | 73.45 | 73.50 |
| Predicted and calculated properties | | | | | |
| $I_B$, mol. % | | 7.5956 | 7.8128 | 4.8095 | 3.9875 |
| $P_E$ [for E] | GPa | 73.55 | 73.32 | 72.56 | 79.03 |
| Exemplary Glass | | 185 | 186 | 187 | 188 |
| Composition-mol. % | | | | | |
| $P_2O_5$ | mol. % | 59.98 | 60.00 | 60.01 | 55.00 |
| $Al_2O_3$ | mol. % | 16.00 | 15.99 | 12.00 | 12.00 |
| $B_2O_3$ | mol. % | 9.00 | 6.00 | 7.50 | 7.50 |
| $Li_2O$ | mol. % | 4.02 | 6.99 | 7.49 | 7.49 |
| $TiO_2$ | mol. % | 5.00 | 5.00 | 3.00 | 5.01 |
| MgO | mol. % | 6.01 | 6.01 | 10.00 | 6.52 |
| $Na_2O$ | mol. % | 0 | 0 | 0 | 0 |
| CaO | mol. % | 0 | 0 | 0 | 6.49 |
| $K_2O$ | mol. % | 0 | 0 | 0 | 0 |
| Exemplary Glass | | 189 | 190 | 191 | 192 |
| Composition-mol. % | | | | | |
| $P_2O_5$ | mol. % | 65.53 | 64.70 | 64.69 | 64.64 |
| $Al_2O_3$ | mol. % | 16.97 | 20.00 | 19.43 | 18.83 |
| $B_2O_3$ | mol. % | 7.81 | 5.03 | 5.04 | 5.05 |
| $Li_2O$ | mol. % | 0.28 | 0 | 0 | 0 |
| $TiO_2$ | mol. % | 0 | 5.02 | 5.02 | 5.02 |
| MgO | mol. % | 5.37 | 0.18 | 0.76 | 1.39 |
| $Na_2O$ | mol. % | 3.04 | 5.06 | 5.06 | 5.07 |
| CaO | mol. % | 0 | 0 | 0 | 0 |
| $K_2O$ | mol. % | 1.00 | 0 | 0 | 0 |
| Composition constraints | | | | | |
| $P_2O_5 + B_2O_3$ | mol. % | 68.98 | 66.00 | 67.51 | 62.50 |
| $R_2O + RO + SnO_2 + MnO_2$ | mol. % | 10.03 | 13.00 | 17.49 | 20.50 |
| $(Li_2O + Na_2O)/R_2O$ | mol. % | 1.000 | 1.000 | 1.000 | 1.000 |
| $R_2O + RO$ | mol. % | 10.03 | 13.00 | 17.49 | 20.50 |
| $K_2O + Rb_2O + CS_2O$ | mol. % | 0 | 0 | 0 | 0 |
| $3 * Al_2O_3 + R_2O + RO - P_2O_5$ | mol. % | −1.966 | 0.9884 | −6.514 | 1.483 |
| $Al_2O_3 - R_2O - RO$ | mol. % | 5.972 | 2.993 | −5.489 | −8.498 |
| $TiO_2 + La_2O_3 + Y_2O_3 + Ce_2O_3 + CeO_2 + ZrO_2$ | mol. % | 4.997 | 5.004 | 2.997 | 5.006 |
| $R_2O + RO + B_2O_3$ | mol. % | 19.02 | 19.00 | 24.99 | 27.99 |
| Composition constraints | | | | | |
| $P_2O_5 + B_2O_3$ | mol. % | 73.34 | 69.74 | 69.73 | 69.69 |
| $R_2O + RO + SnO_2 + MnO_2$ | mol. % | 9.690 | 5.241 | 5.824 | 6.460 |
| $(Li_2O + Na_2O)/R_2O$ | mol. % | 0.7687 | 1.000 | 1.000 | 1.000 |
| $R_2O + RO$ | mol. % | 9.690 | 5.241 | 5.824 | 6.460 |
| $K_2O + Rb_2O + CS_2O$ | mol. % | 1.000 | 0 | 0 | 0 |
| $3 * Al_2O_3 + R_2O + RO - P_2O_5$ | mol. % | −4.936 | 0.5528 | −0.5835 | −1.670 |
| $Al_2O_3 - R_2O - RO$ | mol. % | 7.278 | 14.76 | 13.61 | 12.37 |
| $TiO_2 + La_2O_3 + Y_2O_3 + Ce_2O_3 + CeO_2 + ZrO_2$ | mol. % | 0 | 5.018 | 5.018 | 5.016 |
| $R_2O + RO + B_2O_3$ | mol. % | 17.50 | 10.27 | 10.86 | 11.51 |
| Measured properties | | | | | |
| $d_{RT}$ | $g/cm^3$ | | | | |
| E | GPa | | | | |
| $E/d_{RT}$ | $GPa \cdot cm^3/g$ | | | | |
| $T_g$ | ° C. | 570 | 529 | 520 | 498 |
| 15-min devit test (0/1) | | | | | |
| Measured properties | | | | | |
| $d_{RT}$ | $g/cm^3$ | 2.549 | | | |
| E | GPa | 86.400 | | | |
| $E/d_{RT}$ | $GPa \cdot cm^3/g$ | 33.900 | | | |
| $T_g$ | ° C. | | | | |
| 15-min devit test (0/1) | | 1 | 1 | 1 | 1 |

TABLE 6-continued

| | | | | | |
|---|---|---|---|---|---|
| Predicted and calculated properties | | | | | |
| $I_B$, mol. % | | 7.0309 | 6.9922 | 0.98684 | 8.9804 |
| $P_E$ [for E] | GPa | 77.87 | 75.97 | 78.06 | 76.29 |
| Predicted and calculated properties | | | | | |
| $I_B$, mol. % | | 2.8498 | 5.5912 | 4.4465 | 3.5957 |
| $P_E$ [for E] | GPa | 74.73 | 74.90 | 74.99 | 75.56 |

| Exemplary Glass | | 193 | 194 | 195 | 196 |
|---|---|---|---|---|---|
| Composition-mol. % | | | | | |
| $P_2O_5$ | mol. % | 64.64 | 64.62 | 64.60 | 64.55 |
| $Al_2O_3$ | mol. % | 18.40 | 17.99 | 17.58 | 17.14 |
| $B_2O_3$ | mol. % | 5.04 | 5.05 | 5.06 | 5.06 |
| $Li_2O$ | mol. % | 0 | 0 | 0 | 0 |
| $TiO_2$ | mol. % | 5.02 | 5.01 | 5.01 | 5.02 |
| MgO | mol. % | 1.85 | 2.26 | 2.68 | 3.15 |
| $Na_2O$ | mol. % | 5.05 | 5.06 | 5.07 | 5.08 |

| Exemplary Glass | | 197 | 198 | 199 | 200 |
|---|---|---|---|---|---|
| Composition-mol. % | | | | | |
| $P_2O_5$ | mol. % | 64.54 | 64.50 | 65.01 | 65.00 |
| $Al_2O_3$ | mol. % | 16.58 | 16.04 | 18.00 | 18.58 |
| $B_2O_3$ | mol. % | 5.06 | 5.06 | 5.00 | 5.00 |
| $Li_2O$ | mol. % | 0 | 0 | 5.00 | 5.00 |
| $TiO_2$ | mol. % | 5.02 | 5.02 | 5.00 | 5.00 |
| MgO | mol. % | 3.71 | 4.30 | 2.00 | 1.42 |
| $Na_2O$ | mol. % | 5.08 | 5.09 | 0 | 0 |
| Composition constraints | | | | | |
| $P_2O_5 + B_2O_3$ | mol. % | 69.68 | 69.67 | 69.65 | 69.61 |
| $R_2O + RO + SnO_2 + MnO_2$ | mol. % | 6.899 | 7.328 | 7.752 | 8.232 |
| $(Li_2O + Na_2O)/R_2O$ | mol. % | 1.000 | 1.000 | 1.000 | 1.000 |
| $R_2O + RO$ | mol. % | 6.899 | 7.328 | 7.752 | 8.232 |
| $3 * Al_2O_3 + R_2O + RO - P_2O_5$ | mol. % | −2.543 | −3.316 | −4.103 | −4.887 |
| $Al_2O_3 - R_2O - RO$ | mol. % | 11.50 | 10.66 | 9.829 | 8.912 |
| $TiO_2 + La_2O_3 + Y_2O_3 + Ce_2O_3 + CeO_2 + ZrO_2$ | mol. % | 5.021 | 5.010 | 5.014 | 5.016 |
| $R_2O + RO + B_2O_3$ | mol. % | 11.94 | 12.38 | 12.81 | 13.29 |
| Composition constraints | | | | | |
| $P_2O_5 + B_2O_3$ | mol. % | 69.60 | 69.56 | 70.00 | 70.00 |
| $R_2O + RO + SnO_2 + MnO_2$ | mol. % | 8.795 | 9.385 | 7.000 | 6.420 |
| $(Li_2O + Na_2O)/R_2O$ | mol. % | 1.000 | 1.000 | 1.000 | 1.000 |
| $R_2O + RO$ | mol. % | 8.795 | 9.385 | 7.000 | 6.420 |
| $3 * Al_2O_3 + R_2O + RO - P_2O_5$ | mol. % | −5.998 | −7.002 | −4.019 | −2.836 |
| $Al_2O_3 - R_2O - RO$ | mol. % | 7.788 | 6.652 | 11.00 | 12.16 |
| $TiO_2 + La_2O_3 + Y_2O_3 + Ce_2O_3 + CeO_2 + ZrO_2$ | mol. % | 5.016 | 5.016 | 4.999 | 5.000 |
| $R_2O + RO + B_2O_3$ | mol. % | 13.86 | 14.45 | 12.00 | 11.42 |
| Measured properties | | | | | |
| 15-min devit test (0/1) | | 1 | 1 | 1 | 1 |
| Measured properties | | | | | |
| 15-min devit test (0/1) | | 1 | 1 | 1 | 1 |
| Predicted and calculated properties | | | | | |
| $I_B$, mol. % | | 2.7639 | 1.7552 | 0.94025 | 0.15813 |
| $P_E$ [for E] | GPa | 76.02 | 76.41 | 76.82 | 77.22 |
| Predicted and calculated properties | | | | | |
| $I_B$, mol. % | | −0.95213 | −1.9370 | 0.98071 | 2.1637 |
| $P_E$ [for E] | GPa | 76.96 | 76.57 | 78.75 | 78.13 |

| Exemplary Glass | | 201 | 202 | 203 | 204 |
|---|---|---|---|---|---|
| Composition-mol. % | | | | | |
| $P_2O_5$ | mol. % | 64.99 | 65.00 | 65.00 | 65.00 |
| $Al_2O_3$ | mol. % | 17.42 | 19.00 | 16.99 | 19.43 |
| $B_2O_3$ | mol. % | 5.00 | 5.00 | 5.00 | 5.00 |
| $Li_2O$ | mol. % | 5.00 | 5.00 | 5.00 | 5.00 |
| $TiO_2$ | mol. % | 5.00 | 5.00 | 5.00 | 5.00 |

TABLE 6-continued

| | | | | | | |
|---|---|---|---|---|---|---|
| MgO | mol. % | 2.58 | 1.00 | 3.01 | 0.57 | |
| CaO | mol. % | 0 | 0 | 0 | 0 | |
| | | 205 | 206 | 207 | 208 | 209 |
| Composition-mol. % | | | | | | |
| $P_2O_5$ | mol. % | 64.99 | 65.00 | 65.00 | 63.99 | 66.21 |
| $Al_2O_3$ | mol. % | 16.57 | 20.00 | 16.00 | 19.25 | 17.00 |
| $B_2O_3$ | mol. % | 5.00 | 5.00 | 5.00 | 7.55 | 7.80 |
| $Li_2O$ | mol. % | 5.00 | 5.00 | 5.00 | 7.44 | 0 |
| $TiO_2$ | mol. % | 5.00 | 5.00 | 5.00 | 0 | 0 |
| MgO | mol. % | 3.43 | 0 | 4.00 | 0 | 8.99 |
| CaO | mol. % | 0 | 0 | 0 | 1.78 | 0 |
| Composition constraints | | | | | | |
| $P_2O_5 + B_2O_3$ | mol. % | 69.99 | 70.00 | 70.00 | 70.00 | |
| $RO + RO + SnO_2 + MnO_2$ | mol. % | 7.584 | 5.997 | 8.009 | 5.571 | |
| $(Li_2O + NaO)/R_2O$ | mol. % | 1.000 | 1.000 | 1.000 | 1.000 | |
| $R_2O + RO$ | mol. % | 7.584 | 5.997 | 8.009 | 5.571 | |
| $3 * Al_2O_3 + R_2O + RO - P_2O_5$ | mol. % | −5.142 | −2.004 | −6.032 | −1.125 | |
| $Al_2O_3 - R_2O - RO$ | mol. % | 9.839 | 13.00 | 8.978 | 13.86 | |
| $TiO_2 + La_2O_3 + Y_2O_3 + Ce_2O_3 + CeO_2 + ZrO_2$ | mol. % | 4.999 | 5.001 | 5.001 | 4.999 | |
| $R_2O + RO + B_2O_3$ | mol. % | 12.58 | 11.00 | 13.01 | 10.57 | |
| Composition constraints | | | | | | |
| $P_2O_5 + B_2O_3$ | mol. % | 69.99 | 70.00 | 70.00 | 71.54 | 74.01 |
| $RO + RO + SnO_2 + MnO_2$ | mol. % | 8.433 | 4.998 | 9.001 | 9.219 | 8.990 |
| $(Li_2O + NaO)/R_2O$ | mol. % | 1.000 | 1.000 | 1.000 | 1.000 | 0 |
| $R_2O + RO$ | mol. % | 8.433 | 4.998 | 9.001 | 9.219 | 8.990 |
| $3 * Al_2O_3 + R_2O + RO - P_2O_5$ | mol. % | −6.844 | 0.01023 | −8.003 | 2.969 | −6.215 |
| $Al_2O_3 - R_2O - RO$ | mol. % | 8.140 | 15.01 | 6.998 | 10.03 | 8.011 |
| $TiO_2 + La_2O_3 + Y_2O_3 + Ce_2O_3 + CeO_2 + ZrO_2$ | mol. % | 5.000 | 5.000 | 5.000 | 0 | 0 |
| $R_2O + RO + B_2O_3$ | mol. % | 13.43 | 10.00 | 14.00 | 16.77 | 16.79 |
| Measured properties | | | | | | |
| $d_{RT}$ | $g/cm^3$ | | | | | |
| E | GPa | | | | | |
| μ | | | | | | |
| $E/d_{RT}$ | $GPa \cdot cm^3/g$ | | | | | |
| $n_d$ | | | | | | |
| $v_d$ | | | | | | |
| $T_{liq}$ | ° C. | | | | | |
| HCl[DIN12116] | $mg/cm^2$ | | | | | |
| NaOH[ISO695] | $mg/cm^2$ | | | | | |
| Weathering-85° C./85% RH | $mg/cm^2$ | | | | | |
| vHF loss | $mg/cm^2$ | | | | | |
| vHF appearance | | | | | | |
| 15-min devit test (0/1) | 1 | 1 | 1 | 1 | 1 | |
| Measured properties | | | | | | |
| $d_{RT}$ | $g/cm^3$ | | | | 2.565 | |
| E | GPa | | | | 84.257 | |
| μ | | | | | 0.20100 | |
| $E/d_{RT}$ | $GPa \cdot cm^3/g$ | | | | 32.850 | |
| $n_d$ | | | | | 1.5281 | |
| $v_d$ | | | | | 71.4 | |
| $T_{liq}$ | ° C. | | | | 1180 | |
| HCl[DIN12116] | $mg/cm^2$ | | | | 1.42 | |
| NaOH[ISO695] | $mg/cm^2$ | | | | 53.5 | |
| Weathering-85° C./85% RH | $mg/cm^2$ | | | | 0.05 | |
| vHF loss | $mg/cm^2$ | | | | 0.13 | |
| vHF appearance | | | | | clear. shiny | |
| 15-min devit test (0/1) | 1 | 1 | 1 | 1 | | 1 |

TABLE 6-continued

| Predicted and calculated properties | | | | | | |
|---|---|---|---|---|---|---|
| $I_B$, mol. % | | −0.14182 | 2.9962 | −1.0319 | 3.8740 | |
| $P_E$ [for E] | GPa | 79.21 | 77.69 | 78.88 | 77.23 | |
| Predicted and calculated properties | | | | | | |
| $I_B$, mol. % | | −1.8439 | 5.0099 | −3.0032 | 10.520 | 1.5979 |
| $P_E$ [for E] | GPa | 78.57 | 76.64 | 78.13 | 74.83 | 77.56 |

Figure 3:
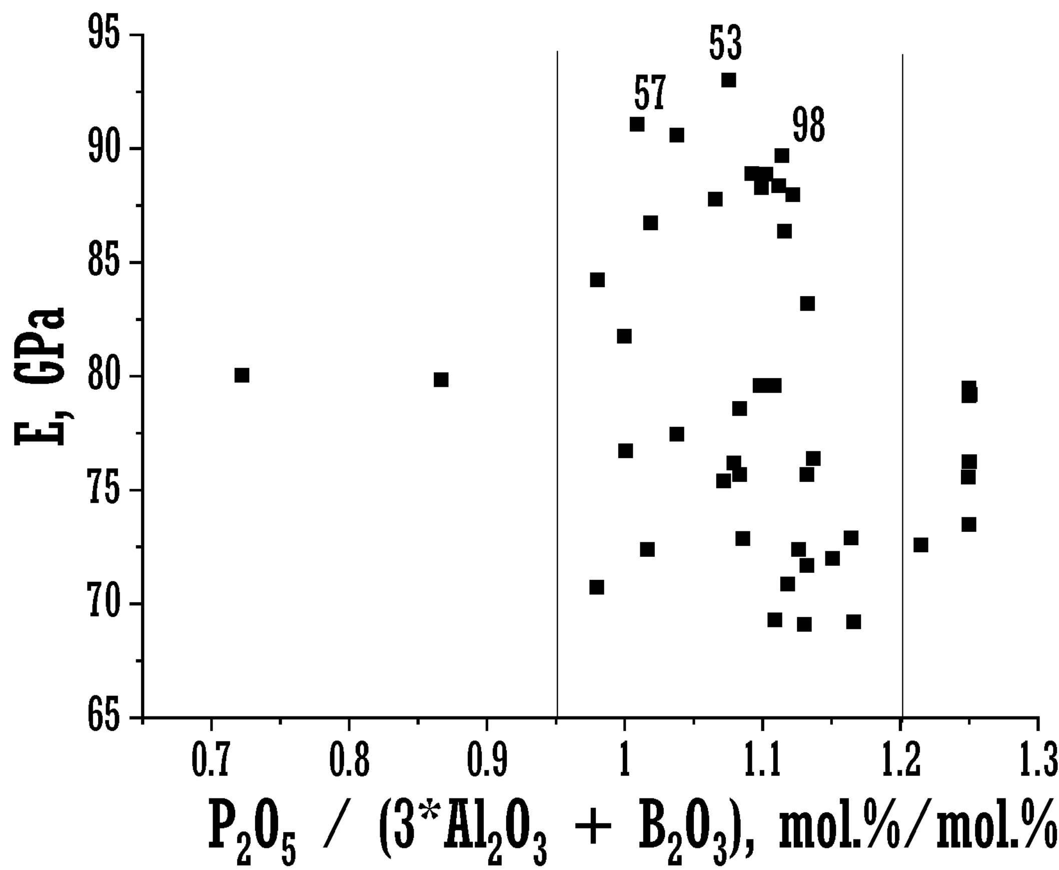
FIG. 3 is a plot that presents the relationship between the Young's modulus E and the ratio $P_2O_5/(3*Al_2O_3+B_2O_3)$ for some Exemplary Glasses.

FIG. 3 shows the relationship between the Young's modulus E and the ratio $P_2O_5/(3*Al_2O_3+B_2O_3)$ for the Exemplary Glasses of Table 6 for which Young's modulus was measured. As follows from the figure, the highest values of the Young's modulus were observed in the case when the indicated ratio is in the range from about 0.95 to about 1.30, or in the range from 0.95 to about 1.20, or in the range from about 1.00 to about 1.15.

Glasses according to the present disclosure have a Young's modulus E greater than 70 GPa, or greater than 80 GPa, or greater than 90 GPa, or greater than 100 GPa, or greater than 110 GPa, or in a range from 70 GPa to 120 GPa, or in a range from 75 GPa to 115 GPa, or in a range from 80 GPa to 110 GPa.

Glasses according to the present disclosure have a value of the parameter $P_E$ greater than 70 GPa, or greater than 80 GPa, or greater than 90 GPa, or greater than 100 GPa, or greater than 110 GPa, or in a range from 70 GPa to 120 GPa, or in a range from 75 GPa to 115 GPa, or in a range from 80 GPa to 110 GPa.

The following non-limiting aspects are encompassed by the present disclosure. To the extent not already described, any one of the features of the first through the sixty-first aspect may be combined in part or in whole with features of any one or more of the other aspects of the present disclosure to form additional aspects, even if such a combination is not explicitly described.

According to a first aspect, the glass comprises a plurality of components, the glass having a composition of the components comprising greater than or equal to 0.3 mol. % and less than or equal to 50.0 mol. % $B_2O_3$, greater than or equal to 0.0 mol. % and less than or equal to 75.0 mol. % $P_2O_5$, greater than or equal to 0.5 mol. % and less than or equal to 15.0 mol. % MgO, greater than or equal to 0.0 mol. % and less than or equal to 30.0 mol. % $Al_2O_3$, greater than or equal to 0.0 mol. % and less than or equal to 1.0 mol. % $Cu_2O$+CuO, greater than or equal to 0.3 mol. % and less than or equal to 15.0 mol. % $R_2O$, greater than or equal to 0.0 at. % and less than or equal to 0.5 at. % F, greater than or equal to 15.0 mol. % and less than or equal to 75.0 mol. % $P_2O_5+B_2O_3$, greater than or equal to 0.8 mol. % and less than or equal to 15.0 mol. % $R_2O+RO+SnO_2+MnO_2$ and greater than or equal to 0.0 mol. % and less than or equal to 5.0 mol. % $TeO_2+GeO_2$, wherein the composition of the components is substantially free of $SiO_2$ and substantially free of PbO and wherein the composition of the components satisfies the conditions: $(Li_2O+Na_2O)/R_2O$ [mol. %]≥0.75, where $R_2O$ is a total sum of monovalent metal oxides, and RO is a total sum of divalent metal oxides.

According to a second aspect, the glass of the first aspect, wherein the composition of the components comprises greater than or equal to 60.0 mol. % and less than or equal to 68.0 mol. % $P_2O_5$, greater than or equal to 15.0 mol. % and less than or equal to 20.0 mol. % $Al_2O_3$, greater than or equal to 0.3 mol. % and less than or equal to 12.0 mol. % $B_2O_3$, greater than or equal to 1.0 mol. % and less than or equal to 15.0 mol. % $R_2O$+RO and wherein the composition of the components satisfies the condition: $0.95 \le P_2O_5/(3*Al_2O_3+B_2O_3)$ [mol. %]≤1.20.

According to a third aspect, the glass of any aspect 1, wherein the composition of the components comprises greater than or equal to 48.0 mol. % and less than or equal to 75.0 mol. % $P_2O_5$, greater than or equal to 8.0 mol. % and less than or equal to 30.0 mol. % $Al_2O_3$, greater than or equal to 0.3 mol. % and less than or equal to 40.0 mol. % $Alk_2O+MgO+RE_mO_n$, greater than or equal to 0.25 mol. % and less than or equal to 40 mol. % $TiO_2+ZrO_2$ and greater than or equal to 0.0 mol. % and less than or equal to 10.0 mol. % $Na_2O+K_2O$+BaO and wherein the composition of the components is substantially free of Cu, Co, Ni, Cr, V and Bi, where $Alk_2O$ is a total sum of alkali metal oxides, and $RE_mO_n$ is a total sum of rare earth metal oxides.

According to a fourth aspect, the glass of any one of aspects 1-3, wherein the glass has a batch index, $I_B$ that is greater than or equal to 0.000, where $I_B$ is calculated from the glass composition in terms of mol. % of the components according to the Formula (I):

$$I_B=(R_2O+RO+3*Al_2O_3+B_2O_3+3*RE_2O_3)-P_2O_5, \quad (I).$$

According to a fifth aspect, the glass of any one of aspects 1-4, wherein the composition of the components satisfies the condition: $-1 \le \min(B_2O_3, P_2O_5-(3*Al_2O_3+3*RE_mO_n+R_2O+MgO+CaO))$ K≤12, where $RE_mO_n$ is a total sum of rare earth metal oxides, and $R_2O$ is a total sum of monovalent metal oxides.

According to a sixth aspect, the glass of any one of aspects 1 and 3-5, wherein the composition of the components comprises greater than or equal to 50.0 mol. % and less than or equal to 70.0 mol. % $P_2O_5$, greater than or equal to 10.0 mol. % and less than or equal to 30.0 mol. % $Al_2O_3$, greater than or equal to 0.5 mol. % and less than or equal to 10.0 mol. % MgO, greater than or equal to 0.3 mol. % and less than or equal to 10.0 mol. % $B_2O_3$, greater than or equal to 0.0 mol. % and less than or equal to 15.0 mol. % $TiO_2$, greater than or equal to 0.0 mol. % and less than or equal to 10.0 mol. % $CeO_2$, greater than or equal to 0.0 mol. % and less than or equal to 10.0 mol. % $K_2O$, greater than or equal to 0.0 mol. % and less than or equal to 10.0 mol. % $Li_2O$, greater than or equal to 0.0 mol. % and less than or equal to 10.0 mol. % $Na_2O$, greater than or equal to 0.0 mol. % and less than or equal to 7.5 mol. % $La_2O_3$, greater than or equal to 0.0 mol. % and less than or equal to 7.5 mol. % $Y_2O_3$, greater than or equal to 0.0 mol. % and less than or equal to 4.0 mol. % CaO and greater than or equal to 0.0 mol. % and less than or equal to 4.0 mol. % $ZrO_2$.

According to a seventh aspect, the glass of any one of aspects 1 and 3-6, wherein the composition of the components comprises one or more of the following: greater than or equal to 53.5 mol. % and less than or equal to 66.0 mol. % $P_2O_5$, greater than or equal to 15.5 mol. % and less than or equal to 28.5 mol. % $Al_2O_3$, greater than or equal to 0.75 mol. % and less than or equal to 7.25 mol. % MgO, greater than or equal to 0.5 mol. % and less than or equal to 8.0 mol. % $B_2O_3$, greater than or equal to 0.0 mol. % and less than or equal to 11.0 mol. % $TiO_2$, greater than or equal to 0.0 mol. % and less than or equal to 9.0 mol. % $K_2O$, greater than or equal to 0.0 mol. % and less than or equal to 9.0 mol. % $Li_2O$, greater than or equal to 0.0 mol. % and less than or equal to 9.0 mol. % $Na_2O$, greater than or equal to 0.0 mol. % and less than or equal to 6.5 mol. % $CeO_2$, greater than or equal to 0.0 mol. % and less than or equal to 5.5 mol. % $La_2O_3$, greater than or equal to 0.0 mol. % and less than or equal to 5.5 mol. % $Y_2O_3$, greater than or equal to 0.0 mol. % and less than or equal to 4.0 mol. % CaO, greater than or equal to 0.0 mol. % and less than or equal to 3.6 mol. % $ZrO_2$ and greater than or equal to 0.0 mol. % and less than or equal to 1.0 mol. % $Nd_2O_3$.

According to an eighth aspect, the glass of any one of aspects 1 and 3-7, wherein the composition of the components comprises greater than or equal to 58.0 mol. % and less than or equal to 66.0 mol. % $P_2O_5$, greater than or equal to 16.0 mol. % and less than or equal to 27.0 mol. % $Al_2O_3$, greater than or equal to 1.5 mol. % and less than or equal to 7.8 mol. % $B_2O_3$, greater than or equal to 1.5 mol. % and less than or equal to 6.3 mol. % MgO, greater than or equal to 0.0 mol. % and less than or equal to 10.0 mol. % $TiO_2$, greater than or equal to 0.0 mol. % and less than or equal to 8.0 mol. % $K_2O$, greater than or equal to 0.0 mol. % and less than or equal to 8.0 mol. % $Li_2O$, greater than or equal to 0.0 mol. % and less than or equal to 8.0 mol. % $Na_2O$, greater than or equal to 0 mol. % and less than or equal to 5.75 mol. % $CeO_2$, greater than or equal to 0 mol. % and less than or equal to 4.75 mol. % $La_2O_3$, greater than or equal to 0 mol. % and less than or equal to 4.75 mol. % $Y_2O_3$, greater than or equal to 0.0 mol. % and less than or equal to 3.4 mol. % CaO, greater than or equal to 0.0 mol. % and less than or equal to 3.2 mol. % $ZrO_2$ and greater than or equal to 0.0 mol. % and less than or equal to 1.5 mol. % $Nd_2O_3$.

According to a ninth aspect, the glass of any one of aspects 1-8, wherein the composition of the components comprises greater than or equal to 0.0 mol. % and less than or equal to 5.0 mol. % $Ta_2O_5$, greater than or equal to 0.0 mol. % and less than or equal to 1.0 mol. % BaO, greater than or equal to 0.0 mol. % and less than or equal to 1.0 mol. % $V_2O_5$, greater than or equal to 0.0 mol. % and less than or equal to 3.0 mol. % $K_2O+Rb_2O+Cs_2O$ and greater than or equal to 0.0 mol. % and less than or equal to 3.0 mol. % $TeO_2+GeO_2$, wherein the composition of the components is substantially free of Cu, Co, Ni, Cr, V and Bi and substantially free of fluorine.

According to a tenth aspect, the glass of any one of aspects 1-9, wherein the glass has logarithm of liquidus viscosity, Log($\eta_{liq}$, [P]) that is greater than or equal to 2.0.

According to an eleventh aspect, the glass of any one of aspects 1-10, wherein the glass has one or more of the following attributes: a mass difference per unit area in HCl according to DIN12116, HCl[DIN12116], that is less than or equal to 10 $mg/cm^2$ and a mass difference per unit area in NaOH according to ISO695, NaOH[ISO695], that is less than or equal to 100 $mg/cm^2$.

According to a twelfth aspect, the glass of any one of aspects 1-11, wherein the glass has vHF mass difference per unit area that is less than or equal to 1.0 $mg/cm^2$.

According to a thirteenth aspect, the glass of any one of aspects 1, 3-5 and 9-12, wherein the composition of the components comprises greater than or equal to 30.0 mol. % and less than or equal to 75.0 mol. % $P_2O_5$, greater than or equal to 8.0 mol. % and less than or equal to 30.0 mol. % $Al_2O_3$, greater than or equal to 0.0 mol. % and less than or equal to 14.0 mol. % $Li_2O$, greater than or equal to 0.0 mol. % and less than or equal to 8.0 mol. % $Na_2O$, greater than or equal to 0.0 mol. % and less than or equal to 5.0 mol. % $K_2O$, greater than or equal to 0.0 mol. % and less than or equal to 3.0 mol. % BaO, greater than or equal to 0.5 mol. % and less than or equal to 15.0 mol. % $La_2O_3+CeO_2+Ce_2O_3$, greater than or equal to 0.5 mol. % and less than or equal to 15.0 mol. % $Li_2O+Na_2O+MgO+CaO$ and greater than or equal to 0.0 mol. % and less than or equal to 1.0 mol. % $Bi_2O_3+Cu_2O+CuO$ and wherein the composition of the components satisfies the condition: $(La_2O_3+CeO_2+Ce_2O_3)/RE_mO_n$ [mol. %]≥0.51, where $RE_mO_n$ is a total sum of rare earth metal oxides.

According to a fourteenth aspect, the glass of any one of aspects 1-13, wherein the glass satisfies the conditions: $P_E>75$, where $P_E$ is calculated from the glass composition in terms of mol. % of the components according to the Formula (II):

$$P_E=-0.27146*P_2O_5+0.96062*Al_2O_3+0.22431*B_2O_3-0.072878*BaO+0.35074*CaO+0.21526*(Ce_2O_3+CeO_2)-0.12628*Cu_2O-0.5807*K_2O+0.41579*La_2O_3+0.18714*Li_2O+0.20336*MgO+0.061862*MnO-0.057105*MnO_2-0.18615*Na_2O+0.64778*Nb_2O_5-0.35317*PbO-0.028357*SiO_2+0.17429*SnO+0.55551*SnO_2+0.8294*Ta_2O_5+0.60217*TiO_2+0.17356*WO_3+0.36256*Y_2O_3-0.19958*ZnO+0.7835*ZrO_2+0.46259*(RE_mO_n-La_2O_3-Y_2O_3-Ce_2O_3-CeO_2)+0.90549*(\max(0,\min(B_2O_3,P_2O_5-(3*Al_2O_3+3*RE_mO_n+R_2O+MgO+CaO))))+70, \quad (II)$$

According to a fifteenth aspect, the glass of any one of aspects 1-14, wherein the glass has a Young's modulus, E that is greater than or equal to 75 GPa.

According to a sixteenth aspect, the glass of the fifteenth aspect, wherein the glass has a Young's modulus, E that is greater than or equal to 80 GPa.

According to a seventeenth aspect, the glass of the sixteenth aspect, wherein the glass has a Young's modulus, E that is greater than or equal to 85 GPa.

According to an eighteenth aspect, the glass of the seventeenth aspect any of the aspects 14-17, wherein $P_E>85$.

According to a nineteenth aspect, the glass of any one of aspects 1-18, wherein the glass has an average linear thermal expansion coefficient of glass in the range 20-300° C., $\alpha_{20-300}\times10^7$ that is greater than or equal to 60 $K^{-1}$, and less than or equal to 70 $K^{-1}$.

According to a twentieth aspect, the glass of the nineteenth aspect, wherein the glass has an average linear thermal expansion coefficient of glass in the range 20-300° C., $\alpha_{20-300}\times10^7$ that is greater than or equal to 63 $K^{-1}$, and less than or equal to 67 $K^{-1}$.

According to a twenty-first aspect, the glass comprises a plurality of components, the glass having a composition of the components comprising greater than or equal to 40.0 mol. % and less than or equal to 75.0 mol. % $P_2O_5$, greater than or equal to 0.5 mol. % and less than or equal to 10.5 mol. % $B_2O_3$, greater than or equal to 0.0 mol. % and less than or equal to 25.0 mol. % $Al_2O_3$, greater than or equal to 0.0 mol. % and less than or equal to 0.5 mol. % $SiO_2$, greater than or equal to 0.0 at. % and less than or equal to 5.0 at. % F, greater than or equal to 0.5 mol. % $R_2O+RO$, greater than or equal to 0.0 mol. % and less than or equal to 9.5 mol. % $K_2O+Rb_2O+Cs_2O$ and greater than or equal to 0.0 mol. % and less than or equal to 0.5 mol. % $ZnO+CuO+Cu_2O$, wherein the composition of the components satisfies the conditions: $3*Al_2O_3+R_2O+RO-P_2O_5$[mol. %]≥−7.0 and $Al_2O_3-R_2O-RO$ [mol. %]≥7.95.

According to a twenty-second aspect, the glass of the twenty-first aspect, wherein the composition of the components comprises greater than or equal to 60.0 mol. % and less than or equal to 68.0 mol. % $P_2O_5$, greater than or equal to 15.0 mol. % and less than or equal to 20.0 mol. % $Al_2O_3$, greater than or equal to 0.5 mol. % and less than or equal to 12.0 mol. % $B_2O_3$, greater than or equal to 1.0 mol. % and less than or equal to 15.0 mol. % $R_2O$+RO and wherein the composition of the components satisfies the conditions: $0.95 \le P_2O_5/(3*Al_2O_3+B_2O_3)$ [mol. %]$\le 1.20$, where $R_2O$ is a total sum of monovalent metal oxides, and RO is a total sum of divalent metal oxides.

According to a twenty-third aspect, the glass of aspect 21, wherein the composition of the components comprises greater than or equal to 48.0 mol. % and less than or equal to 75.0 mol. % $P_2O_5$, greater than or equal to 8.0 mol. % and less than or equal to 30.0 mol. % $Al_2O_3$, greater than or equal to 0.0 mol. % and less than or equal to 3.0 mol. % $SiO_2$, greater than or equal to 0.0 mol. % and less than or equal to 25.0 mol. % RO, greater than or equal to 0.3 mol. % and less than or equal to 40.0 mol. % $Alk_2O+MgO+RE_mO_n$, greater than or equal to 0.25 mol. % and less than or equal to 40 mol. % $TiO_2+ZrO_2$ and greater than or equal to 0.0 mol. % and less than or equal to 10.0 mol. % $Na_2O+K_2O$+BaO and wherein the composition of the components is substantially free of Cu, Co, Ni, Cr, V and Bi, where $Alk_2O$ is a total sum of alkali metal oxides, $RE_mO_n$ is a total sum of rare earth metal oxides, and RO is a total sum of divalent metal oxides.

According to a twenty-fourth aspect, the glass of any one of aspects 21-23, wherein the glass has a batch index, $I_B$ that is greater than or equal to 0.000, where $I_B$ is calculated from the glass composition in terms of mol. % of the components according to the Formula (I):

$$I_B=(R_2O+RO+3*Al_2O_3+B_2O_3+3*RE_2O_3)-P_2O_5, \quad (I).$$

According to a twenty-fifth aspect, the glass of any one of aspects 21-24, wherein the composition of the components satisfies the condition: $-1 \le \min(B_2O_3, P_2O_5-(3*Al_2O_3+3*RE_mO_n+R_2O+MgO+CaO)) \le 12$, where $RE_mO_n$ is a total sum of rare earth metal oxides, and $R_2O$ is a total sum of monovalent metal oxides.

According to a twenty-sixth aspect, the glass of any one of aspects 21 or 23-25, wherein the composition of the components comprises greater than or equal to 50.0 mol. % and less than or equal to 70.0 mol. % $P_2O_5$, greater than or equal to 10.0 mol. % and less than or equal to 30.0 mol. % $Al_2O_3$, greater than or equal to 0.5 mol. % and less than or equal to 10.0 mol. % $B_2O_3$, greater than or equal to 0.0 mol. % and less than or equal to 15.0 mol. % $TiO_2$, greater than or equal to 0.0 mol. % and less than or equal to 10.0 mol. % $CeO_2$, greater than or equal to 0.0 mol. % and less than or equal to 10.0 mol. % $K_2O$, greater than or equal to 0.0 mol. % and less than or equal to 10.0 mol. % $Li_2O$, greater than or equal to 0.0 mol. % and less than or equal to 10.0 mol. % MgO, greater than or equal to 0.0 mol. % and less than or equal to 7.5 mol. % $La_2O_3$, greater than or equal to 0.0 mol. % and less than or equal to 7.5 mol. % $Y_2O_3$, greater than or equal to 0.0 mol. % and less than or equal to 4.0 mol. % CaO and greater than or equal to 0.0 mol. % and less than or equal to 4.0 mol. % $ZrO_2$.

According to a twenty-seventh aspect, the glass of any one of aspects 21 or 23-26, wherein the composition of the components comprises one or more of the following components: greater than or equal to 53.5 mol. % and less than or equal to 66.0 mol. % $P_2O_5$, greater than or equal to 15.5 mol. % and less than or equal to 28.5 mol. % $Al_2O_3$, greater than or equal to 0.75 mol. % and less than or equal to 7.25 mol. % MgO, greater than or equal to 0.5 mol. % and less than or equal to 8.0 mol. % $B_2O_3$, greater than or equal to 0.0 mol. % and less than or equal to 11.0 mol. % $TiO_2$, greater than or equal to 0.0 mol. % and less than or equal to 9.0 mol. % $K_2O$, greater than or equal to 0.0 mol. % and less than or equal to 9.0 mol. % $Li_2O$, greater than or equal to 0.0 mol. % and less than or equal to 9.0 mol. % $Na_2O$, greater than or equal to 0.0 mol. % and less than or equal to 6.5 mol. % $CeO_2$, greater than or equal to 0.0 mol. % and less than or equal to 5.5 mol. % $La_2O_3$, greater than or equal to 0.0 mol. % and less than or equal to 5.5 mol. % $Y_2O_3$, greater than or equal to 0.0 mol. % and less than or equal to 4.0 mol. % CaO, greater than or equal to 0.0 mol. % and less than or equal to 3.6 mol. % $ZrO_2$ and greater than or equal to 0.0 mol. % and less than or equal to 1.0 mol. % $Nd_2O_3$.

According to a twenty-eighth aspect, the glass of any one of aspects 21 or 23-27, wherein the composition of the components comprises greater than or equal to 58.0 mol. % and less than or equal to 66.0 mol. % $P_2O_5$, greater than or equal to 16.0 mol. % and less than or equal to 27.0 mol. % $Al_2O_3$, greater than or equal to 1.5 mol. % and less than or equal to 7.8 mol. % $B_2O_3$, greater than or equal to 1.5 mol. % and less than or equal to 6.3 mol. % MgO, greater than or equal to 0.0 mol. % and less than or equal to 10.0 mol. % $TiO_2$, greater than or equal to 0.0 mol. % and less than or equal to 8.0 mol. % $K_2O$, greater than or equal to 0.0 mol. % and less than or equal to 8.0 mol. % $Li_2O$, greater than or equal to 0.0 mol. % and less than or equal to 8.0 mol. % $Na_2O$, greater than or equal to 0 mol. % and less than or equal to 5.75 mol. % $CeO_2$, greater than or equal to 0 mol. % and less than or equal to 4.75 mol. % $La_2O_3$, greater than or equal to 0 mol. % and less than or equal to 4.75 mol. % $Y_2O_3$, greater than or equal to 0.0 mol. % and less than or equal to 3.4 mol. % CaO, greater than or equal to 0.0 mol. % and less than or equal to 3.2 mol. % $ZrO_2$ and greater than or equal to 0.0 mol. % and less than or equal to 1.5 mol. % $Nd_2O_3$.

According to a twenty-ninth aspect, the glass of any one of aspects 21-28, wherein the composition of the components comprises greater than or equal to 0.0 mol. % and less than or equal to 5.0 mol. % $Ta_2O_5$, greater than or equal to 0.0 mol. % and less than or equal to 1.0 mol. % BaO, greater than or equal to 0.0 mol. % and less than or equal to 1.0 mol. % $V_2O_5$, greater than or equal to 0.0 mol. % and less than or equal to 3.0 mol. % $K_2O+Rb_2O+Cs_2O$ and greater than or equal to 0.0 mol. % and less than or equal to 3.0 mol. % $TeO_2+GeO_2$, wherein the composition of the components is substantially free of Cu, Co, Ni, Cr, V and Bi, substantially free of fluorine, substantially free of PbO and substantially free of $SiO_2$.

According to a thirtieth aspect, the glass of any one of aspects 21-29, wherein the glass has logarithm of liquidus viscosity, Log($\eta_{liq}$, [P]) that is greater than or equal to 2.0.

According to a thirty-first aspect, the glass of any one of aspects 21-30, wherein the glass has one or more of the following attributes: a mass difference per unit area in HCl according to DIN12116, HCl[DIN12116], that is less than or equal to 10 mg/cm$^2$ and a mass difference per unit area in NaOH according to ISO695, NaOH[ISO695], that is less than or equal to 100 mg/cm$^2$.

According to a thirty-second aspect, the glass of any one of aspects 21-31, wherein the glass has a vHF mass difference per unit area that is less than or equal to 1.0 mg/cm$^2$ and wherein the glass exhibits no surface damage after test, as observed by a naked eye.

According to a thirty-third aspect, the glass of any one of aspects 21, 23-26 or 29-32, wherein the composition of the components comprises greater than or equal to 8.0 mol. % and less than or equal to 30.0 mol. % $Al_2O_3$, greater than or equal to 0.0 mol. % and less than or equal to 14.0 mol. % $Li_2O$, greater than or equal to 0.0 mol. % and less than or equal to 8.0 mol. % $Na_2O$, greater than or equal to 0.0 mol. % and less than or equal to 5.0 mol. % $K_2O$, greater than or equal to 0.0 mol. % and less than or equal to 3.0 mol. % BaO, greater than or equal to 0.0 mol. % and less than or equal to 0.2 mol. % $SiO_2$, greater than or equal to 0.0 at. % and less than or equal to 1.0 at. % F, greater than or equal to 0.5 mol. % and less than or equal to 17.0 mol. % $Li_2O+Na_2O+MgO+CaO$, greater than or equal to 0.5 mol. % and less than or equal to 15.0 mol. % $La_2O_3+CeO_2+Ce_2O_3$ and greater than or equal to 0.0 mol. % and less than or equal to 1.0 mol. % $Bi_2O_3+Cu_2O+CuO$ and wherein the composition of the components satisfies the conditions: $(La_2O_3+CeO_2+Ce_2O_3)/RE_mO_n$ [mol. %]≥0.51, where chemical formulas mean the content of corresponding components in the glass, $RE_mO_n$ is a total sum of rare earth metal oxides.

According to a thirty-fourth aspect, the glass of any one of aspects 21-33, wherein the composition of the components satisfies the condition: $P_E>75$, where $P_E$ is calculated from the glass composition in terms of mol. % of the components according to the Formula (II):

$$P_E=-0.27146*P_2O_5+0.96062*Al_2O_3+0.22431*B_2O_3-0.072878*BaO+0.35074*CaO+0.21526*(Ce_2O_3+CeO_2)-0.12628*Cu_2O-0.5807*K_2O+0.41579*La_2O_3+0.18714*Li_2O+0.20336*MgO+0.061862*MnO-0.057105*MnO_2-0.18615*Na_2O+0.64778*Nb_2O_5-0.35317*PbO-0.028357*SiO_2+0.17429*SnO+0.55551*SnO_2+0.8294*Ta_2O_5+0.60217*TiO_2+0.17356*WO_3+0.36256*Y_2O_3-0.19958*ZnO+0.7835*ZrO_2+0.46259*(RE_mO_n-La_2O_3-Y_2O_3-Ce_2O_3-CeO_2)+0.90549*(max(0,min(B_2O_3,P_2O_5-(3*Al_2O_3+3*RE_mO_n+R_2O+MgO+CaO))))+70, \quad (II).$$

According to a thirty-fifth aspect, the glass of any one of aspects 21-34, wherein the glass has a Young's modulus, E that is greater than or equal to 75 GPa.

According to a thirty-sixth aspect, the glass of the thirty-fifth aspect, wherein the glass has a Young's modulus, E that is greater than or equal to 80 GPa.

According to a thirty-seventh aspect, the glass of the thirty-sixth aspect, wherein the glass has a Young's modulus, E that is greater than or equal to 85 GPa.

According to a thirty-eighth aspect, the glass of the thirty-seventh aspect of any of the aspects 34-37, wherein the glass has a value of the parameter $P_E>85$.

According to a thirty-ninth aspect, the glass of any one of aspects 21-38, wherein the glass has an average linear thermal expansion coefficient of glass in the range 20-300° C., $\alpha_{20-300}\times10^7$ that is greater than or equal to 60 $K^{-1}$, and less than or equal to 70 $K^{-1}$.

According to a fortieth aspect, the glass of the thirty-ninth aspect, wherein the glass has an average linear thermal expansion coefficient of glass in the range 20-300° C., $\alpha_{20-300}\times10^7$ that is greater than or equal to 63 $K^{-1}$, and less than or equal to 67 $K^{-1}$.

According to a forty-first aspect, the glass comprises a plurality of components, the glass having a composition of the components comprising greater than or equal to 40.0 mol. % and less than or equal to 75.0 mol. % $P_2O_5$, greater than or equal to 3.0 mol. % and less than or equal to 30.0 mol. % $Al_2O_3$, greater than or equal to 0.0 mol. % and less than or equal to 20.0 mol. % $Li_2O$, greater than or equal to 0.0 mol. % and less than or equal to 15.0 mol. % ZnO, greater than or equal to 0.0 mol. % and less than or equal to 15.0 mol. % $B_2O_3$, greater than or equal to 0.0 mol. % and less than or equal to 1.0 mol. % $SiO_2$, greater than or equal to 0.0 mol. % and less than or equal to 20.0 mol. % RO, greater than or equal to 0.0 at. % and less than or equal to 1.0 at. % F, greater than or equal to 0.5 mol. % and less than or equal to 20.0 mol. % $TiO_2+La_2O_3+Y_2O_3+Ce_2O_3+CeO_2+ZrO_2$, greater than or equal to 0.5 mol. % $R_2O+RO+B_2O_3$, greater than or equal to 0.0 mol. % and less than or equal to 28.0 mol. % $R_2O+RO$ and may optionally contain one or more components selected from $MnO_2$, $Nb_2O_5$, $SnO_2$, $Ta_2O_5$, $WO_3$, $Sc_2O_3$, $Pr_2O_3$, $PrO_2$, $Pr_6O_{11}$, $Nd_2O_3$, $Eu_2O_3$, EuO, $Gd_2O_3$, $GdO_2$, $Tb_2O_3$, $Dy_2O_3$, $Ho_2O_3$, $Er_2O_3$, $Tm_2O_3$, $Yb_2O_3$, $Lu_2O_3$ and $Sm_2O_3$, wherein the composition of the components is substantially free of Cu, Co, Cr and Ni, and the composition of the components satisfies the condition: $P_E>75$, where $P_E$ calculated from the glass composition in terms of mol. % of the components according to the Formula (II):

$$P_E=-0.27146*P_2O_5+0.96062*Al_2O_3+0.22431*B_2O_3-0.072878*BaO+0.35074*CaO+0.21526*(Ce_2O_3+CeO_2)-0.12628*Cu_2O-0.5807*K_2O+0.41579*La_2O_3+0.18714*Li_2O+0.20336*MgO+0.061862*MnO-0.057105*MnO_2-0.18615*Na_2O+0.64778*Nb_2O_5-0.35317*PbO-0.028357*SiO_2+0.17429*SnO+0.55551*SnO_2+0.8294*Ta_2O_5+0.60217*TiO_2+0.17356*WO_3+0.36256*Y_2O_3-0.19958*ZnO+0.7835*ZrO_2+0.46259*(RE_mO_n-La_2O_3-Y_2O_3-Ce_2O_3-CeO_2)+0.90549*(max(0,min(B_2O_3,P_2O_5-(3*Al_2O_3+3*RE_mO_n+R_2O+MgO+CaO))))+70, \quad (II)$$

where RO is a total sum of divalent metal oxides, $R_2O$ is a total sum of monovalent metal oxides, and an asterisk (*) means multiplication.

According to a forty-second aspect, the glass of the forty-first aspect, wherein the glass has a Young's modulus, E that is greater than or equal to 75 GPa.

According to a forty-third aspect, the glass of any one of aspects 41-42, wherein the glass has a Young's modulus, E that is greater than or equal to 80 GPa.

According to a forty-fourth aspect, the glass of any one of aspects 41-43, wherein $P_E>80$.

According to a forty-fifth aspect, the glass of any one of aspects 41-44, wherein the composition of the components comprises greater than or equal to 60.0 mol. % and less than or equal to 68.0 mol. % $P_2O_5$, greater than or equal to 15.0 mol. % and less than or equal to 20.0 mol. % $Al_2O_3$, greater than or equal to 0.3 mol. % and less than or equal to 12.0 mol. % $B_2O_3$, greater than or equal to 1.0 mol. % and less than or equal to 15.0 mol. % $R_2O+RO$ and wherein the composition of the components satisfies the condition: $0.95\leq P_2O_5/(3*Al_2O_3+B_2O_3)$ [mol. %]≤1.20, where $R_2O$ is a total sum of monovalent metal oxides, and RO is a total sum of divalent metal oxides.

According to a forty-sixth aspect, the glass of any one of aspects 41-44, wherein the composition of the components comprises greater than or equal to 48.0 mol. % and less than or equal to 75.0 mol. % $P_2O_5$, greater than or equal to 8.0 mol. % and less than or equal to 30.0 mol. % $Al_2O_3$, greater than or equal to 0.3 mol. % and less than or equal to 40.0 mol. % $Alk_2O+MgO+RE_mO_n$, greater than or equal to 0.25 mol. % and less than or equal to 20 mol. % $TiO_2+ZrO_2$ and greater than or equal to 0.0 mol. % and less than or equal to 10.0 mol. % $Na_2O+K_2O+BaO$ and wherein the composition of the components is substantially free of Cu, Co, Ni, Cr, V and Bi, where $Alk_2O$ is a total sum of alkali metal oxides, and $RE_mO_n$ is a total sum of rare earth metal oxides.

According to a forty-seventh aspect, the glass of any one of aspects 41-46, wherein the glass has a batch index, $I_B$ that is greater than or equal to 0.000, where $I_B$ is calculated from the glass composition in terms of mol. % of the components according to the Formula (I):

$$I_B=(R_2O+RO+3*Al_2O_3+B_2O_3+3*RE_2O_3)-P_2O_5, \quad (I).$$

According to a forty-eighth aspect, the glass of any one of aspects 41-47, wherein the composition of the components satisfies the condition: $-1\leq\min(B_2O_3,P_2O_5-(3*Al_2O_3+3*RE_mO_n+R_2O+MgO+CaO))\leq 12$, where $RE_mO_n$ is a total sum of rare earth metal oxides, and $R_2O$ is a total sum of monovalent metal oxides.

According to a forty-ninth aspect, the glass of any one of aspects 41-44 or 46-48, wherein the composition of the components comprises greater than or equal to 50.0 mol. % and less than or equal to 70.0 mol. % $P_2O_5$, greater than or equal to 10.0 mol. % and less than or equal to 30.0 mol. % $Al_2O_3$, greater than or equal to 0.0 mol. % and less than or equal to 15.0 mol. % $TiO_2$, greater than or equal to 0.0 mol. % and less than or equal to 10.0 mol. % $B_2O_3$, greater than or equal to 0.0 mol. % and less than or equal to 10.0 mol. % $CeO_2$, greater than or equal to 0.0 mol. % and less than or equal to 10.0 mol. % $K_2O$, greater than or equal to 0.0 mol. % and less than or equal to 10.0 mol. % $Li_2O$, greater than or equal to 0.0 mol. % and less than or equal to 10.0 mol. % MgO, greater than or equal to 0.0 mol. % and less than or equal to 10.0 mol. % $Na_2O$, greater than or equal to 0.0 mol. % and less than or equal to 7.5 mol. % $La_2O_3$, greater than or equal to 0.0 mol. % and less than or equal to 7.5 mol. % $Y_2O_3$, greater than or equal to 0.0 mol. % and less than or equal to 4.0 mol. % CaO and greater than or equal to 0.0 mol. % and less than or equal to 4.0 mol. % $ZrO_2$.

According to a fiftieth aspect, the glass of any one of aspects 41-44 or 46-49, wherein the composition of the components comprises one or more of the following components: greater than or equal to 53.5 mol. % and less than or equal to 66.0 mol. % $P_2O_5$, greater than or equal to 15.5 mol. % and less than or equal to 28.5 mol. % $Al_2O_3$, greater than or equal to 0.75 mol. % and less than or equal to 7.25 mol. % MgO, greater than or equal to 0.5 mol. % and less than or equal to 8.0 mol. % $B_2O_3$, greater than or equal to 0.0 mol. % and less than or equal to 11.0 mol. % $TiO_2$, greater than or equal to 0.0 mol. % and less than or equal to 9.0 mol. % $K_2O$, greater than or equal to 0.0 mol. % and less than or equal to 9.0 mol. % $Li_2O$, greater than or equal to 0.0 mol. % and less than or equal to 9.0 mol. % $Na_2O$, greater than or equal to 0.0 mol. % and less than or equal to 6.5 mol. % $CeO_2$, greater than or equal to 0.0 mol. % and less than or equal to 5.5 mol. % $La_2O_3$, greater than or equal to 0.0 mol. % and less than or equal to 5.5 mol. % $Y_2O_3$, greater than or equal to 0.0 mol. % and less than or equal to 4.0 mol. % CaO, greater than or equal to 0.0 mol. % and less than or equal to 3.6 mol. % $ZrO_2$ and greater than or equal to 0.0 mol. % and less than or equal to 1.0 mol. % $Nd_2O_3$.

According to a fifty-first aspect, the glass of any one of aspects 41-44 or 46-50, wherein the composition of the components comprises greater than or equal to 58.0 mol. % and less than or equal to 66.0 mol. % $P_2O_5$, greater than or equal to 16.0 mol. % and less than or equal to 27.0 mol. % $Al_2O_3$, greater than or equal to 1.5 mol. % and less than or equal to 7.8 mol. % $B_2O_3$, greater than or equal to 1.5 mol. % and less than or equal to 6.3 mol. % MgO, greater than or equal to 0.0 mol. % and less than or equal to 10.0 mol. % $TiO_2$, greater than or equal to 0.0 mol. % and less than or equal to 8.0 mol. % $K_2O$, greater than or equal to 0.0 mol. % and less than or equal to 8.0 mol. % $Li_2O$, greater than or equal to 0.0 mol. % and less than or equal to 8.0 mol. % $Na_2O$, greater than or equal to 0 mol. % and less than or equal to 5.75 mol. % $CeO_2$, greater than or equal to 0 mol. % and less than or equal to 4.75 mol. % $La_2O_3$, greater than or equal to 0 mol. % and less than or equal to 4.75 mol. % $Y_2O_3$, greater than or equal to 0.0 mol. % and less than or equal to 3.4 mol. % CaO, greater than or equal to 0.0 mol. % and less than or equal to 3.2 mol. % $ZrO_2$ and greater than or equal to 0.0 mol. % and less than or equal to 1.5 mol. % $Nd_2O_3$.

According to a fifty-second aspect, the glass of any one of aspects 41-51, wherein the composition of the components comprises greater than or equal to 0.0 mol. % and less than or equal to 5.0 mol. % $Ta_2O_5$, greater than or equal to 0.0 mol. % and less than or equal to 1.0 mol. % BaO, greater than or equal to 0.0 mol. % and less than or equal to 1.0 mol. % $V_2O_5$, greater than or equal to 0.0 mol. % and less than or equal to 3.0 mol. % $K_2O+Rb_2O+Cs_2O$ and greater than or equal to 0.0 mol. % and less than or equal to 3.0 mol. % $TeO_2+GeO_2$, wherein the composition of the components is substantially free of Cu, Co, Ni, Cr, V and Bi, substantially free of fluorine, substantially free of PbO and substantially free of $SiO_2$.

According to a fifty-third aspect, the glass of any one of aspects 41-52, wherein the glass has a logarithm of liquidus viscosity, $\text{Log}(\eta_{liq}, [P])$ that is greater than or equal to 2.0.

According to a fifty-fourth aspect, the glass of any one of aspects 41-53, wherein the glass has one or more of the following attributes: a mass difference per unit area in HCl according to DIN12116, HCl[DIN12116], that is less than or equal to 10 $mg/cm^2$ and a mass difference per unit area in NaOH according to ISO695, NaOH[ISO695], that is less than or equal to 100 $mg/cm^2$.

According to a fifty-fifth aspect, the glass of any one of aspects 41-54, wherein the glass has a vHF mass difference per unit area that is less than or equal to 1.0 $mg/cm^2$.

According to a fifty-sixth aspect, the glass of any one of aspects 41-48 or 52-55, wherein the composition of the components comprises greater than or equal to 8.0 mol. % and less than or equal to 30.0 mol. % $Al_2O_3$, greater than or equal to 0.0 mol. % and less than or equal to 14.0 mol. % $Li_2O$, greater than or equal to 0.0 mol. % and less than or equal to 8.0 mol. % $Na_2O$, greater than or equal to 0.0 mol. % and less than or equal to 5.0 mol. % $K_2O$, greater than or equal to 0.0 mol. % and less than or equal to 3.0 mol. % BaO, greater than or equal to 0.0 mol. % and less than or equal to 0.2 mol. % $SiO_2$, greater than or equal to 0.5 mol. % and less than or equal to 17.0 mol. % $Li_2O+Na_2O+MgO+CaO$, greater than or equal to 0.5 mol. % and less than or equal to 15.0 mol. % $La_2O_3+CeO_2+Ce_2O_3$ and greater than or equal to 0.0 mol. % and less than or equal to 1.0 mol. % $Bi_2O_3+Cu_2O+CuO$ and wherein the composition of the components satisfies the condition: $(La_2O_3+CeO_2+Ce_2O_3)/RE_mO_n$ [mol. %]$\geq 0.51$, where $RE_mO_n$ is a total sum of rare earth metal oxides.

According to a fifty-seventh aspect, the glass of any one of aspects 41-56, wherein the composition of the components satisfies the condition: $P_E>80$, where $P_E$ is calculated from the glass composition in terms of mol. % of the components according to the Formula (II):

$$P_E=-0.27146*P_2O_5+0.96062*Al_2O_3+0.22431*B_2O_3-0.072878*BaO+0.35074*CaO+0.21526*(Ce_2O_3+CeO_2)-0.12628*Cu_2O-0.5807*K_2O+0.41579*La_2O_3+0.18714*Li_2O+0.20336*MgO+0.061862*MnO-0.057105*MnO_2-0.18615*Na_2O+0.64778*Nb_2O_5-0.35317*PbO-0.028357*SiO_2+0.17429*SnO+0.55551*SnO_2+0.8294*Ta_2O_5+0.60217*TiO_2+0.17356*WO_3+0.36256*Y_2O_3-0.19958*ZnO+0.7835*ZrO_2+0.46259*(RE_mO_n-La_2O_3-Y_2O_3-Ce_2O_3-CeO_2)+0.90549*(\max(0,\min(B_2O_3,P_2O_5-(3*Al_2O_3+3*RE_mO_n+R_2O+MgO+CaO))))+70, \quad (II).$$

According to a fifty-eighth aspect, the glass of any one of aspects 41-57, wherein the glass has a Young's modulus, E that is greater than or equal to 80 GPa.

According to a fifty-ninth aspect, the glass of the fifty-eighth aspect, wherein the glass has a Young's modulus, E that is greater than or equal to 85 GPa.

According to a sixtieth aspect, the glass of any one of aspects 41-59, wherein the glass has an average linear thermal expansion coefficient of glass in the range 20-300° C., $\alpha_{20\text{-}300}\times10^7$ that is greater than or equal to 60 $K^{-1}$, and less than or equal to 70 $K^{-1}$.

According to a sixty-first aspect, the glass of the sixtieth aspect, wherein the glass has an average linear thermal expansion coefficient of glass in the range 20-300° C., $\alpha_{20\text{-}300}\times10^7$ that is greater than or equal to 63 $K^{-1}$, and less than or equal to 67 $K^{-1}$.

Many variations and modifications may be made to the above-described embodiments of the disclosure without departing substantially from the spirit and various principles of the disclosure. All such modifications and variations are intended to be included herein within the scope of this disclosure and protected by the following claims.

To the extent not already described, the different features of the various aspects of the present disclosure may be used in combination with each other as desired. That a particular feature is not explicitly illustrated or described with respect to each aspect of the present disclosure is not meant to be construed that it cannot be, but it is done for the sake of brevity and conciseness of the description. Thus, the various features of the different aspects may be mixed and matched as desired to form new aspects, whether or not the new aspects are expressly disclosed.

The invention claimed is:

1. A glass comprising a plurality of components, the glass having a composition of the components comprising:

greater than or equal to 40.0 mol. % and less than or equal to 75.0 mol. % $P_2O_5$, greater than or equal to 3.0 mol. % and less than or equal to 30.0 mol. % $Al_2O_3$, greater than or equal to 0.0 mol. % and less than or equal to 20.0 mol. % $Li_2O$, greater than or equal to 0.0 mol. % and less than or equal to 15.0 mol. % ZnO, greater than or equal to 0.0 mol. % and less than or equal to 15.0 mol. % $B_2O_3$, greater than or equal to 0.0 mol. % and less than or equal to 1.0 mol. % $SiO_2$, greater than or equal to 0.0 mol. % and less than or equal to 20.0 mol. % RO, greater than or equal to 0.0 at. % and less than or equal to 1.0 at. % F, greater than or equal to 0.5 mol. % and less than or equal to 20.0 mol. % $TiO_2+La_2O_3+Y_2O_3+Ce_2O_3+CeO_2+ZrO_2$, greater than or equal to 0.5 mol. % $R_2O+RO+B_2O_3$, greater than or equal to 0.0 mol. % and less than or equal to 28.0 mol. % $R_2O+RO$ and optionally comprising one or more components selected from $MnO_2$, $Nb_2O_5$, $SnO_2$, $Ta_2O_5$, $WO_3$, $SC_2O_3$, $Pr_2O_3$, $PrO_2$, $Pr_6O_{11}$, $Nd_2O_3$, $Eu_2O_3$, EuO, $Gd_2O_3$, $GdO_2$, $Tb_2O_3$, $Dy_2O_3$, $HO_2O_3$, $Er_2O_3$, $Tm_2O_3$, $Yb_2O_3$, $Lu_2O_3$ and $Sm_2O_3$, wherein the composition of the components is substantially free of Cu, Co, Cr and Ni, wherein none of the ranges of the components is modified by the term "about"; and and wherein the glass satisfies the conditions:

$P_E>75$, where $P_E$ is calculated from the glass composition in terms of mol. % of the components according to the Formula (II):

$$P_E=-0.27146*P_2O_5+0.96062*Al_2O_3+0.22431*B_2O_3-0.072878*BaO+0.35074*CaO+0.21526*(Ce_2O_3+CeO_2)-0.12628*Cu_2O-0.5807*K_2O+0.41579*La_2O_3+0.18714*Li_2O+0.20336*MgO+0.061862*MnO-0.057105*MnO_2-0.18615*Na_2O+0.64778*Nb_2O_5-0.35317*PbO-0.028357*SiO_2+0.17429*SnO+0.55551*SnO_2+0.8294*Ta_2O_5+0.60217*TiO_2+0.17356*WO_3+0.36256*Y_2O_3-0.19958*ZnO+0.7835*ZrO_2+0.46259*(RE_mO_n-La_2O_3-Y_2O_3-Ce_2O_3-CeO_2)+0.90549*(max(0,min(B_2O_3,P_2O_5-(3*Al_2O_3+3*RE_mO_n+R_2O+MgO+CaO))))+70, \quad (II)$$

where RO is a total sum of divalent metal oxides and $R_2O$ is a total sum of monovalent metal oxides; and wherein the value of the parameter $P_E$ is modified by the term "about".

2. The glass of claim 1, wherein the glass has a Young's modulus, E that is greater than or equal to 75 GPa.

3. The glass of claim 1, wherein the composition of the components comprises:

greater than or equal to 60.0 mol. % and less than or equal to 68.0 mol. % $P_2O_5$, greater than or equal to 15.0 mol. % and less than or equal to 20.0 mol. % $Al_2O_3$, greater than or equal to 0.3 mol. % and less than or equal to 12.0 mol. % $B_2O_3$, greater than or equal to 1.0 mol. % and less than or equal to 15.0 mol. % $R_2O+RO$ and wherein the composition of the components satisfies the condition:

$0.95\leq P_2O_5/(3*Al_2O_3+B_2O_3)$ [mol. %]$\leq1.20$, where $R_2O$ is a total sum of monovalent metal oxides and RO is a total sum of divalent metal oxides.

4. The glass of claim 1, wherein the glass has batch index, $I_B$ that is greater than or equal to 0.000 where $I_B$ is calculated from the glass composition in terms of mol. % of the components according to the following formula:

$$I_B=(R_2O+RO+3*Al_2O_3+B_2O_3+3*RE_2O_3)-P_2O_5.$$

5. The glass of claim 1, wherein the composition of the components comprises one or more of the following:

greater than or equal to 53.5 mol. % and less than or equal to 66.0 mol. % $P_2O_5$, greater than or equal to 15.5 mol. % and less than or equal to 28.5 mol. % $Al_2O_3$, greater than or equal to 0.75 mol. % and less than or equal to 7.25 mol. % MgO, greater than or equal to 0.5 mol. % and less than or equal to 8.0 mol. % $B_2O_3$, greater than or equal to 0.0 mol. % and less than or equal to 11.0 mol. % $TiO_2$, greater than or equal to 0.0 mol. % and less than or equal to 9.0 mol. % $K_2O$, greater than or equal to 0.0 mol. % and less than or equal to 9.0 mol. % $Li_2O$, greater than or equal to 0.0 mol. % and less than or equal to 9.0 mol. % $Na_2O$, greater than or equal to 0.0 mol. % and less than or equal to 6.5 mol. % $CeO_2$, greater than or equal to 0.0 mol. % and less than or equal to 5.5 mol. % $La_2O_3$, greater than or equal to 0.0 mol. % and less than or equal to 5.5 mol. % $Y_2O_3$, greater than or equal to 0.0 mol. % and less than or equal to 4.0 mol. % CaO, greater than or equal to 0.0 mol. % and less than or equal to 3.6 mol. % $ZrO_2$ and greater than or equal to 0.0 mol. % and less than or equal to 1.0 mol. % $Nd_2O_3$.

6. The glass of claim 1, wherein the composition of the components comprises:

greater than or equal to 0.0 mol. % and less than or equal to 5.0 mol. % $Ta_2O_5$, greater than or equal to 0.0 mol. % and less than or equal to 1.0 mol. % BaO, greater than or equal to 0.0 mol. % and less than or equal to 1.0 mol. % $V_2O_5$, greater than or equal to 0.0 mol. % and less than or equal to 3.0 mol. % $K_2O+Rb_2O+Cs_2O$ and greater than or equal to 0.0 mol. % and less than or equal to 3.0 mol. % $TeO_2+GeO_2$, wherein the composition of the components is substantially free of Cu, Co, Ni, Cr, V and Bi, substantially free of fluorine, substantially free of PbO and substantially free of $SiO_2$.

7. The glass of claim 1, wherein the glass has a vHF mass difference per unit area that is less than or equal to 1.0 $mg/cm^2$.

* * * * *